(12) United States Patent
Nakamura

(10) Patent No.: US 8,179,403 B2
(45) Date of Patent: May 15, 2012

(54) IMAGE SYNTHESIS DEVICE, IMAGE SYNTHESIS METHOD, IMAGE SYNTHESIS PROGRAM, INTEGRATED CIRCUIT

(75) Inventor: Mika Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 516 days.

(21) Appl. No.: 12/444,624

(22) PCT Filed: Sep. 11, 2007

(86) PCT No.: PCT/JP2007/067631
§ 371 (c)(1),
(2), (4) Date: Apr. 7, 2009

(87) PCT Pub. No.: WO2008/047518
PCT Pub. Date: Apr. 24, 2008

(65) Prior Publication Data
US 2010/0079492 A1    Apr. 1, 2010

(30) Foreign Application Priority Data

Oct. 19, 2006    (JP) ................................. 2006-284529

(51) Int. Cl.
*G09G 5/00*    (2006.01)
(52) U.S. Cl. ........................................ 345/634; 345/629
(58) Field of Classification Search .................. 345/603, 345/634, 629
See application file for complete search history.

(56) References Cited

U.S. PATENT DOCUMENTS

| | | | | |
|---|---|---|---|---|
| 5,638,498 A | * | 6/1997 | Tyler et al. | 358/1.18 |
| 6,751,356 B2 | * | 6/2004 | Oki | 382/240 |
| 7,715,640 B2 | * | 5/2010 | Ozawa | 382/239 |
| 2003/0202196 A1 | * | 10/2003 | Ooki | 358/1.9 |
| 2005/0074184 A1 | | 4/2005 | Matsumoto et al. | |
| 2008/0082907 A1 | * | 4/2008 | Sorotokin et al. | 715/210 |
| 2009/0296157 A1 | * | 12/2009 | Misawa et al. | 358/3.24 |

FOREIGN PATENT DOCUMENTS

| | | |
|---|---|---|
| JP | 61-156091 | 7/1986 |
| JP | 2003-310602 | 11/2003 |
| JP | 2003-317078 | 11/2003 |
| JP | 2005-108105 | 4/2005 |

OTHER PUBLICATIONS

International Search Report issued Oct. 30, 2007 in the International (PCT) Application of which the present application is the U.S. National Stage.
Tamura, Hideyuki, "Computer Image Processing," Dec. 20, 2002, Ohmsha, Ltd.
Kiya, Hitoshi, "For Full Understanding of the Technology for Processing Moving/Still Images," Sep. 1, 2004, CQ Publishing Co., Ltd.

* cited by examiner

*Primary Examiner* — M Good Johnson
(74) *Attorney, Agent, or Firm* — Wenderoth, Lind & Ponack, L.L.P.

(57) ABSTRACT

When composite image data including parts that were respectively in different data formats before combining, is conventionally edited, the whole composite image data is edited by using a same algorithm. The algorithm may not be an optimum algorithm for a certain part of the composite image data. In an improved structure, the format conversion unit 142 converts the format of the combining target image data, attaches, to each piece of pixel data, a flag indicating the data format before the conversion, and outputs the pixel data with the flag. The combining engine 143 combines together the image data output from the format conversion unit 142.

18 Claims, 28 Drawing Sheets

FIG. 2

Combining instruction table 112

| Input image data | Combining information ||||||
| --- | --- | --- | --- | --- |
| | Data format | Layering order | Output coordinate | Transmittance |
| 131 — Paint image data | X8R8G8B8 | 1 | (100, 100) | 0 |
| 132 — Character image data | R5G6B5 | 1 | (50, 150) | 0 |
| 133 — Photo image data | YUV422 | 1 | (400, 150) | 0 |
| 134 — Photo image data | YUV420 | 1 | (400, 300) | 0 |

FIG. 4
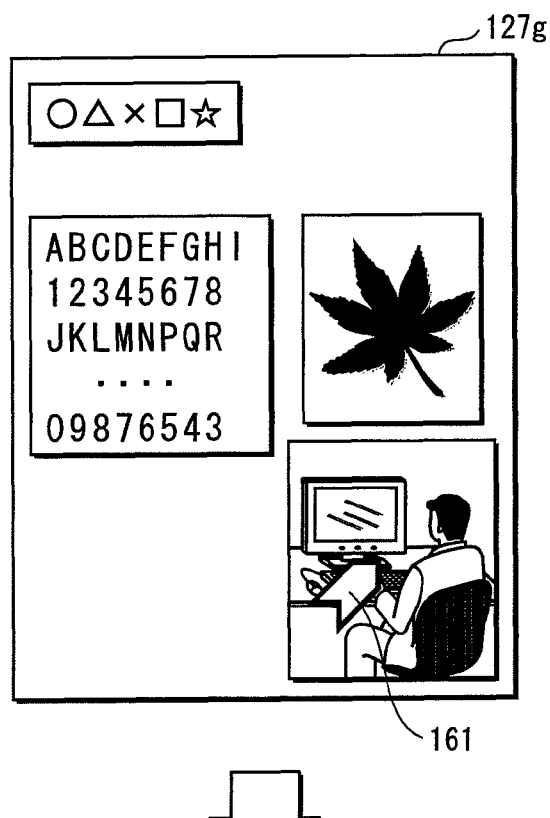
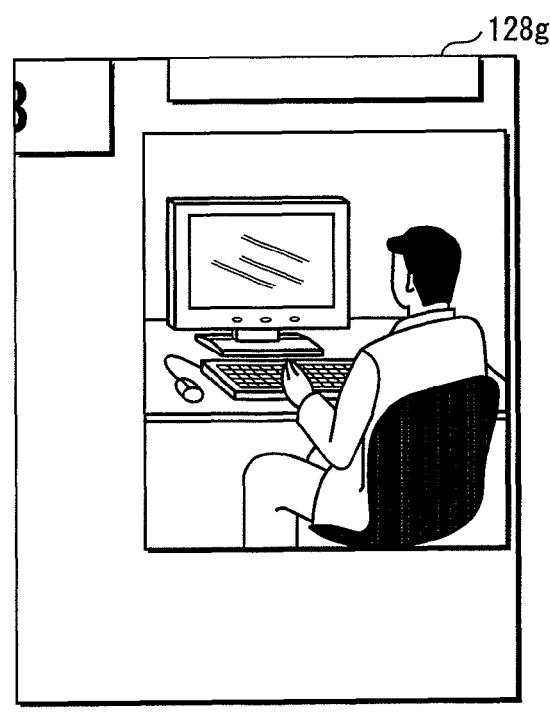

FIG. 12

Combining instruction table ~212

| Input image data | Data format | Layering order | Combining information ||||
| | | | Output coordinate | Transformation information | Image quality adjustment information | Transmittance |
|---|---|---|---|---|---|---|
| Paint image data | X8R8G8B8 | 3 | (100, 100) | 1.4 times | Necessary | 0 |
| Character image data | R5G6B5 | 2 | (50, 150) | 1.2 times | Necessary | 0 |
| Photo image data | YUV422 | 1 | (400, 150) | Left-right inversion | Unnecessary | 0 |
| Photo image data | YUV420 | 3 | (400, 300) | 0.8 times | Unnecessary | 0 |

231
232
233
234

IMAGE SYNTHESIS DEVICE, IMAGE SYNTHESIS METHOD, IMAGE SYNTHESIS PROGRAM, INTEGRATED CIRCUIT

TECHNICAL FIELD

The present invention relates to a technology for combining a plurality of images into one image. The present invention especially relates to a technology for combining a plurality of pieces of image data that have been described in different formats.

BACKGROUND ART

The images to be displayed on a display of a television or a personal computer are generated based on the data that represents the color of each pixel by numerical values.

There are various methods, such as the RGB method, YUV method, and HSV method, which represent the color of each pixel by numerical values.

For example, the RGB method represents, by a numerical value, the intensity of each of the three primary colors (red, green, and blue) for each pixel. The greater the numerical value is, the closer to white the color represented by the numerical value is; and the smaller the numerical value is, the closer to black the color is. Typically, the RGB format is used in displays of personal computers. Therefore, text image data and graphics image data generated by using a personal computer are described in the RGB format.

In the YUV format, the color of one pixel if represented by a variable Y, a color difference U, and a color difference V, where the variable Y indicates the luminance (brightness), the color difference U indicates a difference between the luminance and the blue component, and a color difference V indicates a difference between the luminance and the red component. The YUV format has several types such as YUV 420 format and YUV 422 format, where the YUV 420 format reduces the data amount by a structure for thinning out the data in which four adjacent pixels share a set of color difference data. These YUV formats make use of a characteristic of the human eyes that they react to the luminance more easily than to the color, and they are suited for images such as natural images (for example, a photo of a landscape or a photo of a person) in which the color gradually changes. The YUV formats are often used in JPEG or MPEG, and are used in the digital TV broadcasting.

It is considered that the editing, such as enlarging, reducing, and rotating, and/or image quality adjustment is performed onto an image that has been described in one of the various data formats, the optimum editing algorithm differs for each data format.

For example, the text image data or graphics image data described in the RGB format may be enlarged by copying the data of adjacent pixel (zero-hold method), or by adjusting the edges in the shape of staircase (linear interpolation method). Also, when the photo data or the like described in the YUV format is enlarged, a more complicated process such as the adjustment of the gradation change in color needs to be performed, as well as merely copying the data of adjacent pixel or adjusting the edges. Non-Patent Document 1 identified below discloses the editing of image data in detail.

Meanwhile, there may be a case where a plurality of pieces of image data respectively described in different data formats are combined into one piece of image data representing an image for one screen. In one example of such cases, graphics image data in the RGB format and photo data in the YUV format are displayed in a home page.

When a plurality of pieces of image data respectively described in different data formats are combined into one piece of image data, all pieces of pixel data must be described in a single format. After all pieces of pixel data are unified into one data format, it is impossible to know what data format each pixel was in before combining.

Patent Document 1: Japanese Patent Application Publication No. S61-156091

Non-Patent Document 1: Hitoshi KIYA, "Yokuwakarudougaseishiga no shori gijutsu (For Full Understanding of the Technology for Processing Moving/Still Images)", Sep. 1, 2004, CQ Publishing Co., Ltd.

Non-Patent Document 2: Hideyuki TAMURA, "Konpyuta gazou shori (Computer Image Processing)", Dec. 20, 2002, Ohmsha, Ltd.

DISCLOSURE OF THE INVENTION

The Problems the Invention is Going to Solve

Meanwhile, there is the following problem when composite image data is to be edited. That is to say, when the composite image data includes parts that were respectively in the RGB format and the YUV format before combining, optimum algorithms to be used for editing the parts should be different from each other. However, the composite image data is described in a single display format, thus all parts of the composite image data are edited by using the same algorithm. Some parts of the composite image data, therefore, may be edited with use of an editing algorithm that is not optimum for them, and due to this, the image quality of the edited image data may be lowered.

An object of the present invention is therefore to provide an image combining device, an image combining system, an image combining method, an image combining program, and an integrated circuit that can select optimum editing algorithms when editing composite image data, taking into consideration the above-described problem.

Means to Solve the Problems

The above-described object of the present invention is fulfilled by an image combining device for generating composite image data by combining a plurality of pieces of target image data, comprising: an obtaining unit operable to obtain the plurality of pieces of target image data that are targets to be combined, and a plurality of pieces of attribute information each of which indicates an attribute related to coding during generation of each of the plurality of pieces of target image data; a combining unit operable to generate the composite image data by combining the plurality of pieces of target image data; and an associating unit operable to associate, on a one-to-one basis, the plurality of pieces of attribute information with a plurality of parts of the composite image data, the plurality of parts being respectively associated with the plurality of pieces of target image data, and when two or more parts among the plurality of parts overlap with each other at least partially in the composite image data, associate an overlapping portion in which the two or more parts overlap with each other, with a piece of attribute information associated with a piece of target image data that is displayed as a partial image in front of other partial images in an area corresponding to the overlapping portion in a composite image that is displayed in accordance with the composite image data.

The above-described object of the present invention is also fulfilled by an image data use system comprising an image combining device and an editing device, the image combining device generating composite image data by combining a plurality of pieces of target image data, the editing device generating edited image data by editing the composite image data, the image combining device including: an obtaining unit operable to obtain the plurality of pieces of target image data that are targets to be combined, and a plurality of pieces of attribute information each of which indicates an attribute related to coding during generation of each of the plurality of pieces of target image data; a combining unit operable to generate the composite image data by combining the plurality of pieces of target image data and an associating unit operable to associate, on a one-to-one basis, the plurality of pieces of attribute information with a plurality of parts of the composite image data, the plurality of parts being respectively associated with the plurality of pieces of target image data, and when two or more parts among the plurality of parts overlap with each other at least partially in the composite image data, associate an overlapping portion in which the two or more parts overlap with each other, with a piece of attribute information associated with a piece of target image data that is displayed as a partial image in front of other partial images in an area corresponding to the overlapping portion in a composite image that is displayed in accordance with the composite image data, and the editing device including: an obtaining unit operable to obtain the composite image data; a receiving unit operable to receive an instruction for editing the composite image data; a selecting unit operable to select an editing algorithm in accordance with each piece of attribute information that is associated with a part of the composite image data, the part being specified by the received instruction as a part to be edited; and an editing unit operable to edit the composite image data in accordance with the selected editing algorithm.

Here, the function of the "obtaining unit" recited above is performed by the combining control unit 141 and the format conversion unit 142 in Embodiment 1 described below. And the functions of the "combining unit" and the "associating unit" are performed by the combining engine 143, the combining buffer 144, and the memory 101.

EFFECTS OF THE INVENTION

With the above-described structure, the associating unit associates the plurality of pieces of attribute information with a plurality of parts of the composite image data, the plurality of parts being respectively associated with the plurality of pieces of target image data. Also, when two or more parts among the plurality of parts overlap with each other at least partially in the composite image data, the associating unit associates an overlapping portion in which the two or more parts overlap with each other, with a piece of attribute information associated with a piece of target image data that is displayed as a partial image in front of other partial images in an area corresponding to the overlapping portion in a composite image that is displayed in accordance with the composite image data. Therefore, when the composite image data is to be edited further, it is possible to select optimum editing algorithms based on the attribute information, and edit each part by using an optimum editing algorithm for it.

In the above-stated image combining device, the plurality of pieces of target image data may be generated from a plurality of pieces of input image data to have a same data format by unifying different data formats of the input image data into the same data format, and each of the plurality of pieces of attribute information obtained by the obtaining unit indicates a data format of a different one of the plurality of pieces of input image data that correspond one-to-one to the plurality of pieces of target image data.

With the above-described structure in which the associating unit associates the plurality of pieces of attribute information, each of which indicates a data format of each piece of input image data, with the plurality of parts of the composite image data that are respectively associated with the plurality of pieces of target image data, it is possible to determine in what data format each part constituting the composite image data had been before the format conversion, based on the attribute information.

In the above-stated image combining device, some of the plurality of pieces of target image data may be generated by editing input image data, and each of the plurality of pieces of attribute information obtained by the obtaining unit indicates a history of how a corresponding piece of target image data has been edited.

Note that the "editing" recited above includes the image quality adjustment process, as well as the editing process for enlarging, reducing, inverting or the like, which are described in the embodiments below.

With the above-described structure in which the obtaining unit obtains the attribute information which indicates a history of how a corresponding piece of target image data has been edited, it is possible to recognize for each part of the composite image data whether or not the part had been edited before combining.

In the above-stated image combining device, the composite image data may be composed of a plurality of pieces of pixel data, and the associating unit associates, on a one-to-one basis, attribute information with the pixel data constituting the parts of the composite image data that are respectively associated with the plurality of pieces of target image data.

With the above-described structure, the associating unit associates, on a one-to-one basis, attribute information with the pixel data constituting the parts of the composite image data. With this structure, when a part of the composite image data is to be used, attribute information that is associated with each piece of pixel data included in the part targeted to be used can be detected with certainty.

In the above-stated image combining device, the associating unit may include: a storage sub-unit storing data in units of bits the number of which is an even multiple of 16; a supplementing sub-unit operable to generate supplement data which is supplemented so that a sum of a bit length of one piece of pixel data and a bit length of one piece of attribute information is an even multiple of 16; and a writing sub-unit operable to write, in succession, into the storage unit, each piece of pixel data constituting the composite image data, each piece of attribute information that is associated with the each piece of pixel data, and the supplement data.

Many existing memories manage addresses of data in units of 16 bits or an even multiple of 16 bits. The above-described storage unit may be achieved by such a memory.

With the above-described structure, the supplement data is supplemented so that a sum of a bit length of one piece of pixel data and a bit length of one piece of attribute information is an even multiple of 16, and the writing sub-unit writes each piece of pixel data constituting the composite image data and the attribute information that is associated with the pixel data, in succession into the storage unit. This facilitates managing the addresses of each piece of pixel data and attribute data, and when a part of the composite image data is to be used, it is possible to read out at a high speed each piece of pixel data included in the part targeted to be used, and the attribute information that is associated with the pixel data.

In the above-stated image combining device, each piece of attribute information may be data with a smallest number of bits and indicates a characteristic related to coding during generation of a corresponding piece of target image data, and the associating unit includes: a storage sub-unit storing data; and a writing sub-unit operable to write, into the storage unit, a group of pixel data constituting the composite image data, and a group of attribute information each piece of which is associated with a different piece of the pixel data constituting the composite image data.

With the above-described structure, each piece of attribute information is data with a smallest number of bits and indicates a characteristic related to coding during generation of a corresponding piece of target image data, and the writing sub-unit writes separately the composite image data and the attribute information group. This makes it possible to reduce the total amount of data to the necessity minimum.

In the above-stated image combining device, the associating unit may include: a storage sub-unit storing data; a generating sub-unit operable to generate part information that indicates parts of the composite image data that are respectively associated with the plurality of pieces of target image data; and a writing sub-unit operable to write each piece of the part information and corresponding pieces of attribute information into the storage unit.

With the above-described structure, the writing sub-unit writes each piece of the part information and corresponding pieces of attribute information into the storage unit. Accordingly, compared with the case where the attribute information is stored for each pixel, it is possible to reduce the amount of data greatly.

In the above-stated image combining device, the combining unit may include: a selecting sub-unit operable to select an editing algorithm in accordance with each piece of attribute information; an editing sub-unit operable to edit each piece of target image data associated with each piece of attribute information, in accordance with the selected editing algorithm; and a combining sub-unit operable to combine a group of edited image data.

With the above-described structure, when it is necessary to edit each piece of target image data before combining, it is possible to speedily select editing algorithms based on the attribute information and perform the editing.

The above-stated image combining device may further comprise: a receiving unit operable to receive an instruction for editing the composite image data; a selecting unit operable to select an editing algorithm in accordance with each piece of attribute information that is associated with a part of the composite image data, the part being specified by the received instruction as a part to be edited; and an editing unit operable to edit the composite image data in accordance with the selected editing algorithm.

With the above-described structure, the selecting unit can select optimum editing algorithms in accordance with the attribute information group that is associated with the pixel data included in the part targeted to be edited, and the editing unit can perform optimum editing processes onto the part being the target of the editing.

BRIEF DESCRIPTION OF THE DRAWING

FIG. 2 shows details of the combining instruction table 112.

FIG. 4 shows a composite image 127g and an edited image that is generated by enlarging a part of the composite image 127g.

FIG. 12 shows details of the combining instruction table 212.

Figure 1:
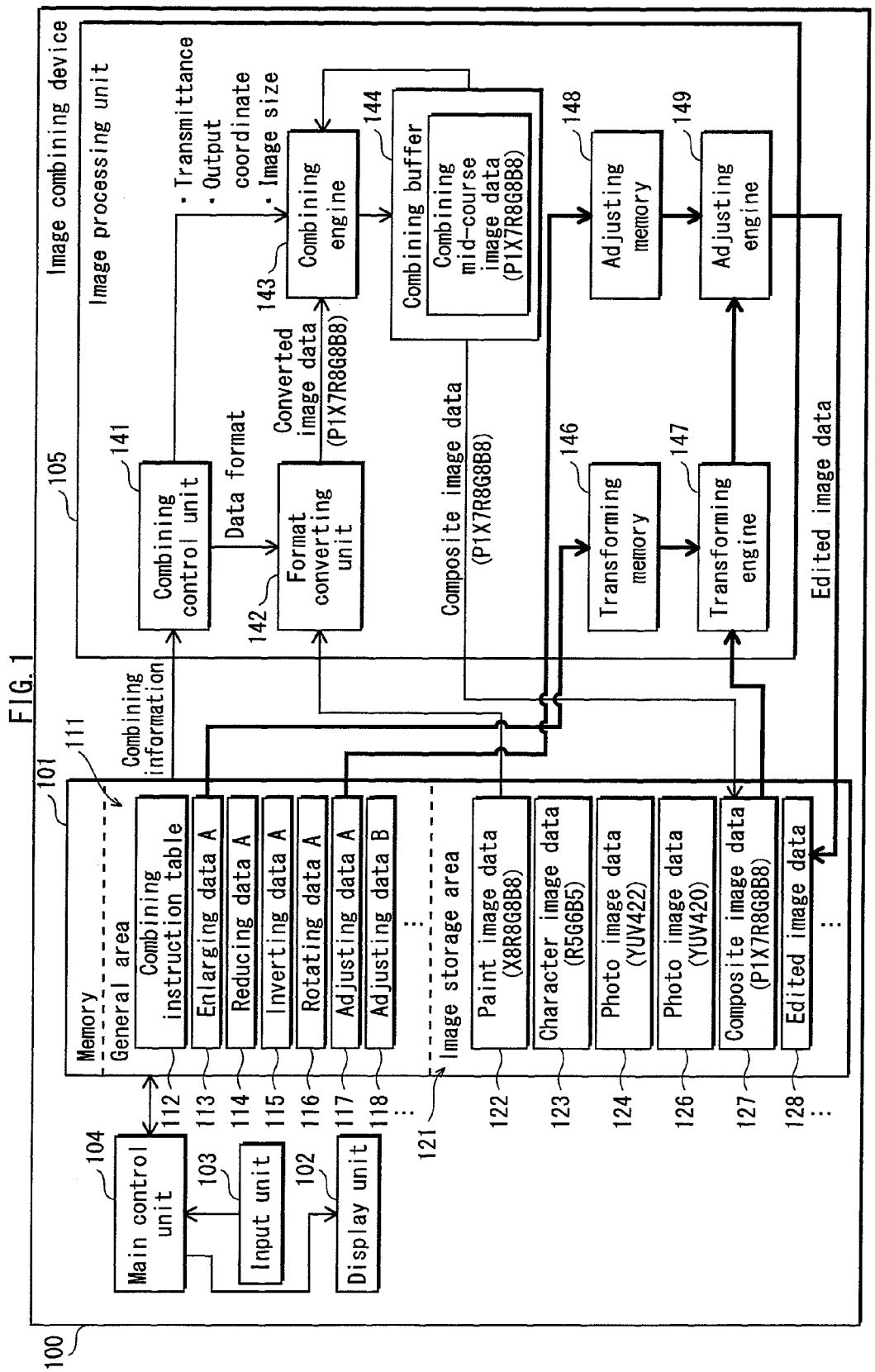
FIG. 1 is a block diagram showing the functional structure of the image combining device 100 in Embodiment 1.

DESCRIPTION OF CHARACTERS 100 image combining device
101 memory
102 display unit
103 input unit
104 main control unit
105 image processing unit
141 combining control unit
142 format conversion unit
143 combining engine
144 combining buffer
146 transforming memory
147 transforming engine
148 adjusting memory
149 adjusting engine

BEST MODE FOR CARRYING OUT THE INVENTION

1. Embodiment 1

The following describes the image combining device in Embodiment 1 of the present invention with reference to the attached drawings.

1.1 Overview

The image combining device in Embodiment 1 generates apiece of composite image data by combining a plurality of pieces of image data. In the Description of the present application, an image displayed on the monitor is referred to as "image", and the data used to generate the picture or image is referred to as "image data".

There are two formats of image data that can be combined into a composite image: image data in the RGB format having been generated on a computer; and image data in the YUV format which is, for example, data representing a picture of landscape, people or the like taken by a digital camera.

In the combining process, the image combining device unifies the two formats of image data into the RGB format. In the present embodiment, each color is represented by eight bits. Hereinafter, when data for red, green and blue of each pixel are respectively assigned with data lengths of a, b and c (which are each an integer indicating the number of bits) in image data in the RGB format, the format of the image data is referred to as RaGbBc format. Also, meaningless n-bit data (hereinafter referred to as blank bits) which is inserted for the purpose of adjusting the data length to a predetermined length is represented as "Xn". Also, data of a pixel is referred to as pixel data.

The image combining device of the present invention first converts the image data into the X8R8G8B8 format where each color is represented by 8-bit data. The image combining device further converts the image data into the P1X7R8G8B8 format by replacing the initial bit of the blank bits of the image data in the X8R8G8B8 format with a flag P that indicates which of the RGB format and the YUV format the image data was converted from.

Next, the image combining device generates composite image data by arranging the image data in the P1X7R8G8B8 format at a predetermined position.

Note that an adjustment is made such that each pixel data is 32 bits in length. This is because, when the data length of pixel data is 16 bits or an integral multiple of 16 bits, the addresses can be managed easily, due to the physical structure of the existing memories. Accordingly, the data length of pixel data may not necessarily be 32 bits.

1.2 Structure of Image Combining Device 100

An image combining device 100 generates composite image data by combining a plurality of pieces of image data, and edits image data (for example, enlarges, reduces, rotates, or inverts) part or all of the composite image to generate an edited image.

FIG. 1 is a block diagram showing the functional structure of the image combining device 100. In FIG. 1, the arrows indicate the flow of data in the processes of combining the image data and editing the composite image data.

The image combining device 100, as shown in FIG. 1, includes a memory 101, a display unit 102, an input unit 103, a main control unit 104, and an image processing unit 105. The image processing unit 105 includes a combining control unit 141, a format conversion unit 142, a combining engine 143, a combining buffer 144, a transforming memory 146, a transforming engine 147, an adjusting memory 148, and an adjusting engine 149.

The image combining device 100 is more specifically a computer system including a microprocessor, a RAM, and a ROM. A computer program is recorded in the RAM and ROM. The image combining device 100 achieves part of its functions as the microprocessor operates in accordance with the computer program. Here, the computer program is composed of a plurality of instruction codes which each instruct the computer to achieve a predetermined function.

The following will describe each constitutional element in detail.

(1) Memory 101

The memory 101 is composed of a hard disk unit, and includes, inside thereof, a general area 111 and an image storage area 121.

The general area 111, as shown in FIG. 1, includes a combining instruction table 112, enlarging data A 113, reducing data A 114, inverting data A 115, rotating data A 116, adjusting data A 117, and adjusting data B 118. The general area 111 also stores various types of programs that are used by the main control unit 104, image data (start screen, menu display, and the like), functions, calculation parameter, and the like.

The image storage area 121 stores image data in accordance with a user operation. The image storage area 121 stores, as one example, paint image data 122, character image data 123, photo image data 124, photo image data 126, composite image data 127, and edited image data 128.

Note that the various types of information described above are one example of information that are stored in the memory 101 when a combining of images or an editing of the composite image data is completed.

(1-1) Combining Instruction Table 112

The combining instruction table 112 is a table that indicates information necessary for executing the image combining.

FIG. 2 shows details of the combining instruction table 112. As shown in FIG. 2, the combining instruction table 112 includes a plurality of pieces of combining information 131, 132, 133, and 134. The plurality of pieces of combining information respectively correspond to paint image data 122, character image data 123, photo image data 124, and photo image data 126 which will be described later.

Each piece of combining information includes: "input image data", "data format", "layering order", "output coordinate", and "transmittance".

The "input image data" is information indicating image data that is to be combined into composite image data. In the example shown in FIG. 2, a name of image data is written. However, not limited to this, an identifier of image data, a stored starting address or the like may be written instead.

The "data format" indicates a data format of corresponding image data. As described earlier, "X8R8G8B8" indicates that the corresponding image data is the RGB format, and pixel data corresponding to one pixel includes eight blank bits and three pieces of 8-bit data that respectively represent degrees of colors red, green and blue.

Also, "R5G6B5" indicates that the corresponding image data is the RGB format, and pixel data corresponding to one pixel includes a piece of 5-bit data that represents a degree of color red, a piece of 6-bit data that represents a degree of color green, and a piece of 5-bit data that represents a degree of color blue.

The "YUV422" and "YUV420" indicate the YUV format that represents the pixel data by the brightness and the color difference, as described earlier. The "YUV422" and "YUV420" differ from each other in reduction of the color difference data.

The "layering order" is information that indicates an order in which the corresponding image is displayed on the screen. The greater the value thereof is, the image is displayed more upward (more frontward); and the smaller the value thereof is, the image is displayed more downward (more backward). In the present embodiment, the combination target images do not overlap on the screen. Accordingly, all values for the "layering order" are "1".

The "output coordinate" indicate the coordinate of a starting point of the corresponding image when it is displayed on the screen.

The "transmittance" indicates, by a value ranging from "0" to "1", the level of transmittance of the corresponding image, namely how much the corresponding image allows the image under thereof transmit therethrough.

As one example, combining information 132 indicates that it corresponds to the character image data 123, the data format of the character image data 123, which is the combining target, is "R5G6B5", the layering order in display is the most front, and the coordinate of the starting display position are (50, 150). The transmittance "0" indicates that the character image displayed based on the character image data 123 does not allow the image under thereof transmit therethrough.

The structure of the combining instruction table 112 shown here is only one example. Each piece of combining information may further include information indicating the data size of each input image data, image size (for example, horizontal 50 pixels×vertical 150 pixels) or the like.

(1-2) Editing Data

In the following, data to be used for the editing such as enlarging, reducing, rotating, or inverting is generically called editing data.

The editing data stored in the general area 111 includes enlarging data A 113, reducing data A 114, inverting data A 115, rotating data A 116 . . . .

Each of the enlarging data A 113, reducing data A 114, inverting data A 115, and rotating data A 116 includes a parameter group, a function, and a program that are necessary for performing the enlarging, reducing, inverting, or rotating image data in the R8G8B8 format, and is especially suitable for editing the image data generated by the computer, such as graphics image or text image.

Also, although not illustrated, the general area 111 of the memory 101 further stores editing data (enlarging data B, reducing data B, inverting data B, rotating data B, . . . ) that is suitable for editing the image data of a natural image (landscape, people or the like).

(1-3) Adjusting Data A 117 and Adjusting Data B 118

The adjusting data A 117 includes a function, parameter, and program that are necessary for performing the image quality adjustment onto the image data in the RGB format. The image in the RGB format has been generated, with a high probability, by a computer using drawing software or the like. Accordingly, the adjusting data A 117 includes a function and a parameter for, for example, deleting a blur at a contour by eliminating medium colors, and highlighting the contrast.

The adjusting data B 118 includes a function, parameter, and program that are necessary for performing the image quality adjustment onto the image data for editing the image data in the RGB format of a natural image (landscape photo, people photo or the like). More specifically, the adjusting data B 118 includes, for example, a function and a parameter which comply with an algorithm for adjusting a contour line into a smooth curved line, or smoothing the change in color (change in gradation).

Here, the data is merely recited as the adjusting data. However, more specifically, adjusting data for performing the image quality adjustment process in relation to the enlarging process, adjusting data for performing the image quality adjustment process in relation to the reducing process, adjusting data for performing the image quality adjustment process in relation to the rotation process may be stored.

(1-4) Image Data

The image storage area 121 stores the paint image data 122, character image data 123, photo image data 124, photo image data 126, composite image data 127, and edited image data 128.

The paint image data 122 is image data generated with use of drawing software or the like, and its data format is X8R8G8B8.

The character image data 123 is image data generated with use of word-processing software or a text drawing function of drawing software, and its data format is R5Y6G5.

The photo image data 124 and 126 are image data generated by digitizing natural images that were shot by a digital camera, and their data formats are YUV422 and YUV 420, respectively.

The composite image data 127 is image data generated by combining the above-mentioned four pieces of image data based on the combining instruction table 112, and its data format is P1X7R8G8B8.

Figure 3:
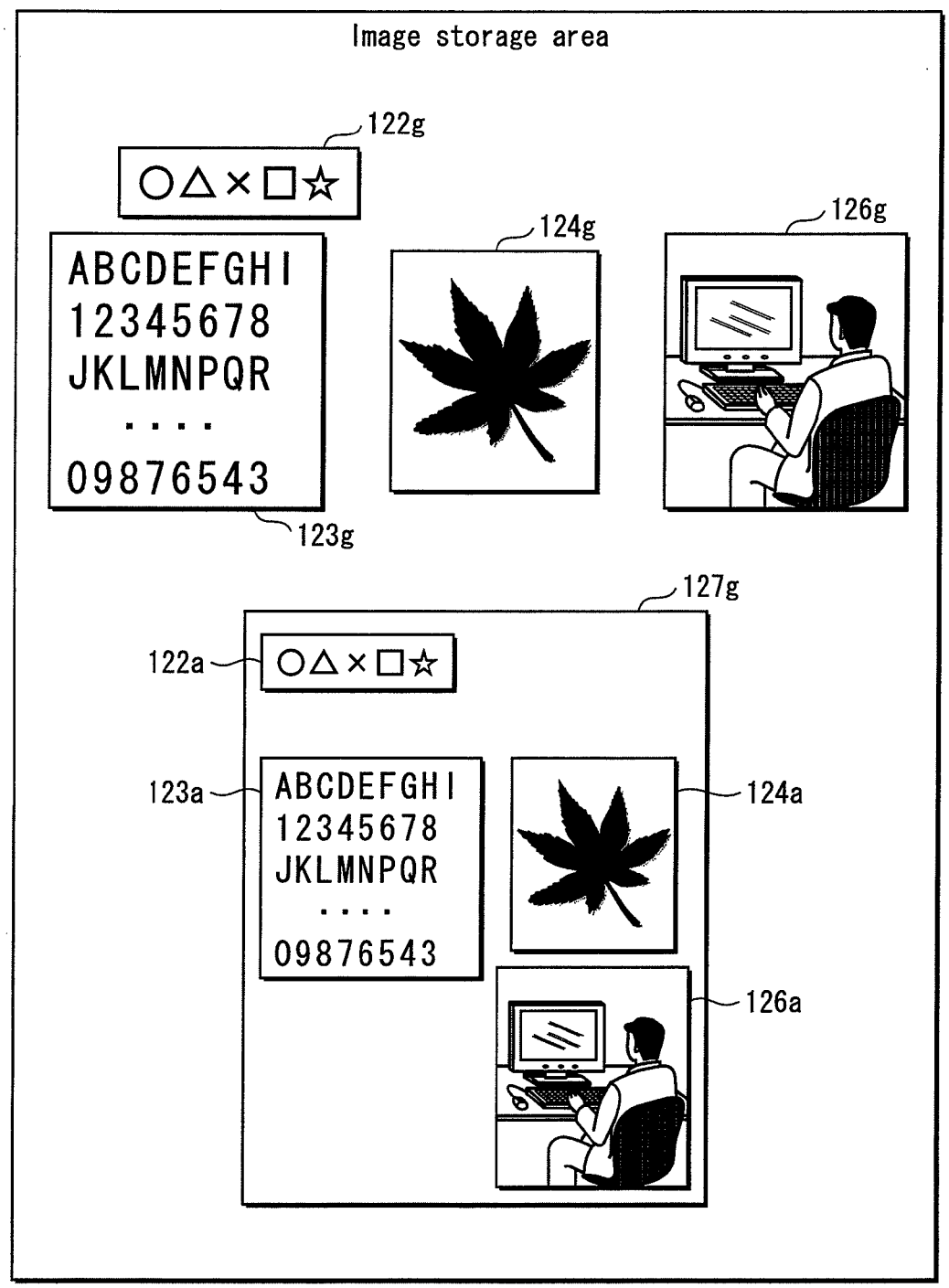
FIG. 3 visually shows the image data stored in the image storage area 121.

FIG. 3 shows a paint image 122g, a character image 123g, a photo image 124g, a photo image 126g, and a composite image 127g that are displayed based on the paint image data 122, character image data 123, photo image data 124, photo image data 126, and composite image data 127.

The edited image data 128 is image data that was generated by enlarging a part of the composite image data.

FIG. 4 shows composite image 127g that is generated based on the composite image data 127, and edited image 128g that is generated based on the edited image data 128. A pointer 161 is displayed on the composite image 127g shown in FIG. 4. The edited image 128g is an image that is generated by enlarging an area of 100×100 pixels centering on the point pointed by the pointer 161.

(2) Input Unit 103

The input unit 103 is connected with a keyboard, a mouse and the like, receives instructions and data input by the user, and outputs the received instructions and data to the main control unit 104.

The input unit 103 is also provided with an interface connecting with a portable recording medium, reads out data from these devices under control of the main control unit 104, and outputs the read-out data to the main control unit 104.

(3) Combining Control Unit 141

The combining control unit 141 has a function to control the operation of the constituent elements by outputting control signals (not illustrated) thereto in the process of generating the composite image data.

The combining control unit 141 receives an instruction for combining images from the main control unit 104. Upon receiving an instruction for combining images, the combining control unit 141 initializes the combining buffer 144. More specifically, the combining control unit 141 writes, for example, background data in the P1X7R8G8B8 format (blueback, background image data specified by the user, or the like). In the present example, it is presumed that the value of a format flag P included in each piece of pixel data constituting the background image data is "0".

Next, the combining control unit 141 retrieves a piece of combining information that has the smallest value of the layering order, from the combining instruction table 112 stored in a predetermined address in the general area 111 of the memory 101. In the present example, all values for layering order included in the combining instruction table 112 are the same, thus the combining information 131 at the head of the table is retrieved.

Next, the combining control unit 141 outputs the data format included in the retrieved combining information 131 to the format converting unit 142 (which will be described later). Following this, the combining control unit 141 reads out the input image data indicated in the combining information 131 from the image storage area 121 in the memory 101, outputs the read-out input image data to the format converting unit 142, and instructs to perform a format conversion.

Next, the combining control unit 141 outputs, to the combining engine 143 (which will be described later), the values of transmittance and output coordinate included in the retrieved combining information 131, and the image size of the paint image 122g that corresponds to the retrieved combining information 131. The image size may be calculated by the combining control unit 141, or may be preliminarily included in each piece of combining information stored in the combining instruction table 112.

Next, the combining control unit 141 monitors the operation of the combining engine 143, and when the combining engine 143 writes back combining mid-course image data into the combining buffer 144, retrieves the next piece of combining information from the combining instruction table 112.

The combining control unit 141 repeats the above-described process for each piece of combining information constituting the combining instruction table 112.

After completing the process for each piece of combining information constituting the combining instruction table 112, the combining control unit 141 writes the mid-course image data held by the combining buffer 144 into the image storage area 121 in the memory 101, as the composite image data.

Also, the combining control unit 141 notifies the main control unit 104 that the image combining process has been completed.

(4) Format Conversion Unit 142

The format conversion unit 142 receives the data format from the combining control unit 141, and then receives the input image data. When the received data format is the RGB format, the format converting unit 142 generates a one-bit format flag P having value "0"; and when the received data format is the YUV format, the format converting unit 142 generates the format flag P with value "1". The format converting unit 142 then temporarily stores the generated format flag.

Next, when the received data format is X8R8G8B8, the format converting unit 142 generates converted image data in the P1X7R8G8B8 format by replacing starting one bit of each piece of pixel data constituting the received input image data with the stored format flag P, and outputs the generated converted image data to the combining engine.

When the received data format is the RGB format, but is not the X8R8G8B8 format, the format converting unit 142 adjusts the bit length of the blank bits and each color in each piece of pixel data to 8-bit length, generates converted image data in the P1X7R8G8B8 format by replacing starting one bit of the blank bits with the stored format flag P, and outputs the generated converted image data to the combining engine 143.

When the received data format is the YUV format, the format converting unit 142 converts each piece of pixel data to the R8G8B8 format by using the following equations.

$$R = Y + 1.40200 \times V$$

$$G = Y - 0.34414 \times U - 0.71414 \times V$$

$$B = Y + 1.77200 \times U$$

Note that the above-indicated equations are one example of equations which comply with the ITU-R BT.601. The YUV format is defined in detail in, for example, the ITU-R BT.601 and the ITU-R BT.709. Other conversion equations may be used depending on the types of the input image data and the post-conversion image data (analog, digital, bit scale), the type of the standard to be complied with, or the method for selecting the parameter.

Next, the format converting unit 142 generates the converted image data in the P1X7R8G8B8 format by attaching the format flag P to the start of each piece of pixel data, and seven bits of blank bits to follow the first bit, and outputs the generated converted image data to the combining engine 143.

(5) Combining Engine 143

The combining engine 143 receives the transmittance, output coordinate, and image size (vertical a pixels×horizontal b pixels) from the combining control unit 141. The combining engine 143 also receives the converted image data from the format converting unit 142.

Upon receiving these, the combining engine 143 reads out the combining mid-course image data in the P1X7R8G8B8 format from the combining buffer 144. The combining engine 143 then updates the mid-course image data by combining the received converted image data with the mid-course image data. More specifically, the combining engine 143 combines, among a plurality of pieces of pixel data constituting the combining mid-course image data, (i) the value of each color component (which is represented as "D (b)" in the following equation) of each piece of pixel data corresponding to each pixel belonging to a range of vertical a pixels X horizontal b pixels in which the input image is arranged (hereinafter, the range is referred to as "combining target range"), where the output position is regarded as the base point (the upper-left pixel) on the screen, and (ii) the value of each color component of each piece of pixel data corresponding to each pixel constituting the converted image data (which is represented as "D (f)" in the following equation), by using the following equation.

$$D(com) \leftarrow D(f) + D(b) \times \text{transmittance}$$

$$P(com) \leftarrow P(f)$$

D(com): Value of each color component of each piece of pixel data in the combining target range after combining
D(f): Value of each color component of each piece of pixel data in the converted image data D(b): Value of each color component of each piece of pixel data in the combining target range of the combining mid-course image data read out from the combining buffer P(com): First bit of each piece of pixel data in the combining target range after combining P(f): First bit of each piece of pixel data in the converted image data Note that, among the read-out combining mid-course image data, pixel data outside the combining target range is not re-written.

Next, the combining engine 143 writes back the combining mid-course image data after update into the combining buffer 144.

(6) Combining Buffer 144

The combining buffer 144 is composed of a RAM. At the booting of the device or immediately after an initialization, the background data in the P1X7R8G8B8 format (blueback, background image data specified by the user, or the like) is written into the combining buffer 144 as the combining mid-course image data. At this point in time, the format flag P included in each piece of pixel data is "0".

The combining buffer 144 temporarily stores the combining mid-course image data, in the mid-course of the image combining process that is performed by the combining engine 143.

The combining mid-course image data at the time immediately after the combining engine 143 ends the image combining process is the same as the composite image data 127.

Figure 5:
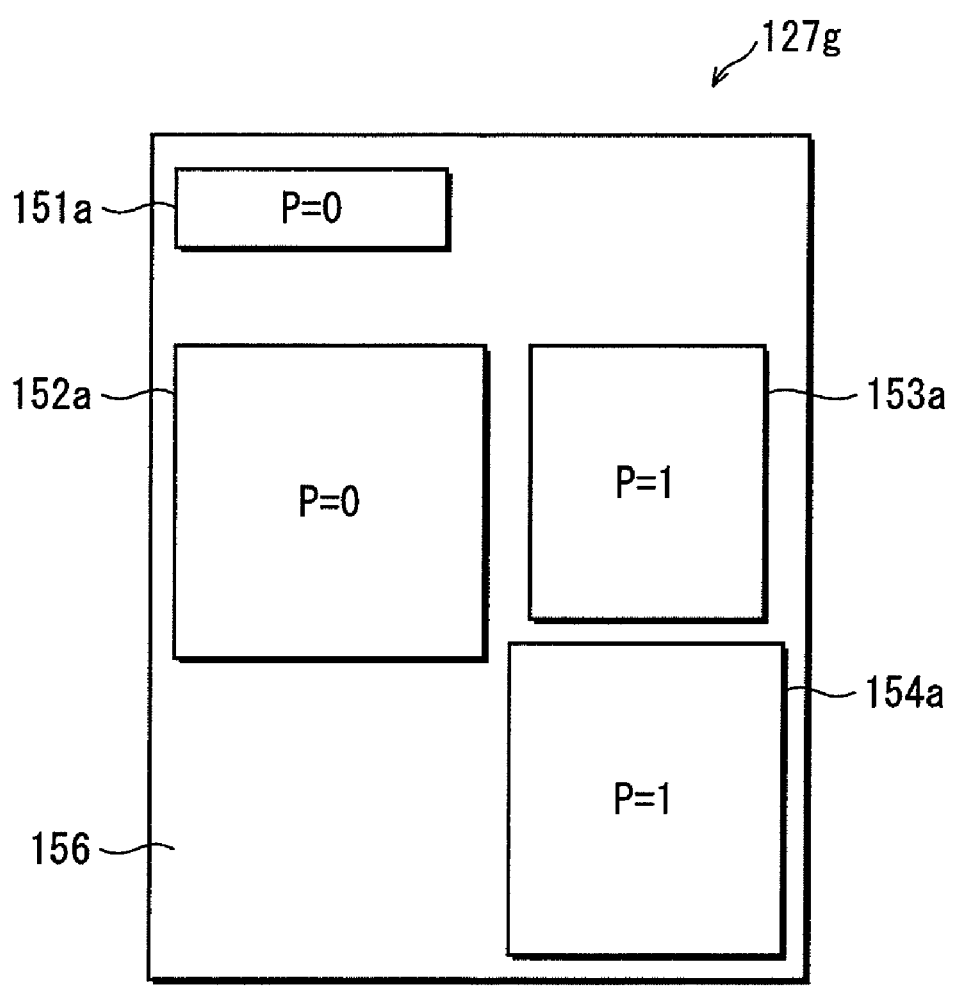
FIG. 5 visually shows an arrangement of values of format flag P that is included in each piece of pixel data constituting the composite image data 127.

The first bit of each piece of pixel data constituting the composite image data 127 is the format flag P. FIG. 5 visually represents each pixel and the value of the format flag P included in each piece of pixel data. FIG. 5 indicates as follows. The format flag P that corresponds to pixels included an area 151a is "0", where the area 151a is an area in which a paint image 122a on the composite image 127g is displayed. The format flag P that corresponds to pixels included in an area 152a is "0", where the area 152a is an area in which a character image 123a is displayed.

The format flag P that corresponds to pixels included in an area 153a is "1", where the area 153a is an area in which a photo image 124a is displayed. The format flag P that corresponds to pixels included in an area 154a is "1", where the area 154a is an area in which a photo image 126a is displayed.

Although not illustrated, the format flag P that corresponds to pixels included in the remaining area 156 is "0".

(7) Transforming Memory 146 and Transforming Engine 147

The transforming engine 147, under control of the main control unit 104, edits part or all of the composite image data 127 in the P1X7R8G8B8 format, by using the function, parameter and the like stored in the transforming memory 146. More specifically, the transforming engine 147, under control of the main control unit 104, reads out a plurality of pieces of pixel data corresponding to the pixels one by one, in order from the leftmost pixel in the starting line to the rightmost pixel in the last line in an editing-target range in the composite image 127g. The transforming engine 147 then edits the read-out pixel data using the data stored in the transforming memory 146. The transforming engine 147 also reads out, as necessary, a plurality of pieces of pixel data corresponding to peripheral pixels around an editing-target pixel, and uses the read-out pixel data in the editing. After the editing is completed, the transforming engine 147 outputs the post-editing pixel data to the adjusting engine.

Here, the editing is a process of enlarging, reducing, inverting, rotating or the like.

Also, the transforming engine 147 may be instructed by the main control unit 104 to pause. When this happens, the transforming engine 147 reads out the pixel data that corresponds to the editing-target range, and outputs the read-out pixel data to the adjusting engine 149.

The transforming memory 146 is, for example, composed of a RAM, and temporarily stores the function, parameter or the like that are necessary for the transforming engine 147.

(8) Adjusting Memory 148 and Adjusting Engine 149

The adjusting engine 149 receives the post-editing pixel data generated by the transforming engine 147, and generates edited image data by performing the image quality adjustment process onto the received post-editing pixel data, and writes the generated edited image data into the image storage area 121 in the memory 101.

More specifically, the adjusting engine 149 sequentially receives the post-editing pixel data from the transforming engine 147, and temporarily stores the received post-editing pixel data. Next, the adjusting engine 149 generates edited image data by performing the image quality adjustment process onto the stored pixel data group, using the function and parameter stored in the transforming memory 146.

Here, the image quality adjustment process is a process for enhancing the contour, removing the noise, and correcting the distortion of the image. When there is no need for the adjustment, the adjusting engine 149 receives an instruction from the main control unit 104 to stop operating. When it receives an instruction to stop operating, the adjusting engine 149 writes the post-editing pixel data received from the transforming engine 147 into the image storage area 121 in the memory 101 as it is, as the edited image data.

The adjusting memory 148 is, for example, composed of a RAM, and temporarily stores the function, parameter or the like that are necessary for the image adjustment.

(9) Main Control Unit 104

The main control unit 104 has a function to control the operation of the constituent elements of the image combining device 100 by outputting control signals (not illustrated) thereto.

The main control unit 104 receives an input of operation from the user via the input unit 103, reads out the image data recorded in the external device or the recording medium, and writes the read-out image data into the image storage area 121 in the memory 101. The main control unit 104 also receives a request for generating a composite image, via the input unit 103, and receives a request for editing the composite image, from the user.

(9-1) Control of Image Combining Process

When it receives a request for generating a composite image from the user, the main control unit 104 generates a list of image data stored in the image storage area 121 or a thumbnail screen, and receives inputs of selection of a combining-target image, a display position, and transmittance.

After receiving these inputs, the main control unit 104 generates the combining instruction table 112 shown in FIG. 2, based on the information having been input, and writes the generated combining instruction table 112 into a predetermined address in the general area 111 in the memory 101. The data format may be specified by an input from the user, or may be generated by the main control unit 104 by searching the image data specified by the user. For example, information indicating the data format may be included in the 16 or 32 bits at the head of each piece of image data, and each piece of combining information may be generated based on the data format information extracted from the starting bits.

Next, an image combining instruction is output to the combining control unit 141.

Next, upon receiving an image combining completion notification from the combining control unit 141, the main control unit 104 reads out the composite image data 127, and generates the composite image 127g based on the read-out composite image data 127, and displays the generated composite image 127g on the display unit 102.

(9-2) Control of Composite Image Editing Process

While the composite image 127g, that was generated based on the composite image data 127, is displayed on the display unit 102, the user operates the mouse or the like to specify the position of the pointer 161. Upon receiving the specification of the position from the user, the main control unit 104 displays an editing menu screen which provides options for an editing process that can be performed onto the composite image, such as "enlarging", "reducing", "inverting", or "rotating". Alternatively, the selection option may be displayed at the position indicated by the pointer 161, by a scroll display.

Next, the main control unit 104 receives, from the user, an operation that indicates one of the displayed options selected by the user. Upon receiving the selection operation, the main control unit 104 determines the editing-target range in the composite image 127g, based on the editing process indicated by the selected option. For example, when the selected option is the enlarging process, the main control unit 104 determines a range of 100×100 pixels centering on the position indicated by the pointer 161, as the editing-target range of the enlarging process. Also, when the selected option is the inverting process, the main control unit 104 determines a range of 200×200 pixels centering on the position indicated by the pointer 161, as the editing-target range of the inverting process.

Next, the main control unit 104 repeatedly performs the following process onto a plurality of pieces of pixel data corresponding to the pixels, in order from the leftmost pixel in the starting line to the rightmost pixel in the last line in the determined editing-target range.

First, the main control unit 104 initializes the transforming memory 146 and the adjusting memory 148. Next, the main control unit 104 reads out the starting one bit of the pixel data. When the read-out one bit of data is "0", the main control unit 104 reads out editing data that is suitable for editing the graphics image, among the editing data stored in the general area 111, and writes the read-out editing data into the transforming memory 146. Similarly, the main control unit 104 reads out the adjusting data A 117 suitable for image quality adjustment of the graphics image, and writes the read-out adjusting data into the adjusting memory 148.

Next, the main control unit 104 instructs the transforming engine to perform the editing process by notifying the storage address of the pixel data to the transforming engine.

When the read-out one bit of data is "1", the main control unit 104 reads out editing data that is suitable for editing the natural image, among the editing data stored in the general area 111, and writes the read-out editing data into the transforming memory 146. Similarly, the main control unit 104 reads out the adjusting data B 118 suitable for image quality adjustment of the natural image, and writes the read-out adjusting data into the adjusting memory 148.

Next, the main control unit 104 instructs the transforming engine to perform the editing process by notifying the storage address of the pixel data to the transforming engine.

The above-described process is repeated for each piece of pixel data.

Note that, when the image quality adjustment is not necessary, the main control unit 104 initializes the adjusting memory and instructs the adjusting engine to stop operating.

(10) Display Unit 102

The display unit 102 is structured to include a monitor and an image buffer, displays a variety of screens on the monitor, under control of the main control unit 104.

1.3 Operation

The following describes the operation of the image combining device 100 with reference to the attached drawings.

(1) Image Combining Process

Figure 6:
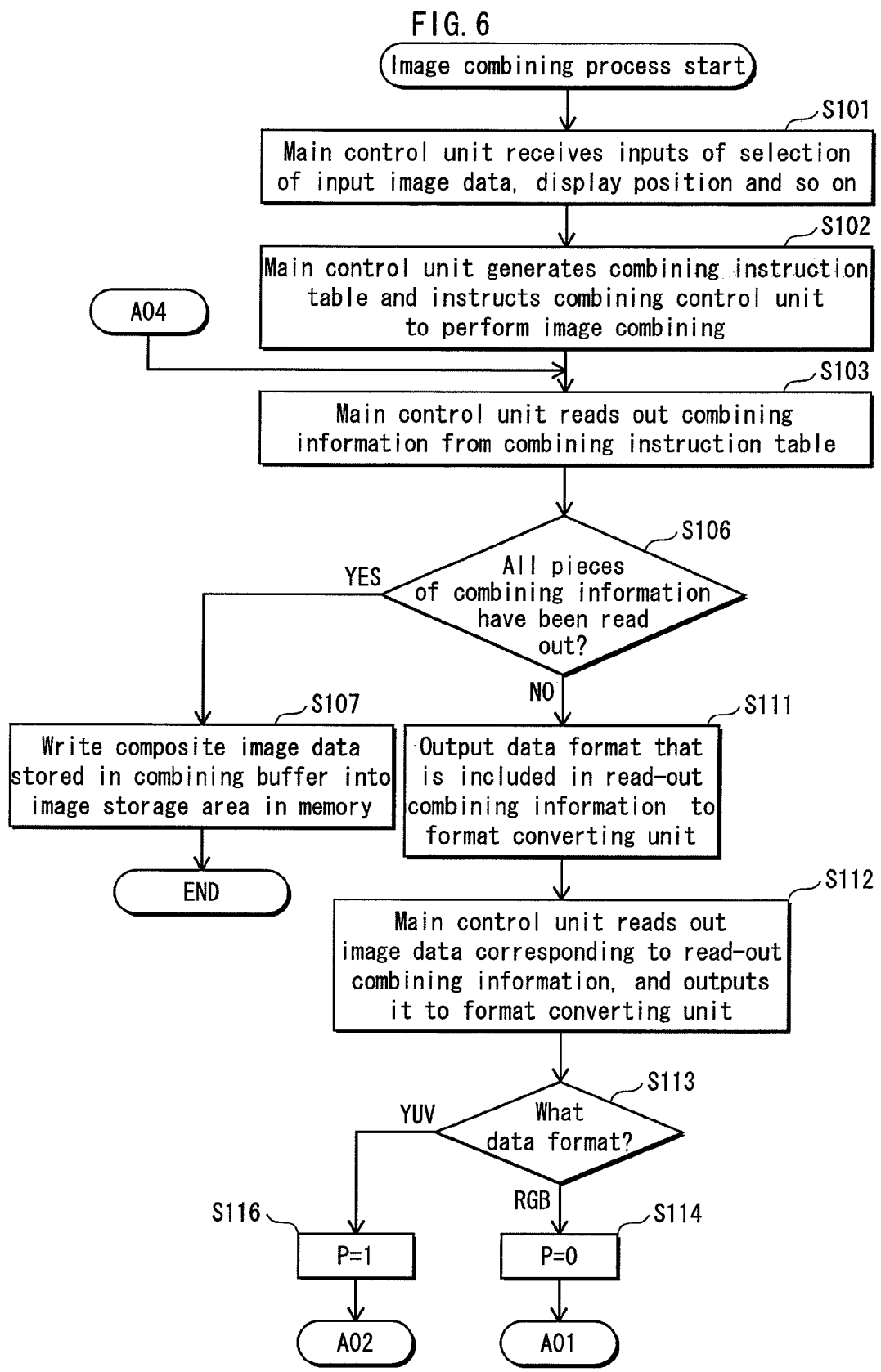
FIG. 6 is a flowchart of the operation of the image combining device 100 in the image combining process.
Figure 7:
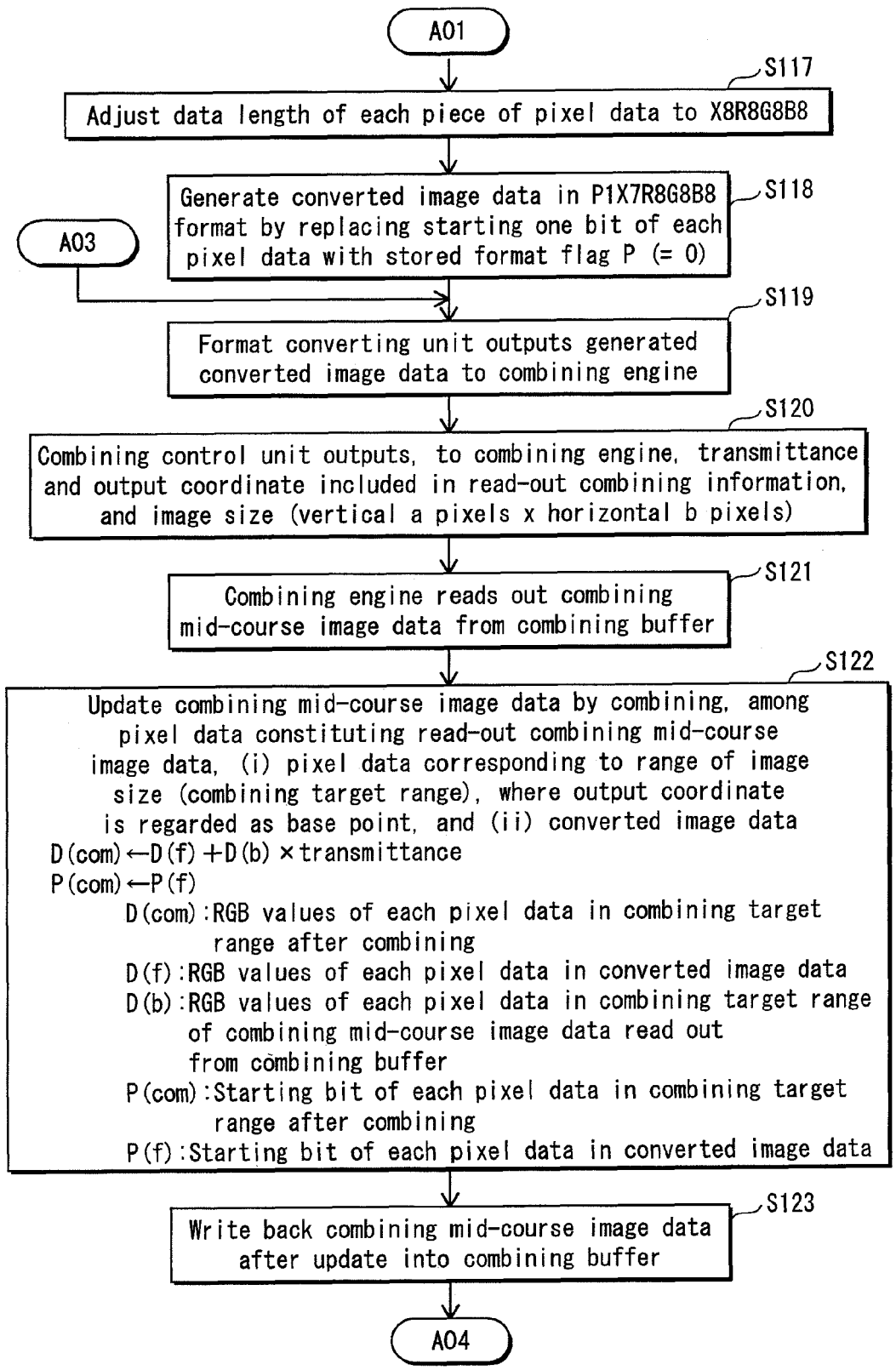
FIG. 7 is a flowchart of the operation of the image combining device 100 in the image combining process, continued from step S114 in FIG. 6.
Figure 8:
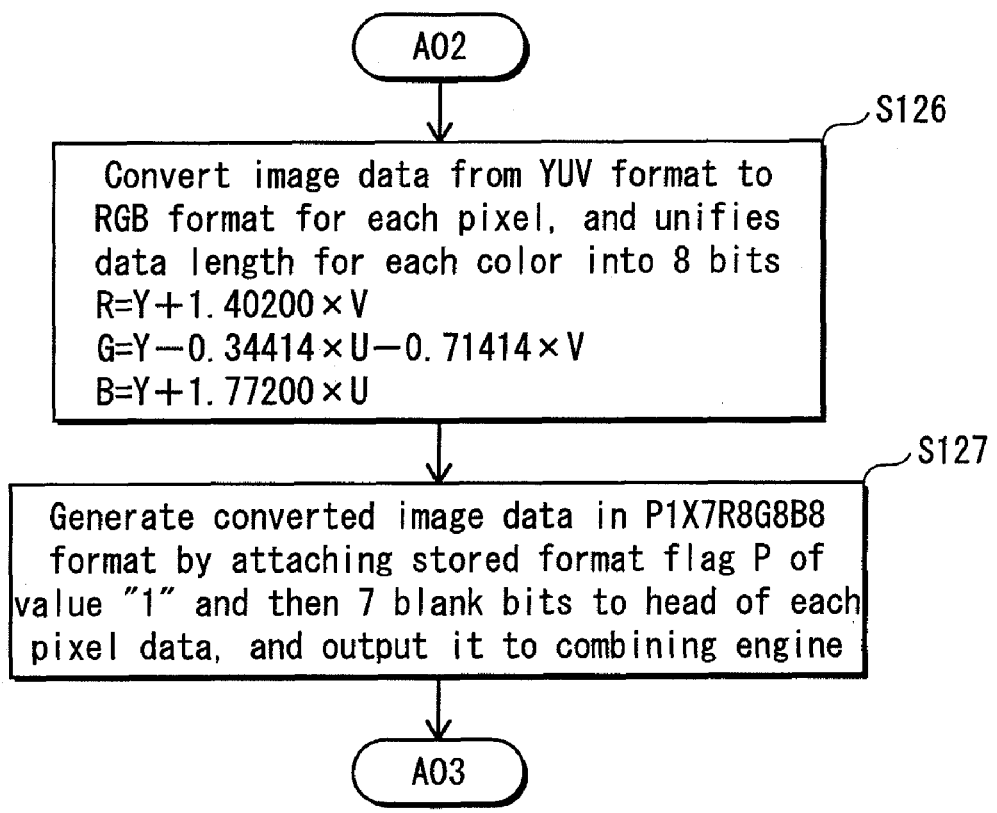
FIG. 8 is a flowchart of the operation of the image combining device 100 in the image combining process, continued from step S116 in FIG. 6.

FIGS. 6 through 8 are flowcharts of the operation of the image combining device 100 in the image combining process. Here, the operation of the image combining device 100 in the image combining process will be described with reference to FIGS. 6 through 8.

When it receives a request for generating a composite image from the user, the main control unit 104 displays a predetermined input screen on the display unit 102, and receives inputs of selection of input image data, a display position and the like (step S101). Next, the main control unit 104 generates the combining instruction table based on the received information, and writes the generated combining instruction table into the general area 111 in the memory 101, and instructs the combining control unit 141 to perform the image combining (step S102).

The combining control unit 141 in the image processing unit 105, upon receiving an instruction for combining images from the main control unit 104, retrieves a piece of combining information from the combining instruction table 112 stored in the general area 111 of the memory 101 (step S103).

When it is judged that all pieces of combining information have been read out (Yes in step S106), the combining control unit 141 reads out the combining mid-course image data from the combining buffer 144, and writes the read-out combining mid-course image data into the image storage area 121 in the memory 101, as the composite image data (step S107).

When it is judged that all pieces of combining information have not been read out (No in step S106), the combining control unit 141 outputs the data format that is included in the retrieved combining information to the format converting unit 142 (step S111). Following this, the combining control unit 141 reads out image data corresponding to the retrieved combining information, and outputs the read-out image data to the format converting unit 142 (step S112).

When the data format received from the combining control unit 141 is the RGB format, the format converting unit 142 generates a one-bit format flag P with value "0", and temporarily stores the generated flag (step S114).

Next, the format converting unit 142 adjusts the bit length of each piece of pixel data constituting the received image data to X8R8G8B8 (step S117). Next, the format converting unit 142 generates converted image data in the P1X7R8G8B8 format by replacing starting one bit of each piece of pixel data with the stored format flag P (=0) (step S118), and outputs the generated converted image data to the combining engine 143 (step S119).

The combining control unit 141 outputs, to the combining engine 143, the values of transmittance and output coordinate included in the retrieved combining information, and the image size (vertical a pixels×horizontal b pixels) of the image that corresponds to the retrieved combining information (step S120).

The combining engine 143 receives the transmittance, output coordinate, and image size from the combining control unit 141. The combining engine 143 also receives the converted image data from the format converting unit 142. Upon receiving these, the combining engine 143 reads out the combining mid-course image data from the combining buffer 144 (step S121). The combining engine 143 then updates the mid-course image data by combining, among a plurality of pieces of pixel data constituting the read-out combining mid-course image data, (i) each piece of pixel data corresponding to each pixel belonging to a range of image size (combining target range), where the output coordinate is regarded as the base point, and (ii) each piece of pixel data corresponding to each pixel constituting the converted image data (step S122).

Next, the combining engine 143 writes back combining mid-course image data after the update into the combining buffer (step S123).

When the data format received from the combining control unit 141 is the YUV format, the format converting unit 142 generates a one-bit format flag P with value "1", and temporarily stores the generated flag (step S116).

Also, the format converting unit 142 receives the input image data from the combining control unit 141. The format converting unit 142 converts the received image data from the YUV format to the R8G8B8 format (step S126).

Next, the format converting unit 142 generates converted image data in the P1X7R8G8B8 format by attaching the stored format flag P of value "1" and seven blank bits to the head of each piece of pixel data (step S127).

Next, the format converting unit 142 goes to step S119.

(2) Composite Image Editing Process

Figure 9:
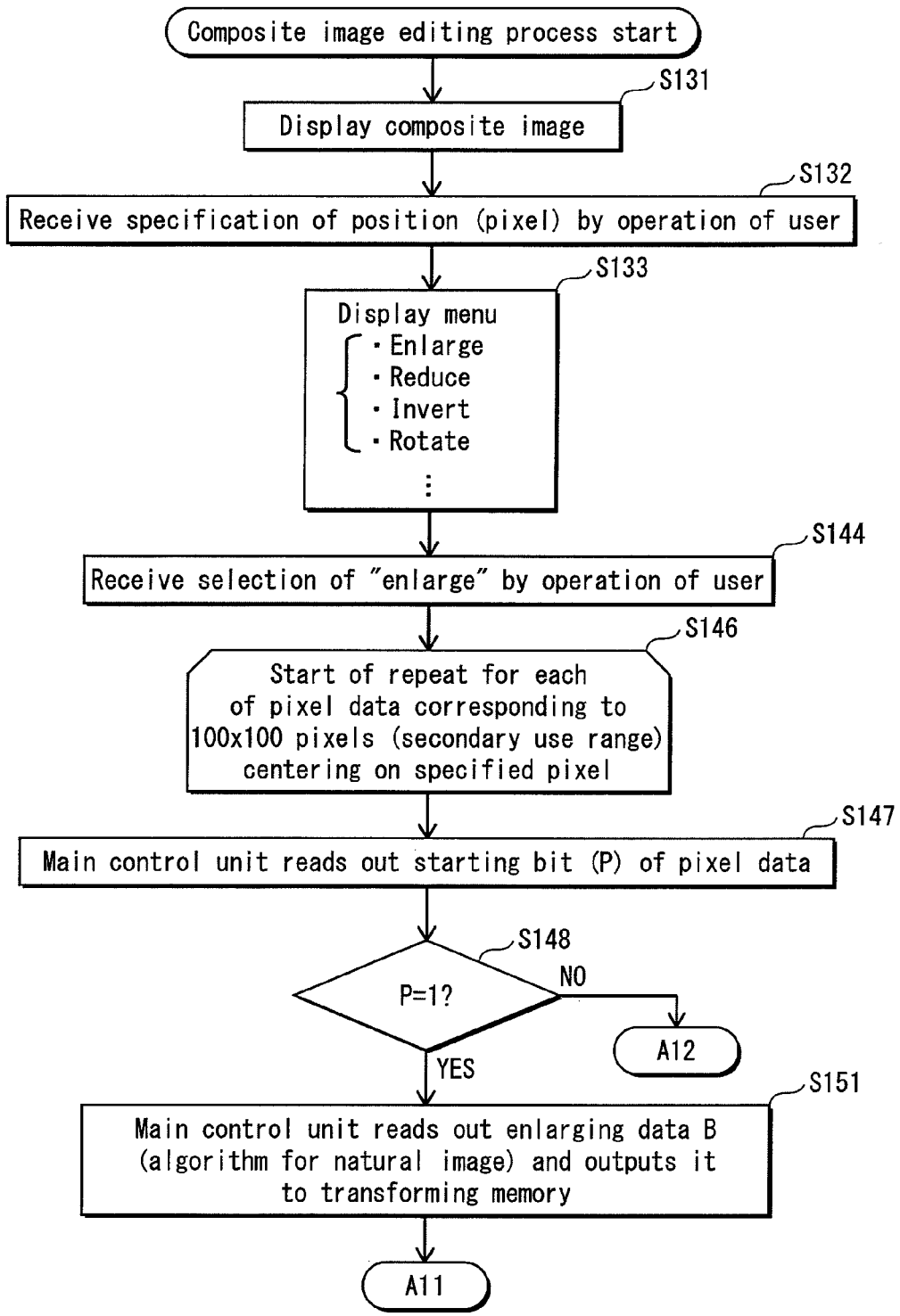
FIG. 9 is a flowchart of the operation of the image combining device 100 in the process of editing the composite image data.
Figure 10:
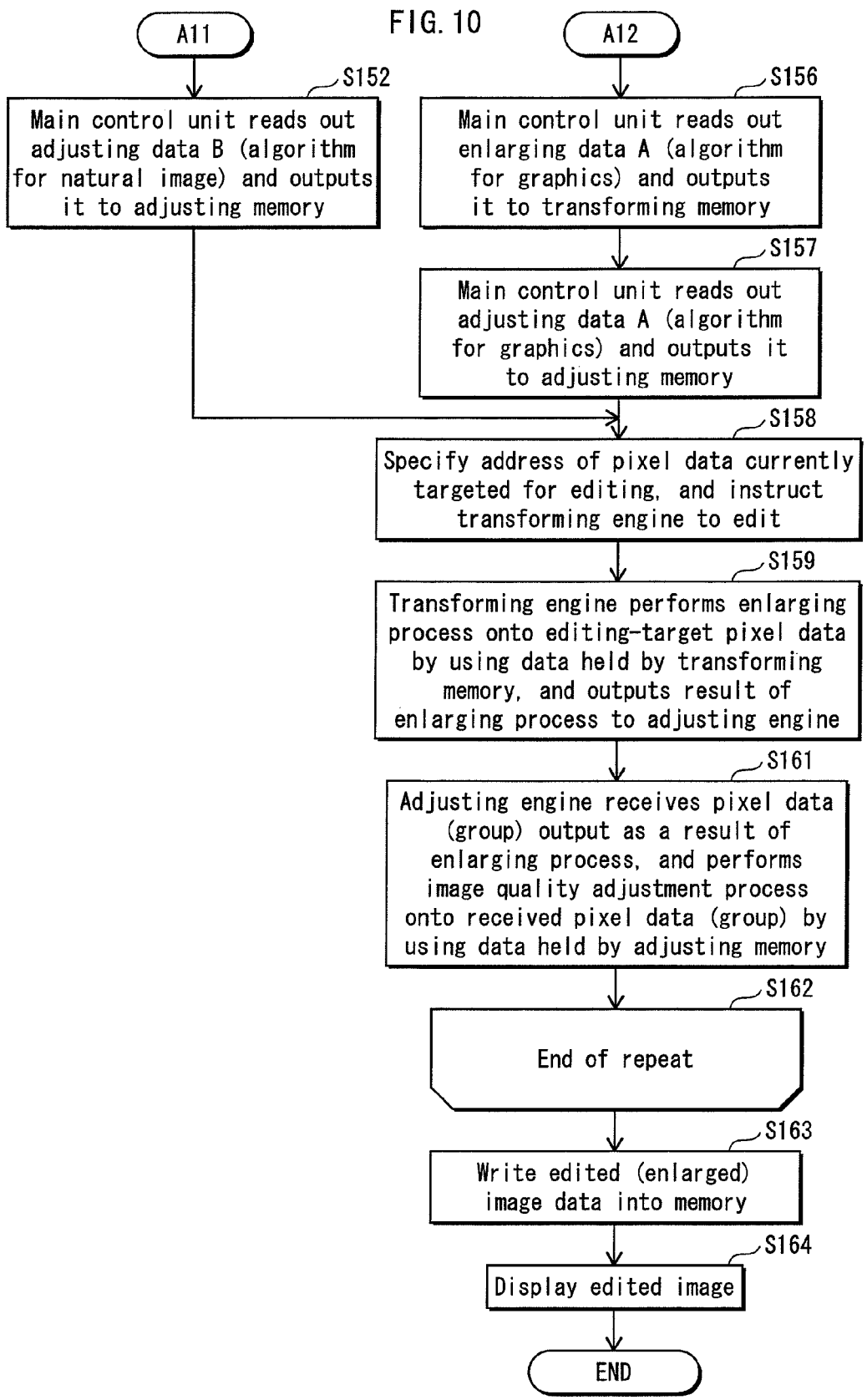
FIG. 10 is a flowchart of the operation of the image combining device 100 in the process of editing the composite image data, continued from FIG. 9.

FIGS. 9 through 10 are flowcharts of the operation of the image combining device 100 in the process of editing the composite image data. Here, the operation of the image combining device 100 in the process of editing the composite image data will be described with reference to FIGS. 9 through 10. Note that in the following description, enlargement of a part of the composite image will be described as one example of the editing process.

The main control unit 104 displays the composite image 127*g* on the display unit 102 in accordance with an operation of the user (step S131).

The user specifies a desired position by operating the mouse or cursor to move the pointer 161 on the composite image 127*g*.

The main control unit 104 receives specification of a position by the operation of the user (step S132). Upon receiving the specification of the position, the main control unit 104 displays the menu (step S133). In the list, names of editing processes such as "enlarge" and "reduce" are provided.

Next, the main control unit 104 receives a selection of "enlarge" by the operation of the user (step S144).

When "enlarge" is selected, during the process of steps S146 through S162, the main control unit 104 generates an edited image (enlarged image) by enlarging an area of 100× 100 pixels centering on the specified position on the composite image 127*g*, by repeating the process of steps S146 through S161 onto each piece of pixel data in the area (hereinafter referred to as secondary use range) of 100×100 pixels centering on the specified position on the composite image 127*g*.

The main control unit 104 reads out the first bit (P) of the pixel data (step S147).

When the value of the read-out first bit P is "1" (Yes in step S148), the main control unit 104 reads out the enlarging data B (not illustrated) from the general area 111 in the memory 101, and outputs the read-out enlarging data B to the transforming memory 146 (step S151). Here, the enlarging data B includes a function and parameter that comply with an algorithm suitable for enlarging a natural image in the P1X7R8G8B8 format.

The main control unit 104 then reads out the adjusting data B118, and outputs the read-out adjusting data B118 to the adjusting memory 148 (step S152). As described above, the adjusting data B 118 includes a function and parameter that comply with an algorithm suitable for enlarging a natural image in the P1X7R8G8B8 format. Next, the main control unit 104 moves to step S158.

When the value of the read-out first bit P is "0" (No in step S148), the main control unit reads out the enlarging data A from the general area 111 in the memory 101, and outputs the read-out enlarging data A 113 to the transforming memory 146 (step S156). Here, the enlarging data A 113 includes a function and parameter that comply with an algorithm suitable for enlarging a graphics image in the P1X7R8G8B8 format.

The main control unit 104 then reads out the adjusting data A 117 from the memory 101, and outputs the read-out adjusting data A 117 to the adjusting memory 148 (step S157). The adjusting data A 117 includes a function and parameter that comply with an algorithm suitable for enlarging a graphics image in the P1X7R8G8B8 format generated by the computer.

Next, the main control unit 104 specifies an address in the memory 101 storing the pixel data which is currently targeted for the editing, and instructs the transforming engine to edit (in the present example, enlarge) (step S158).

The transforming engine 147 receives, from the main control unit 104, the address of the editing-target pixel data and the instruction for editing. Upon receiving the instruction for editing, the transforming engine 147 reads out the pixel data from the specified address, performs the enlarging process onto the read-out pixel data by using the function and parameter held by the transforming memory 146, and outputs the result of the enlarging process to the adjusting engine 149 (step S159). Here, with the enlarging process, a plurality of pieces of pixel data are output in correspondence with one original piece of pixel data. Hereinafter, the plurality of pieces of pixel data that are output in correspondence with one original piece of pixel data are referred to as pixel data (group).

The adjusting engine 149 receives the pixel data (group) output as a result of the enlarging process by the transforming engine 147, and performs the image quality adjustment process onto the received pixel data (group) by using the function and parameter stored in the adjusting memory 148.

When it has processed all pieces of pixel data in the secondary use range by repetition (step S162), the adjusting engine 149 writes edited image data, which is composed of the pixel data group after the enlarging and adjustment processes, into the image storage area 121 in the memory 101.

The main control unit 104 reads out the edited image data 128 from the image storage area 121 in the memory 101, generates the edited image 128*g* based on the read-out edited image data 128, and displays the generated edited image 128*g* on the display unit 102 (step S163).

1.4 Summary

As described above, in the image combining process, the image combining device 100 of the present invention embeds a format flag into each piece of pixel data constituting the composite image data, where the format flag indicates the format of the image data before combining: the RGB format; or the YUV format.

The data in the RGB format is often graphics data or text data having been generated with use of a computer. Also, the image data in the YUV format has often been generated based on a natural image taken with use of a digital camera or the like.

Accordingly, with respect to editing and adjusting the composite image, the optimum methods for the editing and adjusting image quality are different between a part of the composite image generated based on the image data in the RGB format and a part of the composite image generated based on the image data.

With the above-described structure of the present invention in which a format flag is preliminarily embedded in each piece of pixel data constituting the composite image data, it is possible to edit and adjust each part of the composite image data by the optimum method therefore when the composite image data is subjected to an editing process such as enlarging and image quality adjustment process.

2. Embodiment 2

The following describes an image combining device 200 in Embodiment 2 of the present invention with reference to the attached drawings.

2.1 Overview

The image combining device 200 in Embodiment 2 performs an editing process, such as enlarging or reducing, onto combining-target image data according to an instruction from the user, and then converts the image format into the R8G8B8 format. The image combining device 200 also generates a one-bit format flag that indicates the format of the image data before conversion.

The image combining device 200 generates composite image data in the R8G8B8 format by combining a plurality of pieces of converted image data by using the equations shown in Embodiment 1.

In parallel with the combining of the plurality of pieces of image data, a format flag group is generated, where the format flag group is composed of format flags corresponding to the pixels constituting the composite image. For example, when the composite image is composed of n×m pixels (n and m are integers), the format flag group is n×m-bit data composed of n×m format flags that are arranged in order from upper-left to bottom-right in correspondence with the pixels.

In Embodiment 2, different from Embodiment 1, the image data does not include blank bits. This makes it possible to reduce the total data amount of the composite image.

2.2 Structure

Figure 11:
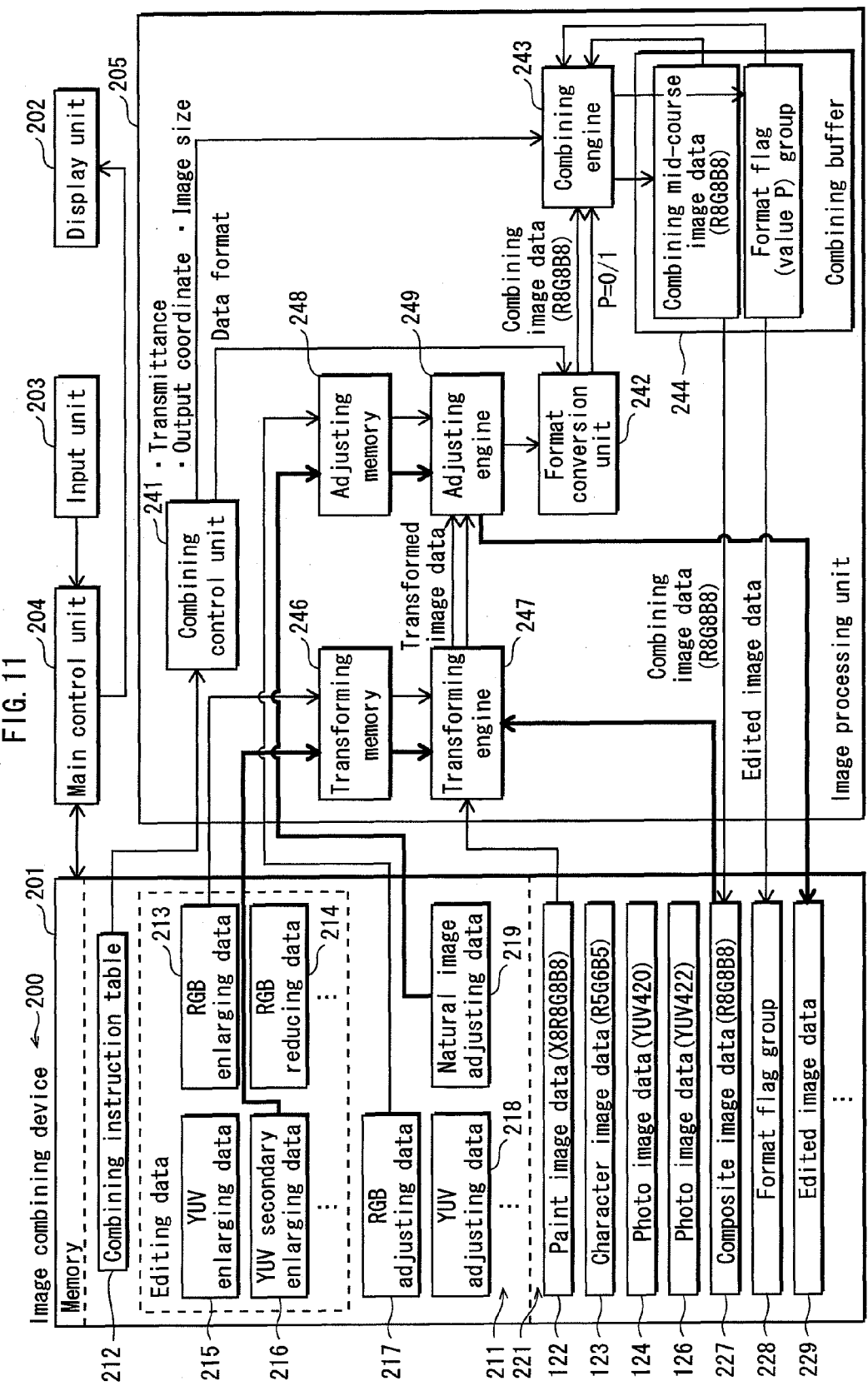
FIG. 11 is a block diagram showing the functional structure of the image combining device 200 in Embodiment 2.

FIG. 11 is a block diagram showing the functional structure of the image combining device 200. In FIG. 11, the arrows indicate the flow of data in the image combining process (which will be described later), and the thick-line arrows indicate the flow of data in the composite image editing process (which will be described later).

As shown in FIG. 11, the image combining device 200 includes a memory 201, a display unit 202, an input unit 203, a main control unit 204, and an image processing unit 205. The image processing unit 205 includes a combining control unit 241, a format conversion unit 242, a combining engine 243, a combining buffer 244, a transforming memory 246, a transforming engine 247, an adjusting memory 248, and an adjusting engine 249.

The image combining device 200 is more specifically a computer system including a microprocessor, a RAM, and a ROM. A computer program is recorded in the RAM and ROM. The image combining device 200 achieves part of its functions as the microprocessor operates in accordance with the computer program. Here, the computer program is composed of a plurality of instruction codes which each instruct the computer to achieve a predetermined function.

The following will describe each constitutional element in detail. Note that the structure and operation of the input unit 203, the display unit 202, the transforming memory 246, and the adjusting memory 248 are the same as those of the input unit 103, the display unit 102, the transforming memory 146, and the adjusting memory 148, and therefore description thereof is omitted here.

Also, the transforming engine 247 and the adjusting engine 249 differ from the transforming engine 147 and the adjusting engine 149 of Embodiment 1 in that they operate in accordance with an instruction from the combining control unit 241, as well as in accordance with an instruction from the main control unit 204. The transforming engine 247 and the adjusting engine 249 also differ from the transforming engine 147 and the adjusting engine 149 in that, upon receiving an instruction to pause, they output the received pixel data to the next functional unit as it is, and in that the destination of the data output from the adjusting engine 249 is the format converting unit 242. Other than these, the transforming engine 247 and the adjusting engine 249 are functional units that edit the input data by using the function and parameter held by the corresponding memory, as is the case with the transforming engine 147 and the adjusting engine 149 of Embodiment 1. Thus detailed description of the transforming engine 247 and the adjusting engine 249 is omitted here.

(1) Memory 201

The memory 201 includes a hard disk unit, and includes, inside thereof, a general area 211 and an image storage area 221, where the image storage area 221 stores image data in accordance with a user operation.

The general area 211 includes, as one example, a combining instruction table 212, RGB enlarging data 213, RGB reducing data 214, YUV enlarging data 215, YUV secondary enlarging data 216, RGB adjusting data 217, YUV adjusting data 218, and natural image adjusting data 219. The image storage area 221 stores, as one example, paint image data 122, character image data 123, photo image data 124, photo image data 126, composite image data 227, format flag group 228, and edited image data 229.

The drawing indicates the state inside the memory 201 at the point in time when the composite image data 227 and the edited image data 229, which is generated by editing the composite image data 227, have been generated in accordance with operations of the user.

(1-1) Combining Instruction Table 212

FIG. 12 shows details of the combining instruction table 212. As shown in FIG. 12, the combining instruction table 212 includes a plurality of (in the present example, four) pieces of combining information 231, 232, 233, and 234. The plurality of pieces of combining information respectively correspond to paint image data 122, character the image data 123, photo image data 124, and photo image data 126.

Each piece of combining information includes: "input image data", "data format", "layering order", "output coordinate", "transformation information", "image quality adjustment information", and "transmittance". Of these, description of "input image data", "data format", "layering order", "output coordinate", and "transmittance" is omitted here since they are the same as "input image data", "data format", "layering order", "output coordinate", and "transmittance" included in the combining instruction table 112 of Embodiment 1.

The "transformation information" is information that indicates whether an editing process is performed before the corresponding image data is combined with other data, and indicates which editing process is performed if an editing process is performed. When no editing process is performed before the corresponding image data is combined, the combining information may not include the "transformation information".

The "image quality adjustment information" is information that indicates whether or not the image quality adjustment process needs to be performed before the corresponding image data is combined with other data. When the "image quality adjustment information" is "Necessary", it indicates that the image quality adjustment process needs to be performed; and when the "image quality adjustment information" is "Unnecessary", it indicates that the image quality adjustment process does not need to be performed.

As one example of the combining information, combining information 231 corresponds to the paint image data 122, and includes: "X8R8G8B8" as "data format"; "3" as "layering order"; "(100,100)" as "output coordinate"; "1.4 times" as "transformation information"; and "Necessary" as "image quality adjustment information". This indicates that before the paint image data 122 in the X8R8G8B8 format is subjected to the combining process, the paint image data 122 is enlarged 1.4 times and is subjected to the image quality adjustment. The information also indicates that the image generated based on the image data after the enlarging and image quality adjustment is displayed in a predetermined range, starting with the coordinate (100,100) in the composite image after the combining process, and that the image is displayed as the third layer from the back when a plurality of images are displayed in layers.

Also, as another example of the combining information, combining information 233 corresponds to the photo image data 124, and includes: "YUV422" as "data format"; "1" as "layering order"; "(400,150)" as "output coordinate"; "left-right inversion" as "transformation information"; and "Unnecessary" as "image quality adjustment information". This indicates that before the photo image data 124 in the YUV422 format is subjected to the combining process, the photo image data 124 is subjected to the left-right inversion, and is not subjected to the image quality adjustment. The information also indicates that the image generated based on the image data after the left-right inversion is displayed in a predetermined range, starting with the coordinate (400,150) in the composite image after the combining process, and that the image is displayed as the first layer from the back when a plurality of images are displayed in layers, and part of it is hidden behind another image when displayed.

(1-2) Editing Data

In the following, as in Embodiment 1, data that is temporarily transferred to the transforming memory 246 to be edited by the transforming engine 247 is generically called editing data.

The RGB enlarging data 213 includes a function and parameter that are necessary for enlarging the image data in the RGB format.

The RGB reducing data includes a function and parameter that are necessary for reducing the image data in the RGB format.

The YUV enlarging data 215 includes a function and parameter that are necessary for enlarging the image data in the YUV format.

The secondary YUV enlarging data 216 includes a function and parameter that are suited for enlarging a part of composite image data 227 (which will be described later) generated by combining together various pieces of image data, the part having been in the YUV format before the combining.

Further, although not illustrated, the editing data may include RGB inverting data, RGB rotating data, YUV inverting data, and YUV rotating data, where the RGB inverting data is used in the process of inverting image data in the RGB format, the RGB rotating data is used in the process of rotating image data in the RGB format, the YUV inverting data is used in the process of inverting image data in the YUV format, and the YUV inverting data is used in the process of rotating image data in the YUV format, in addition to the above-described editing data.

Further, although not illustrated, the editing data may include editing data (secondary editing data) that is dedicated to the data format of the image data before the combining, such as YUV secondary reducing data and YUV secondary inverting data, as well as the YUV secondary enlarging data 216, and the editing of the composite image data may be performed using these data appropriately.

(1-3) Adjusting Data

The RGB adjusting data 217 includes a function and parameter that are suited for adjusting the image quality of the image data in the RGB format.

The YUV adjusting data 218 includes a function and parameter that are suited for adjusting the image quality of the image data in the YUV format.

The natural image adjusting data 219 includes a function and parameter that are suited for adjusting the image quality of the image data in the RGB format representing a natural image. More specifically, the reasons are as follows. It is expected that, in many cases, the composite image data represents a natural image when it was in the YUV format before the combining. Accordingly, when a part of the composite image data 227 in the R8G8B8 format was in the YUV format before the combining, the natural image adjusting data 219 is used to adjust the image quality of the part.

Although only three types of adjusting data are described in the present example, many other types of adjusting data, such as the image quality adjustment data for the rotating process and the enlarging process, may be stored as well so that an optimum image quality adjustment can be achieved for each type of editing process.

(1-4) Image Data

Description of the paint image data 122, the character image data 123, the photo image data 124, and the photo image data 126 is omitted here since they are the same as those having been described in Embodiment 1.

Figure 13:
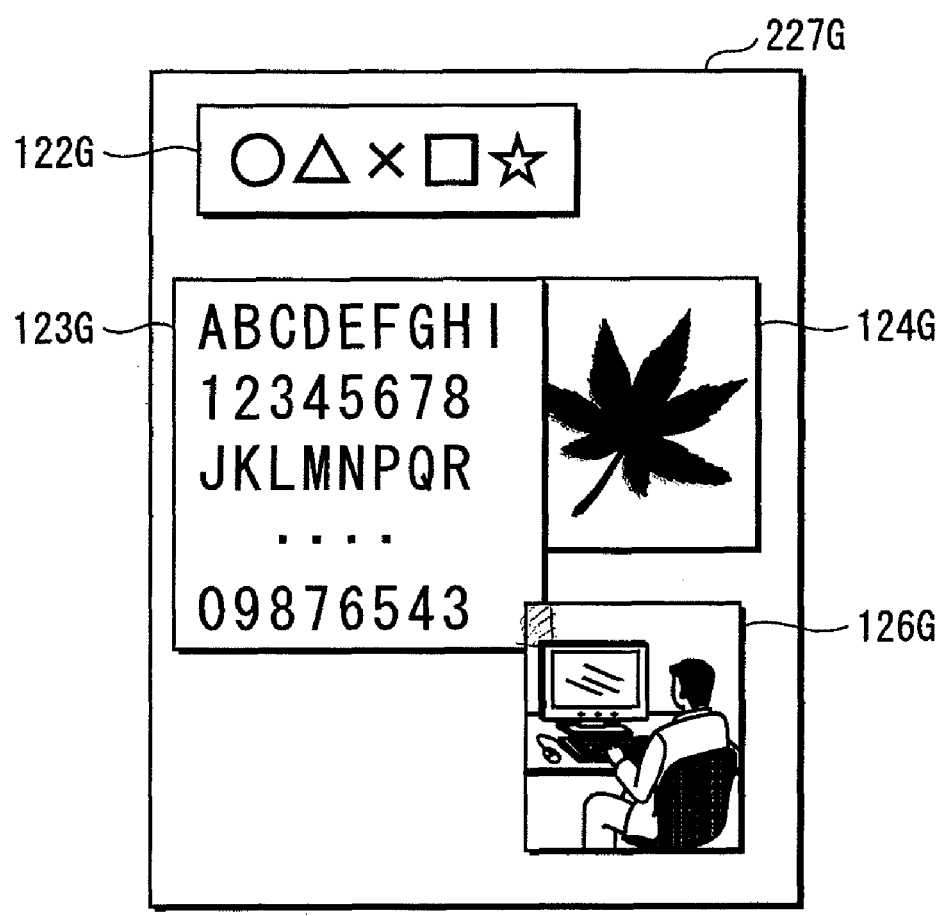
FIG. 13 shows a composite image that is displayed based on the composite image data generated in accordance with the combining instruction table 212.

The composite image data 227 is image data that is generated by combining together the paint image data 122, the character image data 123, the photo image data 124, and the photo image data 126 in accordance with the combining instruction table 212. FIG. 13 shows composite image 227*g* that is displayed based on the composite image data 227. The composite image 227*g* includes: a paint image 122G which is a result of enlarging the paint image 122*g* 1.4 times; a character image 123G which is a result of enlarging the paint image 122*g* 1.2 times; a photo image 124G which is a result of left-right inverting the photo image 124*g*; and a photo image 126G which is a result of reducing the photo image 126*g* to 0.8 times. The character image 123G, the photo image 124G, and the photo image 126G overlap with each other partially, where the photo image 126G is displayed as the first layer from the front, the character image 123G is displayed as the second layer from the front, and the photo image 124G is displayed as the first layer from the back.

The format flag group 228 is formed by arranging a plurality of one-bit format flags in order from upper-left to bottom-right in correspondence with the pixels constituting the composite image 227*g*, where each format flag indicates whether a corresponding piece of pixel data was in the RGB format or in the YUV format before the combining.

Note that a format flag that corresponds to the pixels in areas in which any of the paint image 122G, character image 123G, photo image 124G, and photo image 126G is not displayed is "0", indicating the RGB format.

The edited image data 229 is generated by further performing editing such as enlarging or reducing onto part or all of the composite image data 227 in the R8G8B8 format.

(2) Combining Control Unit 241

The combining control unit 241 has a function to control the operation of the constituent elements by outputting control signals (not illustrated) thereto in the process of generating the composite image data.

The combining control unit 241 receives an instruction for combining images from the main control unit 204. Upon receiving an instruction for combining images, the combining control unit 241 initializes the combining buffer 244. The combining mid-course image data and format flag group immediately after the initialization will be described later.

Next, the combining control unit 241 retrieves a plurality of pieces of combining information, in order from the smallest value of the layering order, from the combining instruction table 212 stored in a predetermined area in the general area 211 of the memory 201.

Next, the combining control unit 241 reads out editing data that is suited for the transformation information included in the retrieved combining information, from the general area 211 in the memory 201, and writes the read-out editing data into the transforming memory 246. Note that in the case of enlarging, reducing, or rotating, the scaling factor or rotation angle that is included, as the transformation information, in the retrieved combining information is also written into the transforming memory 246.

Note that when "Unnecessary" is written as "transformation information", the combining control unit 241 instructs the transforming engine 247 to pause.

Similarly, when "Necessary" is written as "image quality adjustment information", which indicates that the image quality adjustment needs to be performed, in the retrieved combining information, the combining control unit 241 reads out optimum adjustment data from the memory based on the data format included in the retrieved combining information, and outputs the read-out adjustment data to the adjusting memory 248. When "Necessary" is written as "image quality adjustment information", the combining control unit 241 instructs the adjusting engine 249 to pause.

The combining control unit 241 then outputs the data format included in the retrieved combining information to the format converting unit 242. Also, the combining control unit 241 outputs the transmittance and output coordinate included in the retrieved combining information to the combining engine 243. The combining control unit 241 detects an image size (horizontal a pixels X vertical b pixels) that corresponds to the retrieved combining information, and outputs the detected image size to the combining engine 243.

Note that when "enlarging" or "reducing" is written as "transformation information" in the retrieved combining information, the combining control unit 241 respectively multiplies the vertical and horizontal number of pixels by the scaling factor (a←a×scaling factor, b←b×scaling factor), and outputs the value "horizontal a pixels×vertical b pixels" that is obtained by the multiplications as the image size.

Also, when rotation (rotation angle r) is written as the "transformation information" in the retrieved combining information, the combining control unit 241 outputs "horizontal a pixels X vertical b pixels" and the rotation angle r, as the image size.

The combining control unit 241 performs the above-described process onto all pieces of combining information in order from the smallest value of the layering order. In the case of the combining instruction table 212 shown in FIG. 12, the combining control unit 241 retrieves the combining information in the order of the combining information 233, 231, and 234, and performs the above-described process.

When all pieces of combining information have been read out, the combining control unit 241 reads out the combining mid-course image data from the combining buffer 244, and writes the read-out combining mid-course image data into the image storage area 221 in the memory 201, as the composite image data 227. The combining control unit 241 also reads out the format flag group from the combining buffer 244, and stores the read-out format flag group into the image storage area 221 in the memory 201 in association with the composite image data 227.

After the writing is completed, the combining control unit 241 notifies the completion of the image combining process to the main control unit 204.

(3) Format Converting Unit 242

The format converting unit 242 receives the data format of the image data targeted for the format conversion. When the received data format is the RGB format, the format converting unit 242 generates a format flag P of one-bit length with value "0"; and when the received data format is the YUV format, the format converting unit 242 generates the format flag P with value "1". The format converting unit 242 then temporarily stores the generated format flag P.

Next, the format converting unit 242 receives, from the adjusting engine 249, image data on which an editing and/or image quality adjustment has been performed as necessary (hereinafter, the image data is referred to as adjusted image data). The data format of the adjusted image data received here is the same as the data format that is received from the combining control unit 241.

The format converting unit 242 generates combining image data by converting the image data received from the adjusting engine 249 into the R8G8B8 format, and outputs the generated combining image data and the stored format flag to the combining engine 243.

More specifically, when the data format received from the combining control unit 241 is R8G8B8, the format converting unit 242 outputs, as it is, the image data received from the adjusting engine 249 to the combining engine 243 as the combining image data. Together with the combining image data, the format converting unit 242 outputs the format flag P with value "0" to the combining engine 243.

Also, when the data format received from the combining control unit 241 is X8R8G8B8, the format converting unit 242 generates the combining image data in the R8G8B8 format by deleting the starting eight bits from each piece of pixel data.

When the data format received from the combining control unit 241 is YUV 420, the format converting unit 242 generates the combining image data in the R8G8B8 format by converting the data into the RGB format using the following three equations and adjusting the data length for each color to eight bits.

$$R = Y + 1.40200 \times V$$

$$G = Y - 0.34414 \times U - 0.71414 \times V$$

$$B = Y + 1.77200 \times U$$

(4) Combining Buffer 244

The combining buffer 244 stores (i) image data (combining mid-course image data) in the mid-course of the combining process performed by the combining engine 243, and (ii) a format flag group.

The combining mid-course image data is formed by arranging a plurality of pieces of pixel data in order from upper-left to bottom-right on the screen in correspondence with the pixels (n×n pixels) in the monitor provided in the display unit 202. The format flag group is n×m-bit data composed of a plurality of format flags that correspond to the pixel data constituting the combining mid-course image data.

At the booting of the device or immediately after an initialization, the combining buffer 244 stores predetermined background image data as the combining mid-course image data. Also, by the booting or initialization, all format flags constituting the format flag group are initialized to "0".

(5) Combining Engine 243

The combining engine 243 receives the transmittance, output coordinate, and image size from the combining control unit 241.

The combining engine 243 also receives the combining image data in the R8G8B8 format and the format flag P from the format converting unit 242.

Upon receiving these, the combining engine 243 reads out the combining mid-course image data from the combining buffer 244. Here, for the sake of descriptional convenience, the received output position is treated as the base point on the composite image 227g, and the range defined by the image size is referred to as the combining target range.

The combining engine 243 combines the received combining image data with a part, which corresponds to the combining target range, of the read-out combining mid-course image data. More specifically, the combining engine 243 updates the mid-course image data by first calculating, using the following equation, the value of each color component (represented as "D (com)") of the new pixel data by combining (i) the value of each color component (represented as "D (b)") of each color component of the pixel data of each pixel included in the combining target range, and (ii) the value of each color component (represented as "D (f)") of each color component of corresponding pixel data of the received image data, and then replacing the value of each color component D(b) of the pixel data in the mid-course image data with the value of each color component D(com) of the new pixel data.

$$D(com)=D(f)+D(b)\times transmittance$$

Next, the combining engine 243 reads out the format flag group, and replaces all parts of the read-out format flag group that correspond to the pixels constituting the combining target range, with the received format flag P.

The combining engine 243 writes back the combining mid-course image data having been updated in the above-described procedure, and the format flag group into the combining buffer 244.

(6) Main Control Unit 204

The main control unit 204 receives a user operation via the input unit 203, and controls the components of the image combining device 200 in accordance with the received user operation.

The main control unit 204 also receives a request for combining images, via the input unit 203.

The main control unit 204 also displays the composite image 227g on the display unit 202, and receives a specification of a predetermined position in the composite image.

(6-1) Control of Image Combining Process

When it receives a request for combining images from the user, the main control unit 204 displays a predetermined input screen, and receives inputs of selections of combining-target images, display positions of the selected images, a layering order, whether or not to perform editing and/or image quality adjustment, and a transmittance. Next, the main control unit 204 generates the combining instruction table 212 based on the input information, writes the generated combining instruction table 212 into a predetermined area in the general area 211 in the memory 201, and instructs the combining control unit 241 to combine the images.

Next, the main control unit 204 receives a completion notification and information (for example, an identifier or an address) indicating the generated composite image data from the combining control unit 241, where the completion notification indicates that the image combining process has been completed.

Upon receiving these, the main control unit 204 reads out the composite image data 227 from the image storage area 221 in the memory 201, generates a composite image from the read-out composite image data, and displays the generated composite image 227g onto the display unit 202.

(6-2) Control of Editing Composite Image

While the composite image 227g is displayed on the display unit 202, the main control unit receives a specification of a position (pixel) in the composite image 227g via the input unit 203.

Upon receiving the specification of the position, the main control unit 204 displays a menu at a position near the specified position. Alternatively, the main control unit 204 may generate a menu screen and display the generated menu screen.

In the list, names of available editing processes are provided (for example, "enlarge", "reduce", "invert", and so on). The main control unit 204 then receives a selection of an editing process from the user.

Upon receiving the selection of the editing process, the main control unit 204 determines an editing target range (hereinafter referred to as "secondary use range") depending on the selected editing process. For example, the main control unit 204 determines a range of 100×100 pixels centering on the specified position as the secondary use range when "enlarge" is selected; the main control unit 204 determines a range of 300×300 pixels centering on the specified position as the secondary use range when "reduce" is selected; and the main control unit 204 determines the whole screen as the secondary use range when "rotate" is selected.

Alternatively, the main control unit 204 may display a screen that urges the user to select an editing target range, thereby determining the secondary use range.

Next, the main control unit 204 reads out, one bit by one bit, parts (format flags) of the format flag group 228 that correspond to the secondary use range. The main control unit 204 reads out, from the general area 211 in the memory 201, the editing data corresponding to the read-out format flags and the selected editing process, and outputs the read-out editing data to the transforming memory 246. The main control unit 204 also reads out, from the general area 211 in the memory 201, adjustment data that is necessary judging from the read-out format flags and the selected editing process, and outputs the read-out adjustment data to the adjusting memory 248.

For example, when the user selects "enlarge", and a read-out format flag P has value "1", the main control unit 204 reads out the YUV secondary enlarging data 216 from the general area 211 in the memory 201, and outputs the read-out YUV secondary enlarging data to the transforming memory 246. The main control unit 204 then reads out the natural image adjustment data, and outputs the read-out natural image adjustment data to the adjusting memory 248.

Next, the main control unit 204 specifies, in the composite image data, a position of a piece of pixel data that corresponds to the read-out format flag, and instructs the transforming engine 247 to perform the editing based on the specified position.

The main control unit 204 generates edited image data by repeating the above-described process for each pixel included in the secondary use range, controlling the transforming engine 247 and the adjusting engine 249, and writes the generated edited image data 229 into the image storage area in the memory 201.

Next, the main control unit 204 reads out the edited image data 229, generates an edited image from the edited image data, and displays the generated edited image onto the display unit 202.

2.3 Operation

The following describes the operation of the image combining device 200 with reference to the attached drawings.

(1) Operation for Image Combining

Figure 14:
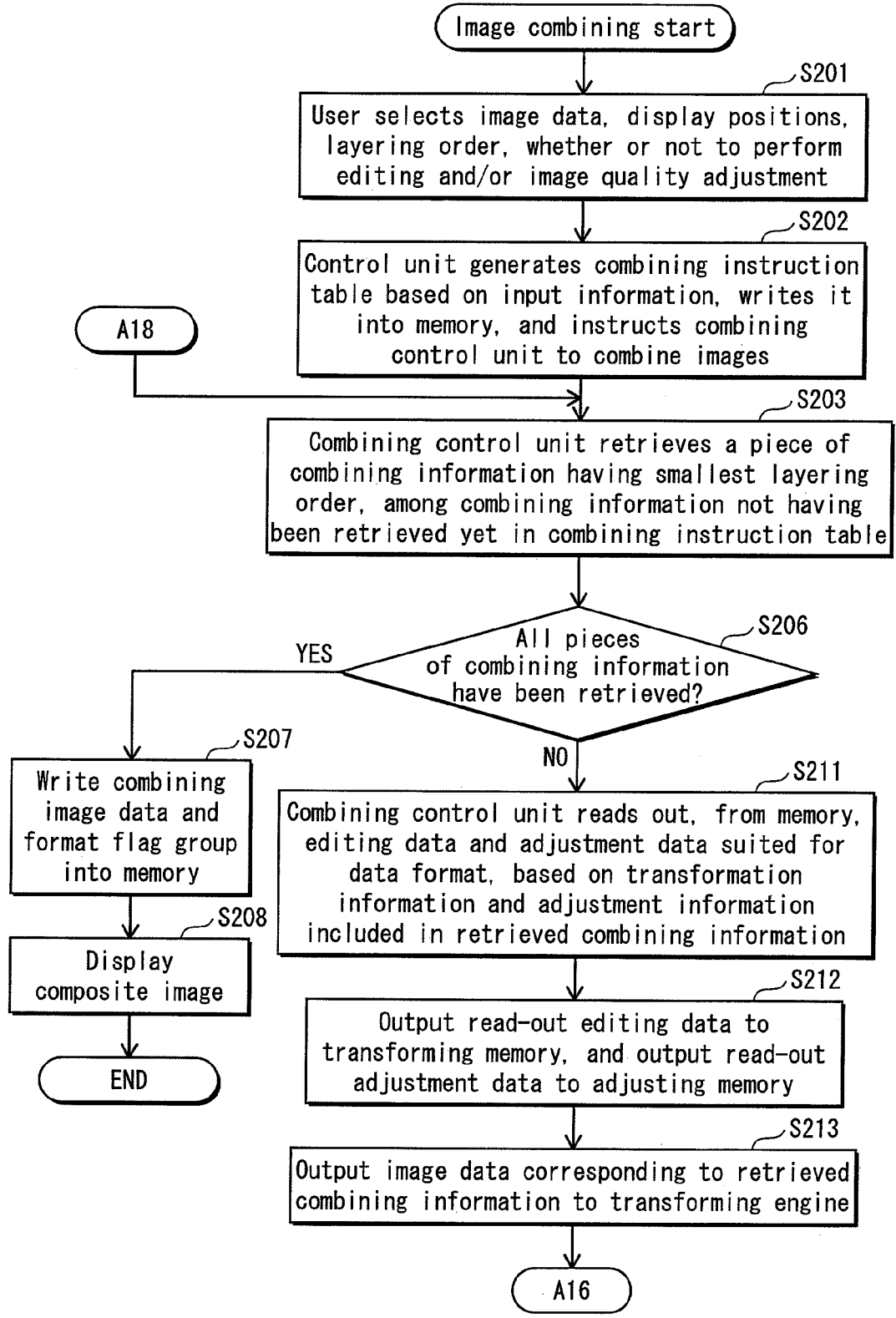
FIG. 14 is a flowchart of the operation of the image combining device 200 in the image combining process.
Figure 15:
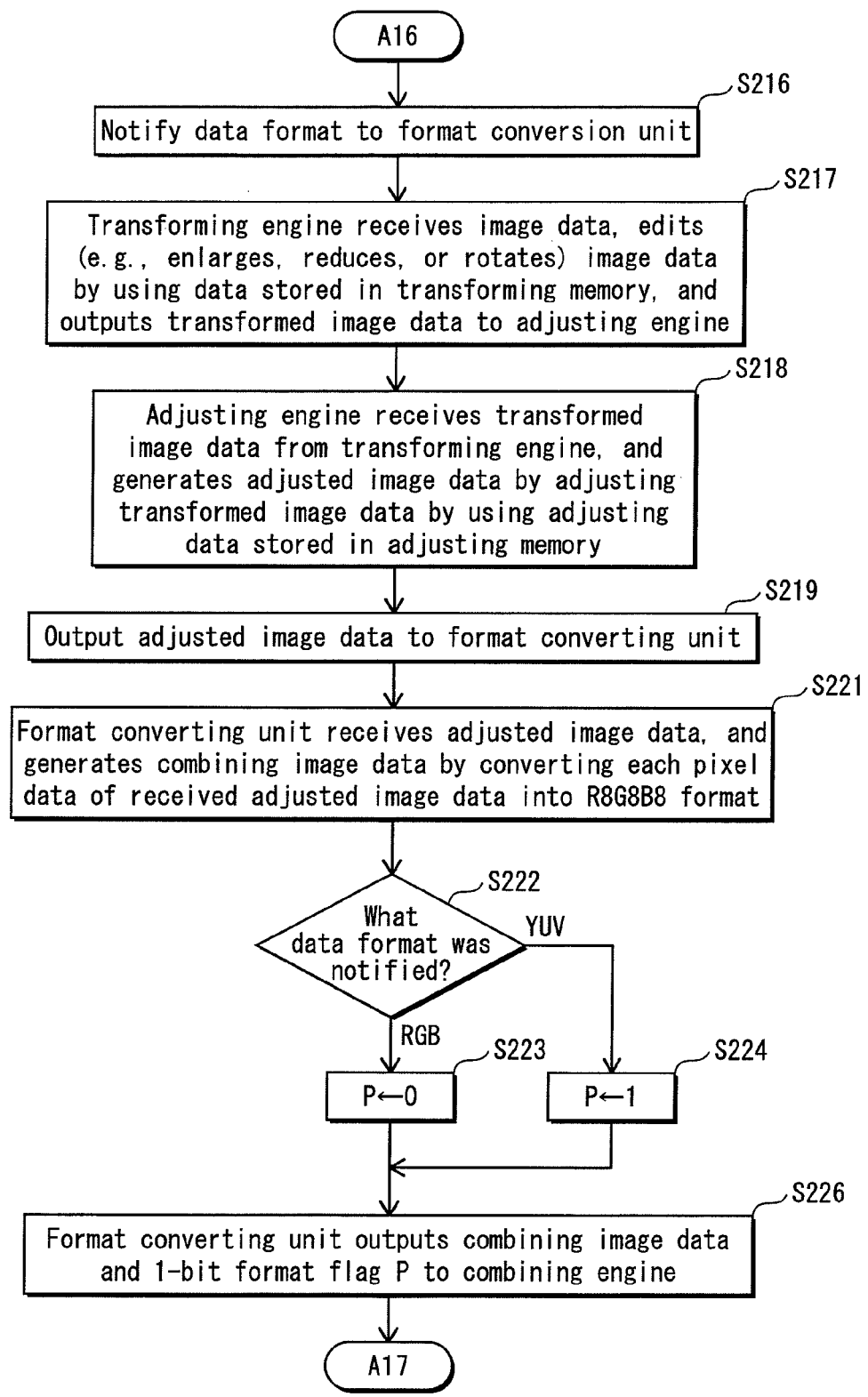
FIG. 15 is a flowchart of the operation of the image combining device 200 in the image combining process, continued from step S213 in FIG. 14.
Figure 16:
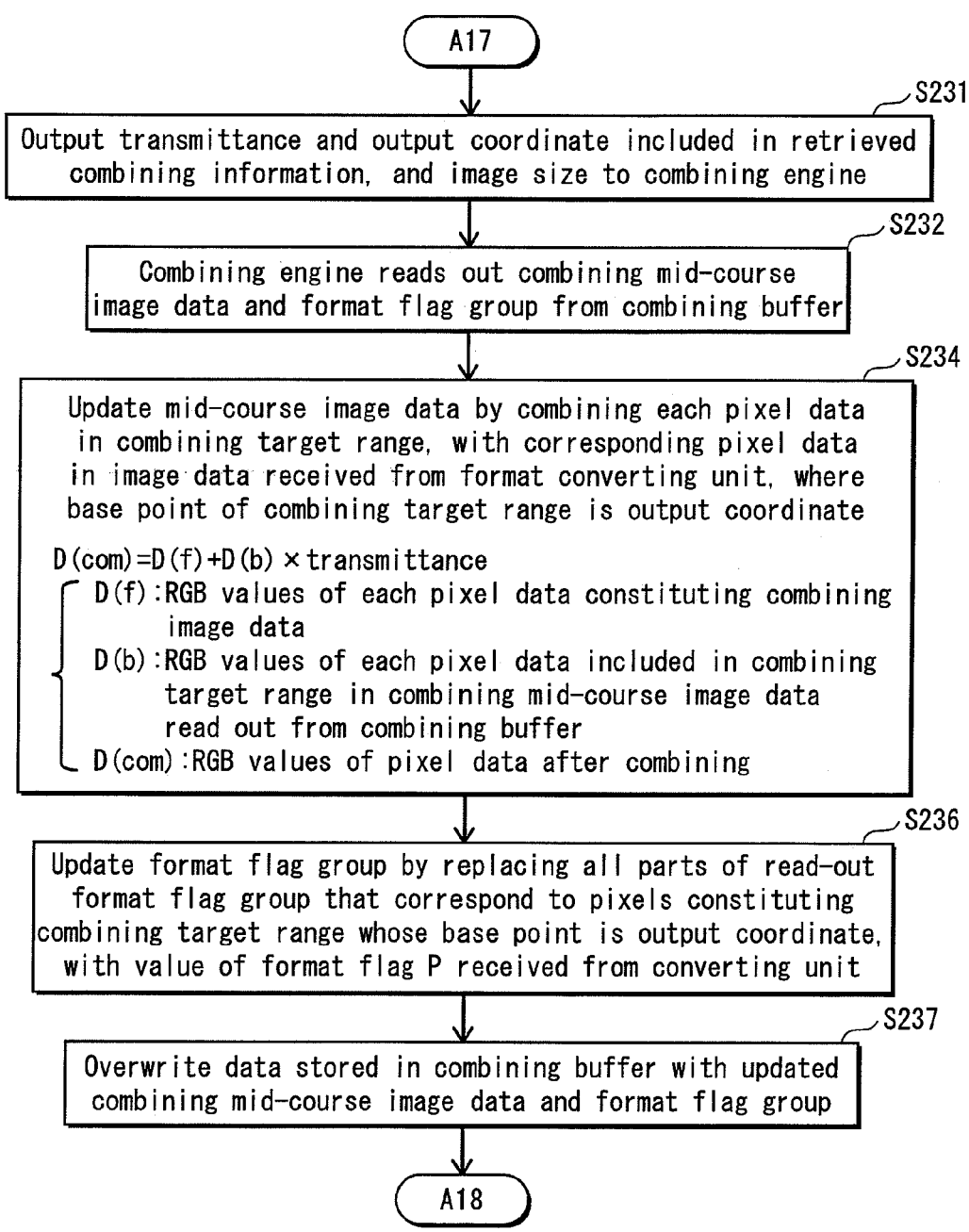
FIG. 16 is a flowchart of the operation of the image combining device 200 in the image combining process, continued from step S226 in FIG. 15.

FIGS. 14 through 16 are flowcharts of the operation of the image combining device 200 in the image combining process. Here, the operation of the image combining device 200 in the image combining process will be described with reference to FIGS. 14 through 16.

When it receives a request for combining images from the user, the main control unit 204 displays a predetermined input screen, and receives inputs of selections of combining-target images, display positions of the selected images, a layering order, whether or not to perform editing and/or image quality adjustment, and a transmittance (step S201). Next, the main control unit 204 generates the combining instruction table 212 based on the input information, writes the generated combining instruction table 212 into a predetermined area in the general area 211 in the memory 201, and instructs the combining control unit 241 to combine the images (step S202).

Upon receiving the instruction for combining images, the combining control unit 241 retrieves a piece of combining information having the smallest value of the layering order, among the combining information that are included in the combining instruction table 212 and have not been retrieved yet, the combining instruction table 212 being stored in a predetermined area in the general area 211 of the memory 201 (step S203). After this step, when it is judged that all pieces of combining information included in the combining instruction table 212 have already been retrieved (Yes in step S206), the control goes to step S207.

When it is judged that not all pieces of combining information included in the combining instruction table 212 have been retrieved (No in step S206), the combining control unit 241 reads out, from the memory 201, editing data and adjustment data that are suited for the data format, based on the data format, transformation information, and image quality adjustment information included in the retrieved combining information (step S211). The combining control unit 241 then writes the read-out editing data into the transforming memory 246, and writes the read-out adjustment data into the adjusting memory 248 (step S212).

Next, the combining control unit 241 reads out, from the image storage area 221 in the memory 201, image data that corresponds to the combining information, and outputs the read-out image data to the transforming engine 247 (step S213).

Next, the combining control unit 241 notifies the data format included in the retrieved combining information to the format converting unit 242 (step S216).

The transforming engine 247 receives image data, and generates transformed image data by editing (for example, enlarging, reducing, or rotating) the received image data using the function and parameter stored in the transforming memory 246. Next, the transforming engine 247 outputs the generated transformed image data to the adjusting engine 249 (step S217).

The adjusting engine 249 receives the transformed image data from the transforming engine 247, and generates adjusted image data by performing the image quality adjustment process onto the received transformed image data using the function and parameter stored in the adjusting memory 248 (step S218). Next, the adjusting engine 249 outputs the generated adjusted image data to the format converting unit 242 (step S219).

The format converting unit 242 receives the adjusted image data from the adjusting engine 249, and receives the data format from the combining control unit 241. Note that the data format of the adjusted image data received from the adjusting engine 249 should match the data format received from the combining control unit 241.

Upon receiving these, the format converting unit 242 generates combining image data by converting the data format of the received image data into the R8G8B8 format, based on the data format received from the combining control unit 241 (step S221).

Next, when the received data format is the RGB format, the format converting unit 242 generates a format flag of one-bit length with value "0" (step S223). When the received data format is the YUV format, the format converting unit 242 generates a format flag of one-bit length with value "1" (step S224).

Next, the format converting unit 242 outputs the generated combining image data and one-bit format flag P to the combining engine 243 (step S226).

The combining control unit 241 then outputs, to the combining engine 243, the transmittance and output coordinate included in the retrieved combining information, and an image size that corresponds to the retrieved combining information (step S231).

The combining engine 243 receives the transmittance, output coordinate, and image size from the combining control unit 241. The combining engine 243 also receives the combining image data and the format flag P from the format converting unit 242.

Upon receiving these, the combining engine 243 reads out the combining mid-course image data and the format flag group from the combining buffer 244 (step S232).

The combining engine 243 then updates the mid-course image data by combining, using the following equation, the pixel data in the combining target range with the corresponding pixel data in the combining target data, and replacing the pixel data before the combining with the pixel data after the combining, where the base point of the combining target range is the output coordinate, and the combining target range is defined by the image size (step S234).

$$D(com) = D(f) + D(b) \times \text{transmittance}$$

D(f): value of each color component of corresponding pixel data in the combining target data D(b): Value of each color component of corresponding pixel data in the combining target range in the combining mid-course image data D(com): Value of each color component of pixel data in composite image data The combining engine 243 updates the format flag group by replacing all parts of the read-out format flag group that correspond to the pixels constituting the combining target range, with the received format flag P (step S236).

Next, the combining engine 243 overwrites the data stored in the combining buffer 244 with the updated combining mid-course image data and format flag group (step S237). After the overwriting, the image combining device 200 returns to step S203 to process the next piece of combining information.

When it is judged that all pieces of combining information have already been retrieved (Yes in step S206), the combining control unit 241 reads out the combining mid-course image data from the combining buffer 244, and writes the read-out combining mid-course image data into the image storage area 221 in the memory 201 as the composite image data. The combining control unit 241 also reads out the format flag group from the combining buffer 244, and similarly writes the read-out format flag group into the image storage area in the memory 201 (step S207).

The main control unit 204 then generates a composite image from the generated composite image data, and displays the generated composite image onto the display unit 202 (step S208).

(2) Operation of Editing Composite Image Data

Figure 17:
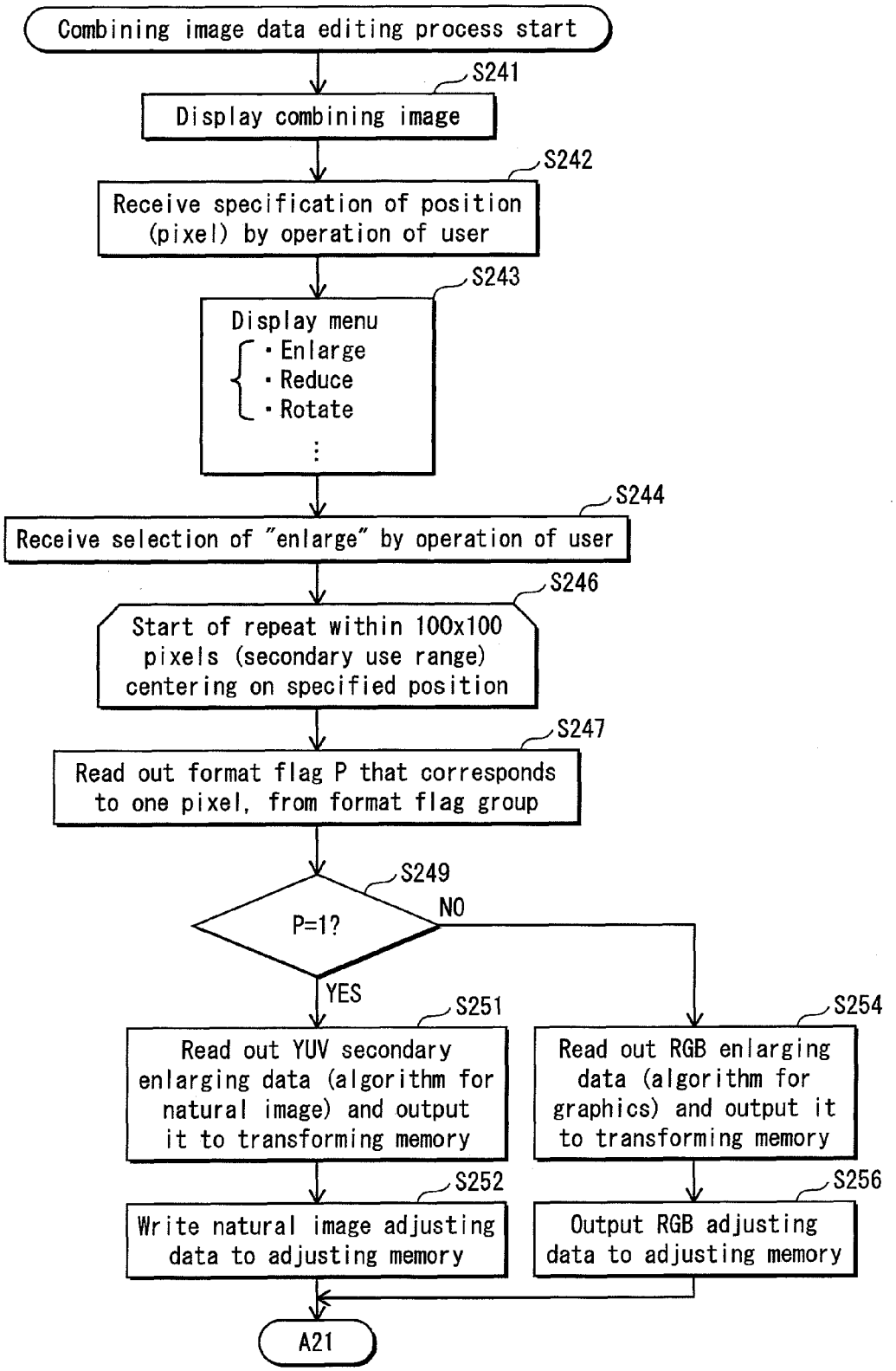
FIG. 17 is a flowchart of the operation of the image combining device 200 in the process of editing the composite image data 227.
Figure 18:
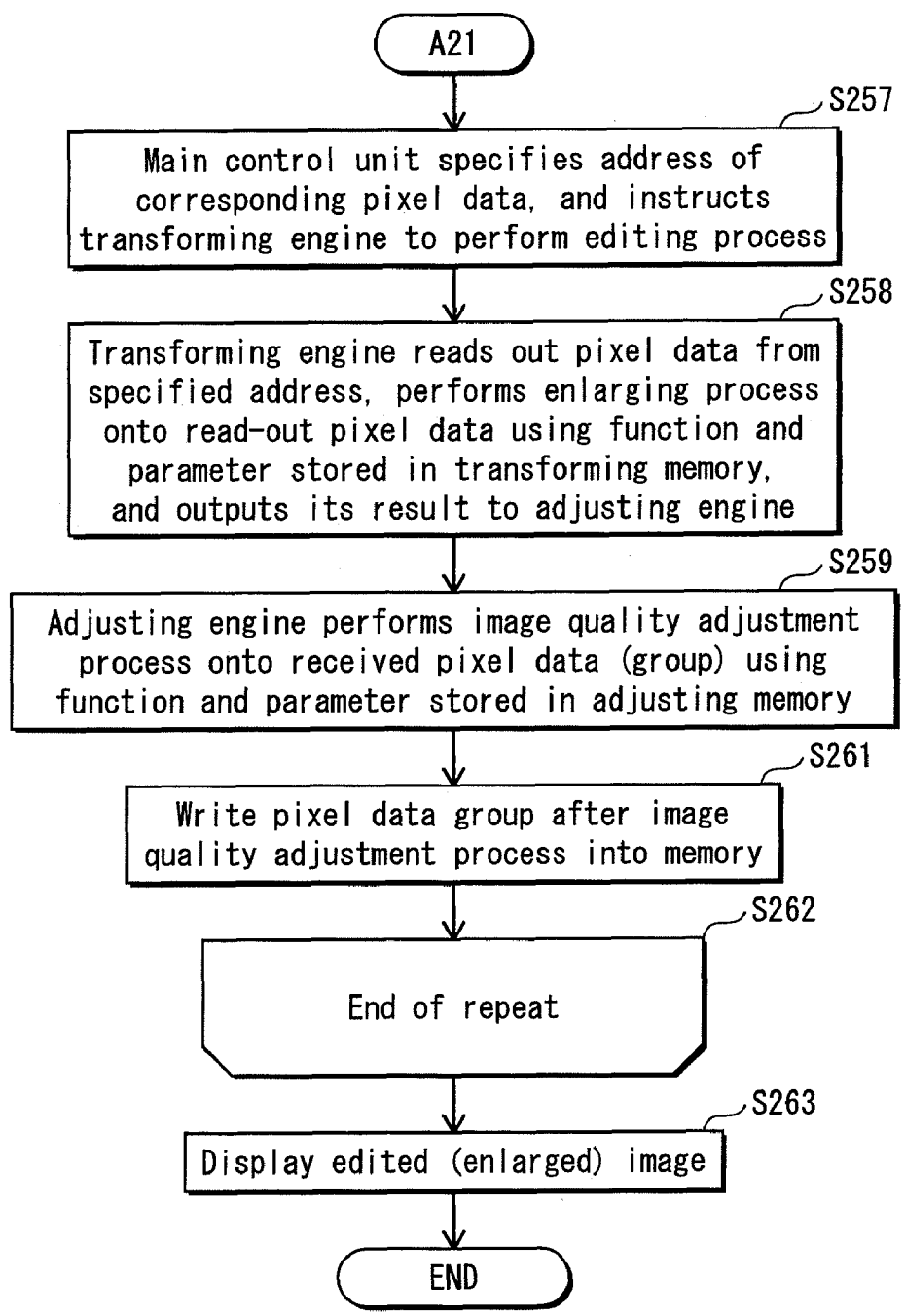
FIG. 18 is a flowchart of the operation of the image combining device 200 in the process of editing the composite image data 227, continued from FIG. 17.

FIGS. 17 through 18 are flowcharts of the operation of the image combining device 200 in the process of editing the composite image data 227 (secondary use). Here, the operation of the image combining device 200 in the process of editing the composite image data will be described with reference to FIGS. 17 through 18.

The main control unit 204 generates a composite image from the composite image data 227, and displays the generated composite image onto the display unit 202 (step S241).

Next, the main control unit 204 receives a specification of a position (pixel) from the user via the input unit 203 (step S242). Upon receiving the specification of the position, the main control unit 204 displays a menu on the display unit 202. The menu includes "enlarge", "reduce", "rotate", and so on. In the present example, the case where "enlarge" is selected will be described (step S244). When "enlarge" is selected, the main control unit 204 determines, as the secondary use range, a range of 100×100 pixels centering on the specified position.

Following this, during the process of steps S246 through S262, the main control unit 204 generates edited image data by repeating the process of steps S247 through S261 onto each piece of pixel data that corresponds to each pixel included in the secondary use range.

The main control unit 204 reads out a format flag P that corresponds to a pixel included in the secondary use range (step S247).

When the value of the read-out format flag P is "1" (Yes in step S249), the main control unit 204 reads out the YUV secondary enlarging data 216 from the general area 211 in the memory 201, and writes the read-out YUV secondary enlarging data 216 into the transforming memory 246 (step S251). Next, the main control unit 204 reads out the natural image adjusting data 219, and outputs it to the adjusting memory 248 (step S252).

When the value of the read-out format flag P is "0" (No in step S249), the main control unit 204 reads out the RGB enlarging data 213 from the general area 211 in the memory 201, and writes the read-out RGB enlarging data 213 into the transforming memory 246 (step S254). Next, the main control unit 204 reads out the RGB adjusting data 217, and writes the read-out RGB adjusting data 217 into the adjusting memory 248 (step S256).

Next, the main control unit 204 specifies an address of a piece of pixel data that corresponds to the read-out format flag, and instructs the transforming engine 247 to perform the editing process (step S257).

The transforming engine 247, in accordance with the instruction from the main control unit 204, reads out the pixel data from the specified address, performs the enlarging process onto the read-out pixel data using the function and parameter stored in the transforming memory 246. The transforming engine 247 then outputs the pixel data (group) after the enlarging process to the adjusting engine 249 (step S258).

The adjusting engine 249 receives the pixel data (group) from the transforming engine 247, performs the image quality adjustment process onto the received pixel data (group) using the function and parameter stored in the adjusting memory 248 (step S259).

Next, the adjusting engine 249 writes, into the image storage area 221 in the memory 201, a plurality of pieces of pixel data after the adjustment process one by one (step S261).

When it has processed all pieces of pixel data in the secondary use range by repetition (step S262), the main control unit 204 reads out the edited (enlarged) image data 229 that is constituted from the pixel data (group) written by the adjusting engine 249, generates an edited (enlarged) image from the read-out edited image data 229, and displays the generated edited image onto the display unit 202 (step S263).

2.4 Summary

As described above, the image combining device 200 of the present embodiment performs editing (enlarging or the like) onto the image data before combining that has the original data format, and then converts the format thereof and performs the combining process to generate the composite image data.

Also, the image combining device 200 generates the format flag group separately from each piece of pixel data constituting the composite image data. Therefore, there is no blank bit in the composite image data, thus resulting in reduction of the total amount of data.

In the present embodiment, the data format of the composite image data is R8G8B8. However, as described above, the data length of pixel data may be adjusted to 16 bits (for example, R5G6B5) or an even multiple of 16 bits so that the address management is facilitated.

3. Embodiment 3

The following describes Embodiment 3 of the present invention with reference to the attached drawings.

3.1 Overview

In the present embodiment, each piece of pixel data constituting the composite image data includes an attribute flag that indicates whether, before the combining, the pixel data had been subjected to the editing process (for example, enlarging process) and the image quality adjustment process.

There may be a case where an editing process and/or an image quality adjustment process is performed onto composite image data on which the editing process and/or the image quality adjustment process had been performed before the composite image data was generated by combining. In such a case, an unnatural image may be generated when image data having been edited and/or adjusted in image quality in the past is further edited and/or adjusted in image quality by using a function and parameter complying with the same algorithm that was used in the previous process. For example, when an image quality adjustment is performed onto image data before the combining of the image data to increase the contrast, and then an image quality adjustment is further performed onto the image data by using the same algorithm, the contrast may be increased excessively, resulting in an unnatural image. Also, when a part of an image is enlarged before the combining, and then the same part is further enlarged by using the same algorithm, the contour line may be obscured or the image quality may be lowered.

The image combining device 300 in Embodiment 3 attaches an attribute flag to each piece of pixel data constituting the composite image data, where the attribute flag indicates whether or not, before the combining, the data had been subjected to an editing and/or adjustment. Furthermore, when an editing and/or adjustment is to be performed onto apart of composite image data on which the editing and/or adjustment had been performed before the combining (hereinafter, such editing and adjustment are referred to as multiple editing and multiple adjustment, respectively), multiple editing data, which includes optimum function and parameter that are different from those used previously, is used.

With this structure, it is possible to optimize the image quality of the part on which a multiple editing and/or multiple adjustment has been performed. Note that although a variety of types of editing such as enlarging, reducing, and rotating are available, it is presumed for the sake of descriptional convenience that the image combining device in the present embodiment enlarges one or more pieces of image data selected by the user by a scaling factor "1" or higher, and also performs the image quality adjustment process as necessary.

3.2 Structure

Figure 19:
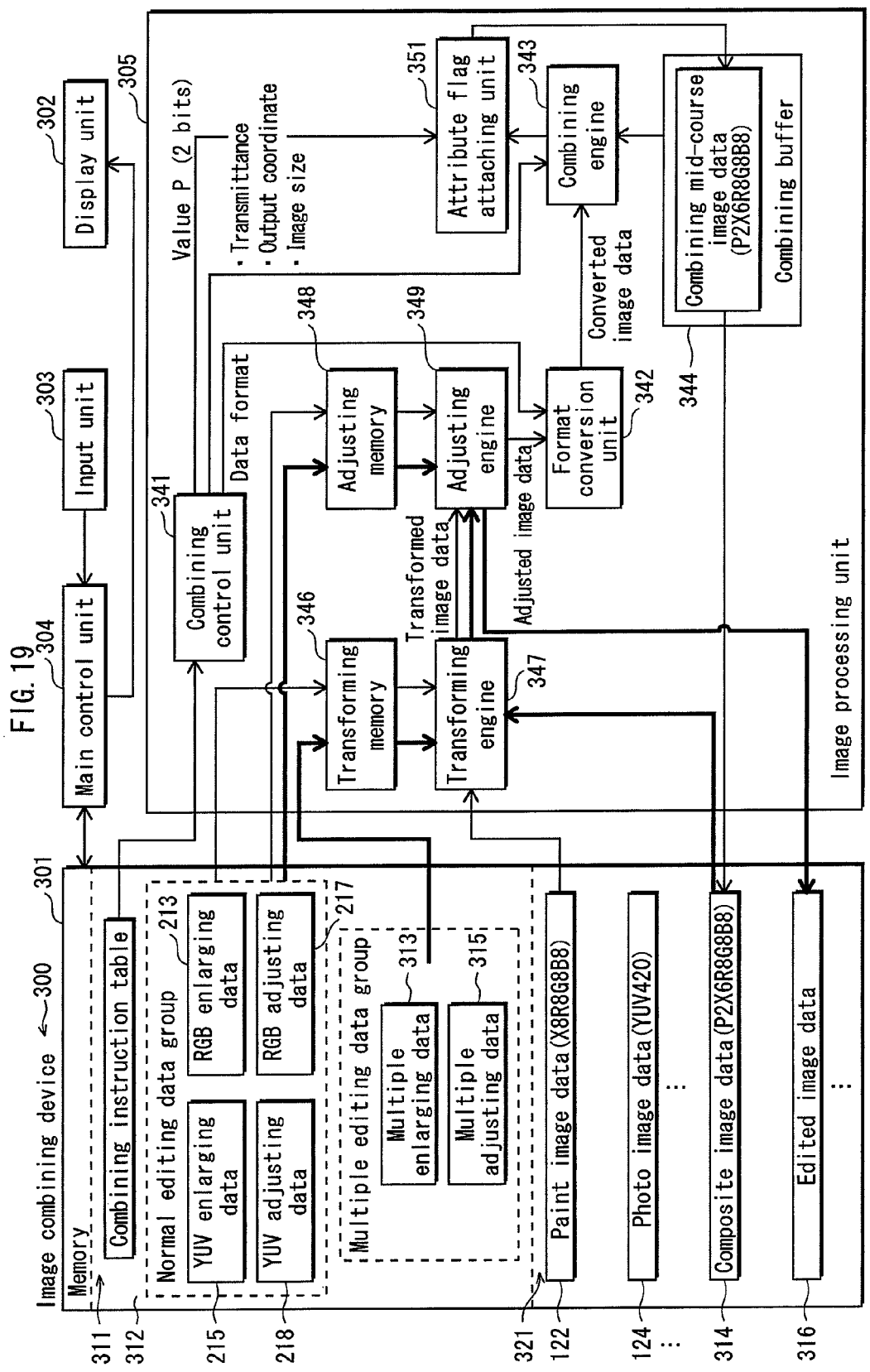
FIG. 19 is a block diagram showing the functional structure of the image combining device 300 in Embodiment 3.

FIG. 19 is a block diagram showing the functional structure of the image combining device 300 in the present embodiment. In FIG. 19, the arrows indicate the flow of data in generating composite image data 314, and the thick-line arrows indicate the flow of data in generating editing image data.

As shown in FIG. 19, the image combining device 300 includes a memory 301, a display unit 302, an input unit 303, a main control unit 304, and an image processing unit 305. The image processing unit 305 includes a combining control unit 341, a transforming memory 346, a transforming engine 347, an adjusting memory 348, an adjusting engine 349, a format conversion unit 342, a combining engine 343, a combining buffer 344, and an attribute flag attaching unit 351.

In the drawing, the same reference numbers as those used in the earlier embodiments represent the structures and data that are the same as those included in the earlier embodiments.

The image combining device 300 is more specifically a computer system including a microprocessor, a RAM, and a ROM. A computer program is recorded in the RAM and ROM. The image combining device 300 achieves part of its functions as the microprocessor operates in accordance with the computer program. Here, the computer program is composed of a plurality of instruction codes which each instruct the computer to achieve a predetermined function.

The following will describe each constitutional element in detail. Note that the structure and operation of the input unit 303, the display unit 302, and the format conversion unit 342 are the same as those included in Embodiment 2, and therefore description thereof is omitted here. Also, the transforming memory 346, transforming engine 347, adjusting memory 348, and adjusting engine 349 have the same structures and operations as the corresponding units in Embodiment 2. More specifically, they perform a process onto the input pixel data by using a function and parameter held by each memory. Thus detailed description of these units is omitted here.

(1) Memory 301

The memory 301 is composed of a hard disk unit, and includes, inside thereof, a general area 311 and an image storage area 321.

The general area 311 stores a combining instruction table 312, an RGB enlarging data 213, a YUV enlarging data 215, an RGB adjusting data 217, a YUV adjusting data 218, a multiple enlarging data 313, and a multiple adjusting data 315. In the following, the RGB enlarging data 213, YUV enlarging data 215, RGB adjusting data 217, and YUV adjusting data 218 are called a normal editing data group, and the multiple enlarging data 313 and multiple adjusting data 315 are called a multiple editing data group.

Also, although not illustrated, the general area 311 further stores a variety programs, parameters, image data and the like that are used by the main control unit 304.

The image storage area 321 stores image data such as the paint image data 122, the photo image data 124, . . . that are stored therein in accordance with user operations; and the composite image data 314 and edited image data 316 that are generated by the image combining device itself.

(1-1) Combining Instruction Table 312

The combining instruction table 312 has the same structure as the combining instruction table 212 explained in Embodiment 2, and is composed of a plurality of pieces of combining information. In the present example, however, the "transformation information" can only have "Unnecessary" or "n times" ($n \geq 1$).

Description of other detailed structures is omitted since it is the same as that of the combining instruction table 212 in Embodiment 2.

(1-2) Normal Editing Data Group

The RGB enlarging data 213, the YUV enlarging data 215, the RGB adjusting data 217 and the YUV adjusting data 218 have already been described in Embodiment 2, and description of these is omitted here.

(1-3) Multiple Enlarging Data Group

The multiple enlarging data 313 includes a function and parameter that comply with an algorithm suitable for further enlarging a part of the composite image data 314 that had been subjected to the enlarging process already before the combining.

The multiple adjusting data 315 includes a function and parameter that comply with an algorithm suitable for further adjusting in image quality a part of the composite image data 314 that had been subjected to the image quality adjustment process already before the combining.

The image quality adjustment process is roughly divided into processes of noise removal, contour enhancement, and distortion adjustment. It is presumed here that the image quality adjustment process is performed a plurality of times in accordance with the same algorithm. There is a possibility that data generated for the contour enhancement in the image quality adjustment process of the first round may be recognized as noise in the image quality adjustment process of the second round and onward.

Also, in the contour enhancement process, a part (contour) where the color density drastically changes is detected, and the high-frequency (high-density) component of the detected part is further enhanced. For such a process, for example, a secondary differentiation of input image data is used (the contour enhancement process using the secondary differentiation is described in detail in Non-Patent Document 2). There is a possibility that, in the image quality adjustment process of the second round or after, the addition component of the secondary differentiation may be erroneously recognized as a new contour.

Accordingly, for example, while the RGB adjusting data 217 and the YUV adjusting data 218 respectively include functions and parameters concerning the noise removal, contour enhancement, and distortion adjustment, the multiple adjusting data 315 includes only a function and parameter concerning the distortion adjustment.

Alternatively, each of coefficients for enhancing the contour included in the RGB adjusting data 217, the YUV adjusting data 218, and the multiple adjusting data 315 may be set to a smaller value.

(1-4) Image Data

Combining target image data, such as the paint image data 122 and the photo image data 124 have already been described in Embodiment 1, and description thereof is omitted here.

The composite image data 314 is image data that is generated by enlarging and/or adjusting in image quality the paint image data 122, the photo image data 124 and the like as necessary, and combining the resulted images. The composite image data 314 is in the P2X6R8G8B8 format. The first bit of each piece of pixel data indicates whether or not the bit data was subjected to an enlarging process in the process of combining, and the first bit with value "1" indicates that the pixel data was subjected to the enlarging process; and the first bit with value "0" indicates that the pixel data was not subjected to the enlarging process. The second bit of each piece of pixel data indicates whether or not the pixel data was subjected to an image quality adjustment process in the process of combining, and the second bit with value "1" indicates that the pixel data was subjected to the image quality adjustment process; and the second bit with value "0" indicates that the pixel data was not subjected to the image quality adjustment process. Hereinafter, the two bits at the head of each piece of pixel data are referred to as attribute bits and represented by a variable P.

The edited image data 316 is image data that is generated by editing part or all of the composite image data 314.

(2) Combining Control Unit 341

The combining control unit 341 has a function to control the operation of each functional unit by outputting control signals (not illustrated) thereto in the process of generating composite image data.

The combining control unit 341 receives an instruction for combining images from the main control unit 304. Upon receiving an instruction for combining images, the combining control unit 341 initializes the combining buffer 344. More specifically, the combining control unit 341 writes, for example, background image data in the P2X6R8G8B8 format (blueback, background image data specified by the user, or the like). In the present example, it is presumed that the attribute bits in each piece of pixel data constituting the background image data are "00".

Next, the combining control unit 341 retrieves a plurality of pieces of combining information, in order from the smallest value of the layering order, from the combining instruction table stored in a predetermined area in the memory 301.

The combining control unit 341 generates the composite image data 314 by repeating the following process for all the combining information.

That is to say, first, when the retrieved piece of combining information has "Unnecessary" as "transformation information", the combining control unit 341 instructs the transforming engine 347 to pause. When the retrieved piece of combining information does not have "Unnecessary" as "transformation information", the combining control unit 341 reads out either the RGB enlarging data 213 or the YUV enlarging data 215, based on the data format included in the retrieved piece of combining information, and writes the read-out data into the transforming memory 346. Together with this, the combining control unit 341 writes the scaling factor "n" for enlarging.

Next, when the retrieved piece of combining information has "Unnecessary" as "image quality adjustment information", the combining control unit 341 instructs the adjusting engine 349 to pause. When the retrieved piece of combining information does not have "Unnecessary" as "image quality adjustment information", the combining control unit 341 reads out either the RGB adjusting data 217 or the YUV adjusting data 218, based on the data format included in the retrieved piece of combining information, and writes the read-out data into the transforming memory 346.

The combining control unit 341 then outputs the data format included in the retrieved piece of combining information to the format conversion unit 342.

The combining control unit 341 then calculates an image size from the transformation information included in the retrieved piece of combining information, and outputs the calculated image size, output coordinate, and transmittance to the combining engine 343.

Next, the combining control unit 341 generates a 2-bit attribute flag P based on the transformation information and the image quality adjustment information included in the combination information. More specifically, when the transformation information is "Unnecessary", the combining control unit 341 sets the first bit to "0", and when the transformation information is other than "Unnecessary", the combining control unit 341 sets the first bit to "1". Also, when the image quality adjustment information is "Unnecessary", the combining control unit 341 sets the second bit to "0", and when the image quality adjustment information is other than "Unnecessary", the combining control unit 341 sets the second bit to "1". The combining control unit 341 then outputs the generated 2-bit attribute flag P to the attribute flag attaching unit 351.

The combining control unit 341 then outputs image data that corresponds to the read-out combining information, to the transforming engine 347.

The attribute flag attaching unit 351 writes back the combining mid-course image data into the combining buffer 344. After this, the above-described process is repeated for the next piece of combining information.

(3) Combining Buffer 344

The combining buffer 344 is composed of a RAM, and stores the combining mid-course image data in the mid-course of the image combining process that is performed by the combining engine 343 and the attribute flag attaching unit 351.

(4) Format Conversion Unit 342

The format conversion unit 342 receives a data format from the combining control unit 341. Also, the format conversion unit 342 receives the adjusted image data from the adjusting engine 349. Note that the data format of the adjusted image data received here should match the data format received from the combining control unit 341.

The format conversion unit 342 generates converted image data by converting the adjusted image data into the X8R8G8B8 format. The detail of the conversion performed here is the same as that in Embodiment 1, and description thereof is omitted here.

Next, the format conversion unit 342 outputs the generated converted image data to the combining engine.

(5) Combining Engine 343

The combining engine 343 receives an output coordinate, transmittance, and image size from the combining control unit 341.

Also, the combining engine 343 receives the converted image data from the format conversion unit 342. Note that an image size of a converted image that is generated based on the received converted image data should match the image size received from the combining control unit 341.

Upon receiving these, the combining engine 343 reads out the combining mid-course image data from the combining buffer 344, combines the received converted image data with a part of the read-out mid-course image data that is in a range (hereinafter referred to as combining target range) whose base point is the received output coordinate, the range being indicated by the image size. The calculations for the combining are the same as those recited in Embodiment 1, and description thereof is omitted here. At this point in time, the data format of each piece of pixel data in the combining target range is the X8R8G8B8 format.

Next, the combining engine 343 outputs the image data after the combining to the attribute flag attaching unit 351.

(6) Attribute Flag Attaching Unit 351

The attribute flag attaching unit 351 receives the 2-bit attribute flag P from the combining control unit 341, and temporarily stores the received attribute flag P.

Next, the attribute flag attaching unit 351 receives the image data after the combining from the combining engine 343. The attribute flag attaching unit 351 replaces the starting two bits of each piece of pixel data included in the combining target range, with the stored attribute flag P. After the replacement, the attribute flag attaching unit 351 updates the combining mid-course image data stored in the combining buffer 344, by using the image data after the replacement.

(7) Main Control Unit 304

The main control unit 304 has a function to control the operation of the constituent elements of the image combining device 300 by outputting control signals (not illustrated) thereto.

The main control unit 304 receives an input of operation from the user via the input unit 303, reads out the image data recorded in the external device or the recording medium, and writes the read-out image data into the image storage area in the memory 301.

The main control unit 304 also receives a request for generating a composite image, via the input unit 303, and receives a request for editing the composite image, from the user.

When it receives a request for generating a composite image from the user, the main control unit 304 generates the combining instruction table 312 in accordance with operations of the user, and instructs the combining control unit 341 to combine images. The control on the generation of the composite image is the same as that shown in Embodiment 1, thus description thereof is omitted here.

<Editing Composite Image>

The main control unit 304 receives a specification of a position from the user via the input unit 303 while a composite image generated based on the composite image data 314 is displayed on the display unit. Upon receiving the specification of a position, the main control unit 304 displays an input screen for a scaling factor m (m≧1) onto the display unit 302, and receives an input of a scaling factor.

Next, the main control unit 304 generates the edited image data 316 by enlarging a part of image in a range of vertical 100 pixels×horizontal 100 pixels (hereinafter referred to as enlarging target range), centering on the specified position, by the input scaling factor.

The following will describe the enlarging process in detail.

The main control unit 304 repeats the following process for each piece of pixel data included in the enlarging target range.

When the first bit of the pixel data is "1", the main control unit 304 reads out the multiple enlarging data 313 from the memory 301, and writes the read-out multiple enlarging data 313 into the transforming memory 346.

When the first bit of the pixel data is "0", the main control unit 304 reads out the RGB enlarging data 213, and writes the read-out RGB enlarging data 213 into the transforming memory 346.

Next, when the second bit of the pixel data is "1", the main control unit 304 reads out the multiple adjusting data 315 from the memory 301, and writes the read-out multiple adjusting data 315 into the adjusting memory 348.

When the second bit of the pixel data is "0", the main control unit 304 reads out the RGB adjusting data 217, and writes the read-out RGB adjusting data 217 into the adjusting memory 348.

Next, the main control unit 304 monitors the operation of the adjusting engine 349, and when the adjusting engine 349 completes the adjusting process, the main control unit 304 instructs the adjusting engine 349 to write the pixel data after the adjusting process, into the image storage area 321 of the memory 301.

When the enlarging and adjusting are completed for all pieces of pixel data in the enlarging target range, the main control unit 304 reads out the edited image data 316, generates an edited image based on the read-out edited image data 316, and displays the generated edited image onto the display unit 302.

3.3 Operation

The following describes the operation of the image combining device 300 in the present embodiment.

(1) Operation for Image Combining

Upon receiving an instruction for combining images from the user, the image combining device 300 starts the image combining process.

Figure 20:
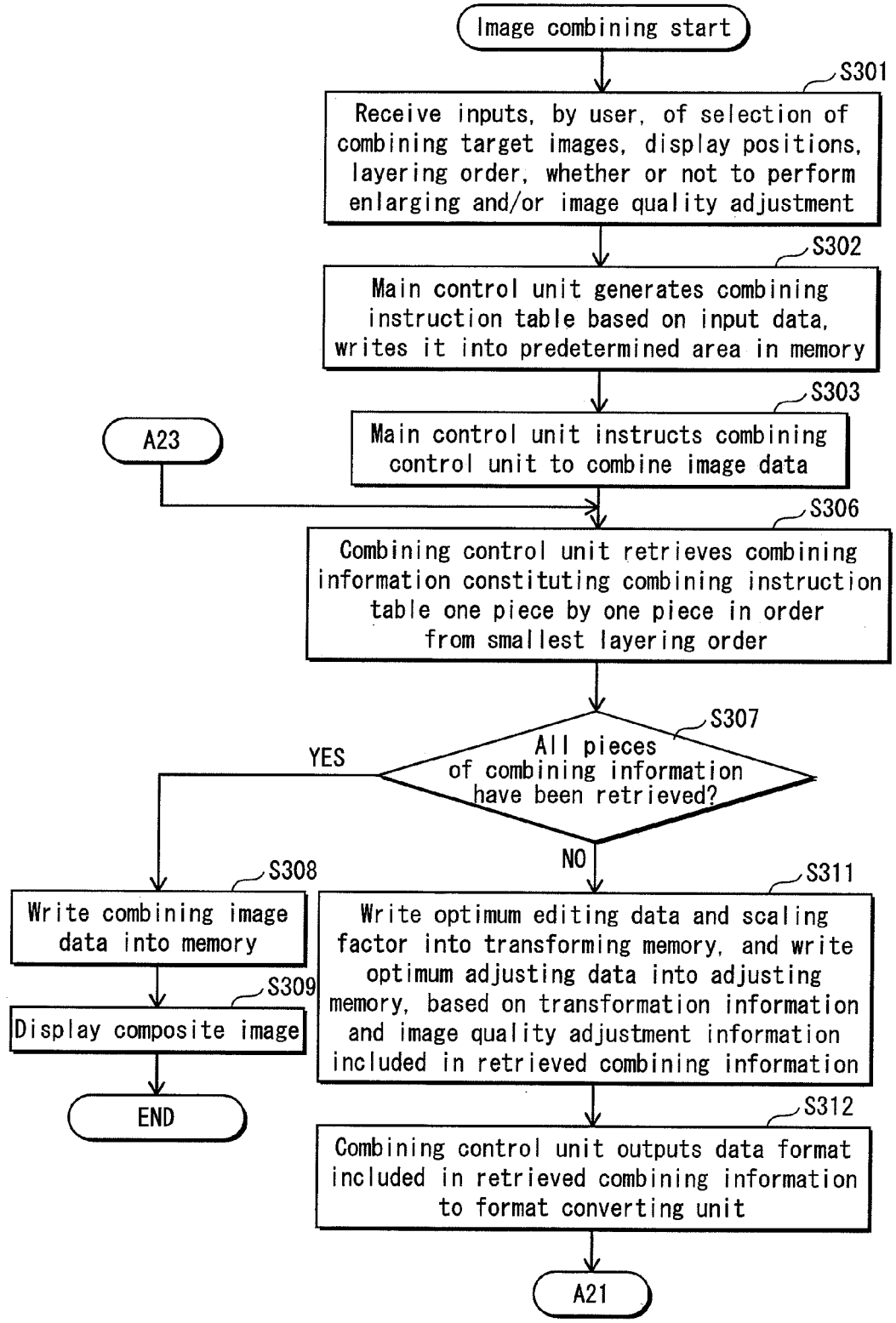
FIG. 20 is a flowchart of the operation of the image combining device 300 in the image combining process.
Figure 21:
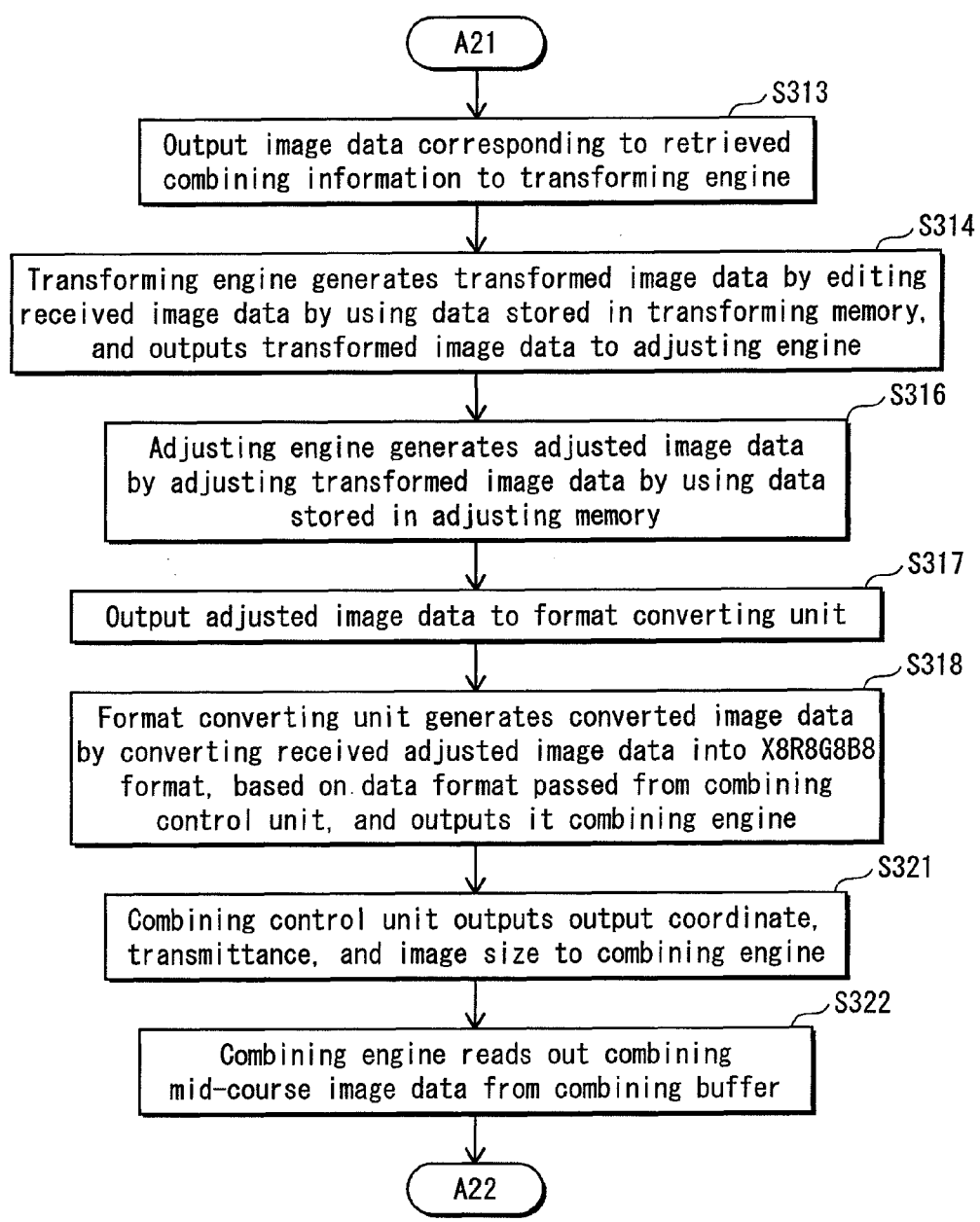
FIG. 21 is a flowchart of the operation of the image combining device 300 in the image combining process, continued from step S312 in FIG. 20.
Figure 22:
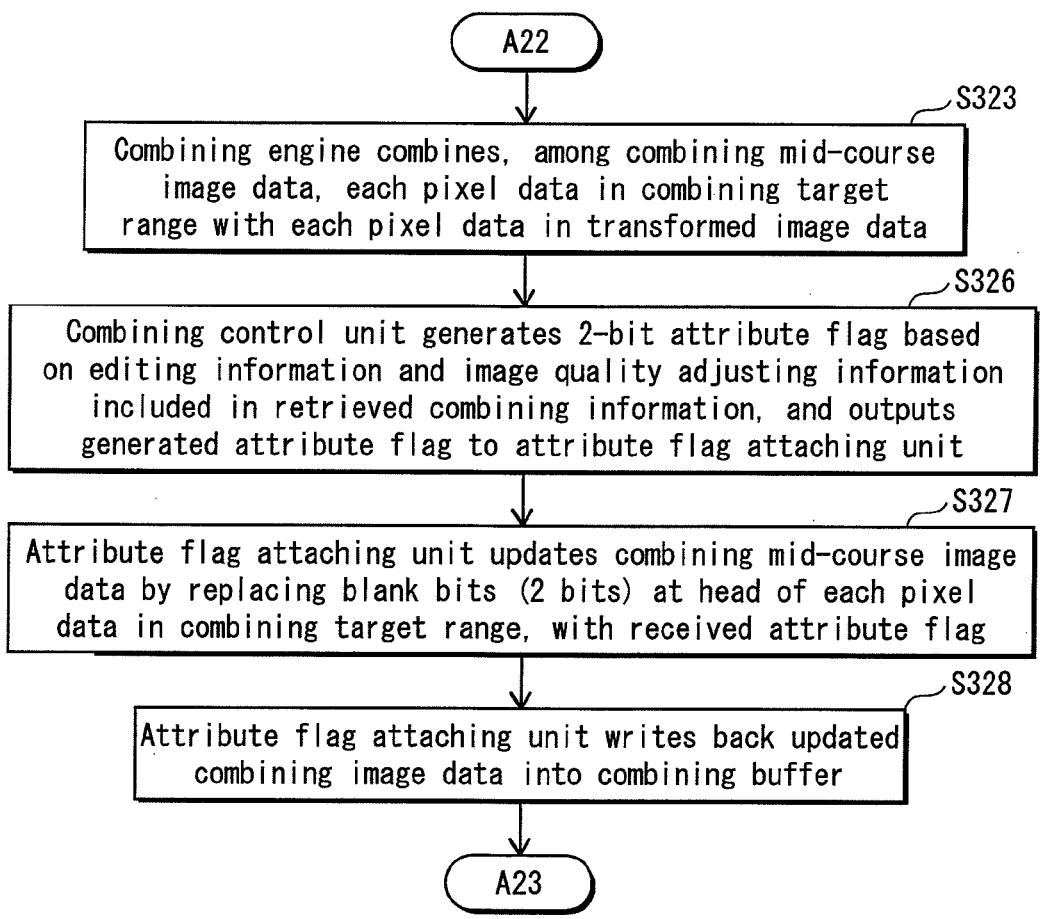
FIG. 22 is a flowchart of the operation of the image combining device 300 in the image combining process, continued from step S322 in FIG. 21.

FIGS. 20 through 22 are flowcharts of the operation of the image combining device 300 in the image combining process. Here, the operation of the image combining device 300 in the image combining process will be described with reference to FIGS. 20 through 22.

The main control unit 304 displays a predetermined selection screen or input screen, and receives inputs, from the user, of selection of combining target images, display positions, layering order, whether or not to perform editing (enlarging) and/or image quality adjustment (step S301).

Upon receiving these, the main control unit 304 generates the combining instruction table 312 based on the received data, writes the generated combining instruction table into the predetermined area in the memory 301 (step S302).

Next, the main control unit 304 instructs the combining control unit 341 to combine image data (step S303).

The combining control unit 341 receives an instruction for combining images from the main control unit 304. Upon receiving the instruction, the combining control unit 341 refers to the combining instruction table 312 stored in the predetermined area in the memory 301, and retrieves combining information constituting the combining instruction table 312 one piece by one piece in order from the smallest layering order (step S306).

When it is judged that all pieces of combining information have been retrieved (Yes in step S307), the combining control unit 341 moves to step S308.

When it is judged that all pieces of combining information have not been retrieved (No in step S307), the combining control unit 341 reads out optimum editing data from the memory 301 based on the transformation information, image quality adjustment information, and data format included in the retrieved combining information, writes the read-out optimum editing data and the scaling factor into the transforming memory 346, reads out optimum adjusting data from the memory 301, and writes the read-out optimum adjusting data into the adjusting memory 348 (step S311). Note here that, when the transformation information included in the retrieved combining information is "Unnecessary", the combining control unit 341 instructs the transforming engine 347 to pause, and that, when the image quality adjustment information included in the retrieved combining information is "Unnecessary", the combining control unit 341 instructs the adjusting engine 349 to pause.

Next, the combining control unit 341 outputs the data format included in the retrieved combining information to the format converting unit 342 (step S312).

Next, the combining control unit 341 outputs the image data corresponding to the retrieved combining information to the transforming engine 347 (step S313).

The transforming engine 347 generates transformed image data by editing (enlarging) the received image data, using the function and parameter stored in the transforming memory 346, and outputs the generated transformed image data to the adjusting engine 349 (step S314). Note here that, when it is instructed by the combining control unit 341 to pause, the transforming engine 347 outputs the received image data as it is to the adjusting engine 349.

The adjusting engine 349 receives the transformed image data from the transforming engine 347. Upon receiving the transformed image data, the adjusting engine 349 generates adjusted image data by adjusting the received transformed image data by using the function and parameter stored in the adjusting memory 348 (step S316). The adjusting engine 349 then outputs the generated adjusted image data to the format conversion unit 342 (step S317). Note here that, when it is instructed by the combining control unit 341 to pause, the adjusting engine 349 outputs the received transformed image data as it is to the format conversion unit 342.

The format conversion unit 342, upon receiving the adjusted image data, generates converted image data by converting the received adjusted image data into the X8R8G8B8 format, based on the data format notified from the combining control unit 341. The format conversion unit 342 then outputs the generated converted image data to the combining engine 343 (step S318).

The combining control unit 341 then outputs the output position, transmittance, and image size included in the retrieved combining information to the combining engine 343 (step S321).

The combining engine 343, upon receiving the transformed image data, reads out the combining mid-course image data from the combining buffer 344 (step S322).

The combining engine 343 combines, among the read-out combining mid-course image data, each piece of pixel data in the combining target range with each corresponding piece of pixel data in the transformed image data (step S323).

The combining control unit 341 generates a 2-bit attribute flag P based on the transformation information and the image quality adjusting information included in the retrieved combining information, and outputs the generated attribute flag P to the attribute flag attaching unit 351 (step S326).

The attribute flag attaching unit 351 receives the attribute flag P from the combining control unit 341, and temporarily stores the attribute flag P. The attribute flag attaching unit 351 then updates the combining mid-course image data by replacing, with the received attribute flag, the starting two bits in the blank bits of each piece of pixel data in the combining target range among the image data received from the combining engine 343 (step S327).

The attribute flag attaching unit 351 then writes back the updated combining image data into the combining buffer 344 (step S328).

Next, the image combining device 300 returns to step S306 to repeat the above-described process for each of the remaining pieces of combining information.

When it is judged that all pieces of combining information have been retrieved (Yes in step S307), the combining control unit 341 reads out the combining mid-course image data from the combining buffer 344, and writes the read-out image data into the memory 301 as the combining image data (step S308). Next, the combining control unit 341 notifies the main control unit 304 that the generation of the composite image is completed.

The main control unit 304 reads out the composite image data 314 from the memory 301, generates a composite image based on the read-out composite image data 314, and displays the composite image onto the display unit 302 (step S309).

(2) Operation of Editing Composite Image Data

Figure 23:
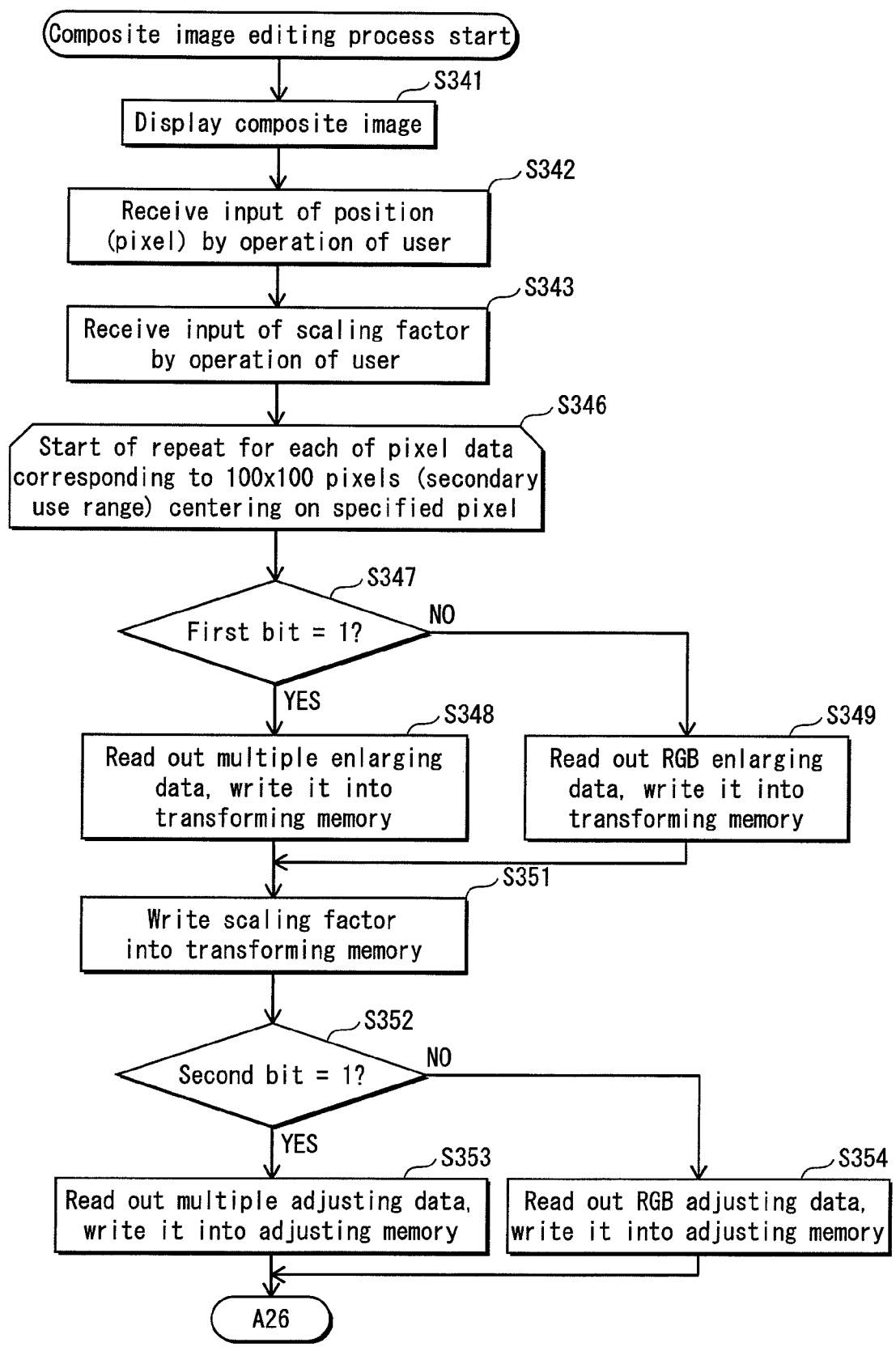
FIG. 23 is a flowchart of the operation of the image combining device 300 in the process of editing the composite image data.
Figure 24:
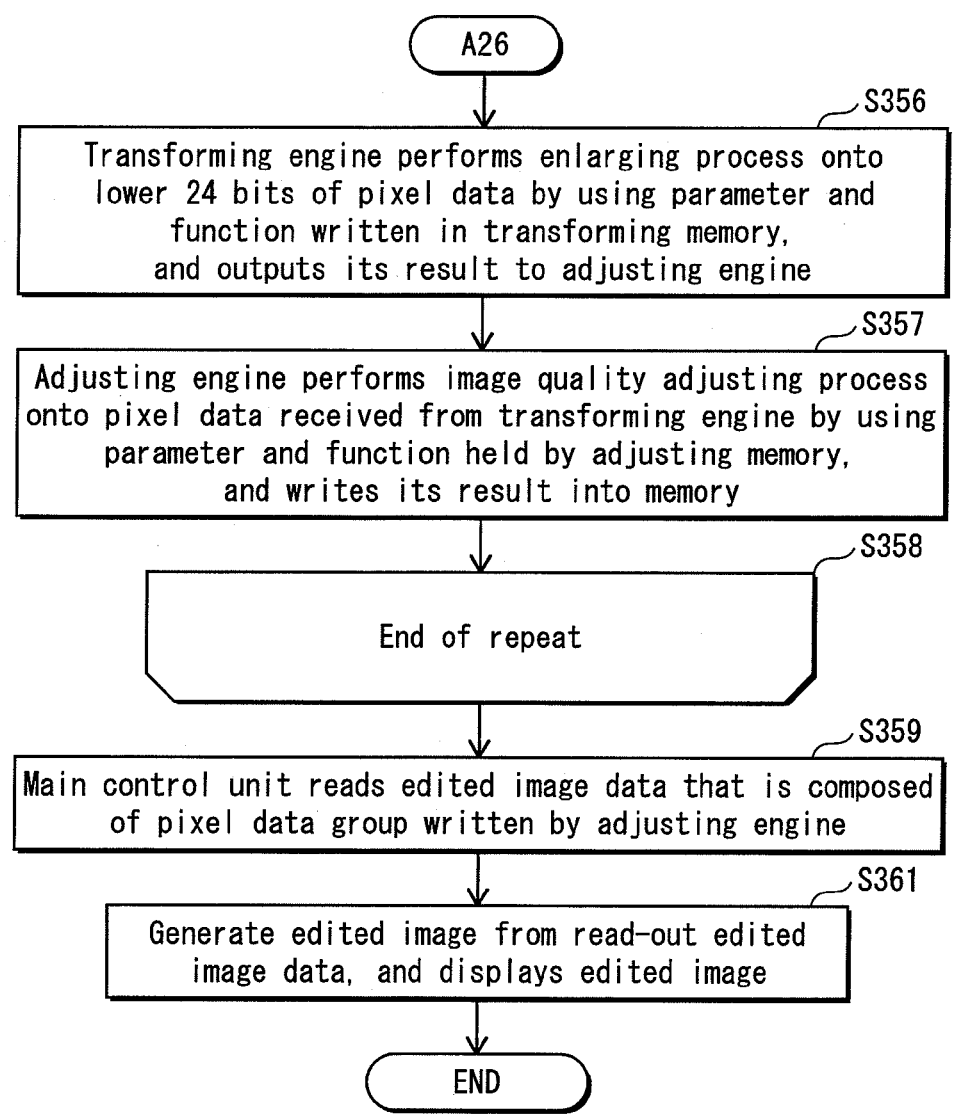
FIG. 24 is a flowchart of the operation of the image combining device 300 in the process of editing the composite image data, continued from FIG. 23.

FIGS. 23 through 24 are flowcharts of the operation of the image combining device 300 in the process of editing (enlarging) the composite image data. Here, the operation of the image combining device 300 in the process of enlarging the composite image data will be described with reference to FIGS. 23 through 24.

The main control unit 304 generates a composite image based on the composite image data 314, in accordance with operations of the user, and displays the generated composite image onto the display unit 302 (step S341). The main control unit 304 then receives a specification of a position (pixel) from the user via the input unit 303 (step S342). Next, the main control unit 304 receives an input of a scaling factor by operation of the user (step S343).

Next, the main control unit 304 generates an edited image (enlarged image) by repeating the process of steps S346 through S358 onto each piece of pixel data included in the secondary use range among the composite image data.

When the first bit of the pixel data is "1" (Yes in step S347), the main control unit 304 reads out the multiple enlarging data 313 from the memory 301, and writes the read-out data into the transforming memory 346 (step S348).

When the first bit of the pixel data is "0" (No in step S347), the main control unit 304 reads out the RGB enlarging data 213 from the memory 301, and writes the read-out data into the transforming memory 346 (step S349).

Next, the main control unit 304 writes the received scaling factor into the transforming memory 346 (step S351).

Next, when the second bit of the pixel data is "1" (Yes in step S352), the main control unit 304 reads out the multiple adjusting data 315 from the memory 301, and writes the read-out data into the adjusting memory 348 (step S353).

When the second bit of the pixel data is "0" (No in step S352), the main control unit 304 reads out the RGB adjusting data 217 from the memory 301, and writes the read-out data into the adjusting memory 348 (step S354).

After this, the main control unit 304 outputs the pixel data to the transforming engine 347. The transforming engine 347 performs the enlarging process onto the lower 24 bits (namely, R8G8B8) of the received pixel data by using the scaling factor, function, and parameter held by the transforming memory 346, and outputs the result of the enlarging process to the adjusting engine 349 (step S356).

The adjusting engine 349 performs the enlarging process onto the lower 24 bits (namely, R8G8B8) of the received pixel data by using the scaling factor, function, and parameter held by the transforming memory 346, and outputs the result of the enlarging process to the adjusting engine 349 (step S356).

The adjusting engine 349 performs the image quality adjustment process onto the received pixel data by using the function and parameter held by the adjusting memory 348, and writes the result of the image quality adjustment process into the image storage area 321 of the memory 301 (step S357).

When it has processed all pieces of pixel data in the secondary use range by repetition (step S358), the main control unit 304 reads out, from the memory 301, the edited image data 316 that is composed of the pixel data group written by the adjusting engine 349 (step S359). The main control unit 304 then generates an edited image from the read-out edited image data, and displays the generated edited image onto the display unit 302 (step S361).

3.4 Summary

As described above, the image combining device 300 of the present embodiment generates the attribute flag P that indicates whether to perform editing and/or image quality adjustment before combining, and embeds the generated attribute flag into each piece of pixel data that constitutes the composite image data.

When an enlarging and/or an image quality adjustment is to be performed further onto the part (the secondary use range) of the composite image, the attribute flag embedded in each piece of pixel data in the secondary use range is referred to, and the data to be used for the enlarging and/or image quality adjustment is selected depending on whether or not an enlarging and/or an image quality adjustment was performed in the image combining process, which is indicated by the attribute flag.

With the above-described structure, it is possible to decrease the unnaturalness of the image that is generated when a same process is repeated.

4. Embodiment 4

The following describes an image combining device 400 in Embodiment 4 of the present invention with reference to the attached drawings.

4.1 Overview

In the present embodiment, when it is to generate composite image data by combining a plurality of pieces of image data, the image combining device 400 first converts the combining target image data into the RGB format, and also generates a format flag P that indicates the data format before the conversion.

The transforming engine, which executes the process of editing such as enlarging and reducing, selects an optimum piece of editing data for use, based on the format flag P that is received together with the image data.

Similarly, the adjusting engine for performing the image quality adjustment selects an optimum piece of adjustment data for use, based on the format flag P.

With above-described structure where each execution engine selects optimum data from the attached memory based on the format flag P and executes the process using the selected optimum data, it is possible to speed up the generation of the composite image data.

4.2 Structure

Figure 25:
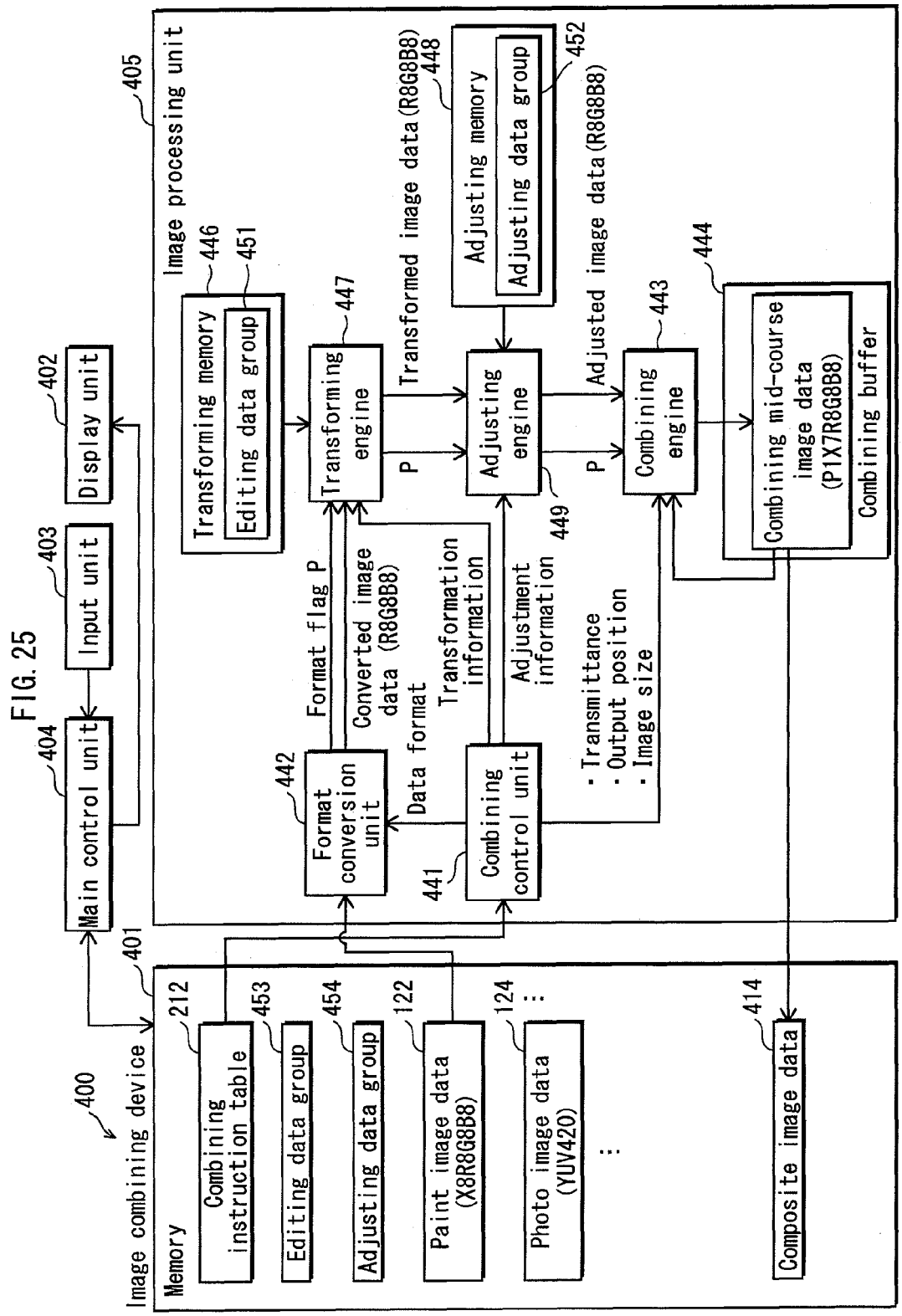
FIG. 25 is a block diagram showing the functional structure of the image combining device 400 in Embodiment 4.

FIG. 25 is a functional block diagram showing the functional structure of the image combining device 400. In FIG. 25, the arrows indicate the flow of data in the image combining process.

As shown in FIG. 25, the image combining device 400 includes a memory 401, a display unit 402, an input unit 403, a main control unit 404, and an image processing unit 405. The image processing unit 405 includes a combining control unit 441, a format conversion unit 442, a transforming memory 446, a transforming engine 447, an adjusting memory 448, an adjusting engine 449, a combining engine 443, and a combining buffer 444.

The image combining device 400 is more specifically a computer system including a microprocessor, a RAM, and a ROM. A computer program is recorded in the RAM and ROM. The image combining device 400 achieves part of its functions as the microprocessor operates in accordance with the computer program. Here, the computer program is composed of a plurality of instruction codes which each instruct the computer to achieve a predetermined function.

The following will describe each functional unit in detail. Note that the structure and operation of the input unit 403 and the display unit 402 are the same as those included in Embodiment 1, and therefore description thereof is omitted here.

Also, the memory 401 has the same structure the memory in Embodiment 1, and the combining instruction table 212, paint image data 122, the photo image data 124, . . . that are stored therein have the same structures as described in Embodiments 1 and 2, and thus description thereof is omitted here. Further, composite image data 414 is generated through a process that is different from the process described in Embodiment 1, but has the same structure as the composite image data 127 described in Embodiment 1, and thus description thereof is omitted. Editing data group 453 and adjusting data group 454 will be described later.

(1) Combining Control Unit 441

The combining control unit 441 has a function to control the operation of each functional unit by outputting control signals (not illustrated) thereto in the process of generating composite image data.

The combining control unit 441 receives an instruction for combining images from the main control unit 404. Upon receiving the instruction for combining images, the combining control unit 441, the combining control unit 441 retrieves combining information constituting the combining instruction table 212 one piece by one piece in order from the smallest layering order, and repeats the following process for all pieces of combining information.

First, the combining control unit 441 outputs the data format included in the read-out piece of combining information to the format conversion unit 442. The combining control unit 441 then outputs the transformation information and the image quality adjustment information to the transforming engine 447 and the adjusting engine 449, respectively. The combining control unit 441 then outputs the output position, transmittance, and image size to the combining engine 443.

Next, the combining control unit 441 outputs a piece of image data that corresponds to the read-out piece of combining information, to the format conversion unit 442.

After the above-described process has been performed for all pieces of combining information, the combining control unit 441 monitors the operation of the combining engine 443, and when the combining engine 443 writes back combining mid-course image data into the combining buffer 444, reads out the combining mid-course image data from the combining buffer 444, and writes the read-out combining mid-course image data into the memory 401 as the composite image data 414.

(2) Format Conversion Unit 442

The format conversion unit 442 receives the data format and image data from the combining control unit 441.

Upon receiving the data format and image data, the format conversion unit 442 generates a one-bit format flag P in accordance with the received data format. The format flag P indicates the RGB format when it has a value "1", and indicates the YUV format when it has a value "0".

Next, the format converting unit 442 generates converted image data by converting the received image data into the R8G8B8 format. Detailed procedures for the conversion have been described in Embodiment 1, and description thereof is omitted here. Next, the format conversion unit 442 outputs the generated format flag P and converted image data to the transforming engine 447.

(3) Transforming Memory 446

The transforming memory 446 is composed of a RAM, and stores the editing data group 451 which is the same as the editing data group 453 stored in the memory 401.

The editing data group 451 includes a plurality of pieces of data to be used for the editing such as enlarging, reducing, rotating, or inverting. More specifically, the editing data group 451 includes the enlarging data A 113, reducing data A 114, inverting data A 115, and rotating data A 116 . . . for the graphics images, and enlarging data B, reducing data B, inverting data B, and rotating data B . . . for the natural images, which have been described in Embodiment 1.

(4) Transforming Engine 447

The transforming engine 447 receives the transformation information from the combining control unit 441, and receives the format flag P and converted image data from the format conversion unit 442.

Upon receiving these, the transforming engine 447 reads out optimum editing data from the editing data group stored in the transforming memory 446. The transforming engine 447 generates transformed image data by editing the received converted image data, using the read-out editing data.

When it receives, for example, format flag P with value "1" and transformation information specifying "0.8 times", the transforming engine 447 reads out the reducing data B for the natural images, and generates transformed image data by performing the reducing process onto the received converted image data, using the read-out reducing data B and the scaling factor "0.8" specified by the read-out transformation information.

Next, the transforming engine 447 outputs the generated transformed image data and the received format flag P to the adjusting engine 449.

Note that, when the combining information received from the combining control unit 441 indicates "Unnecessary", the transforming engine 447 outputs the received converted image data as it is, as the transformed image data.

(5) Adjusting Memory 448

The adjusting memory 448 is composed of a RAM, and stores the adjusting data group 452 which is the same as the adjusting data group 454 stored in the memory 401.

The adjusting data group 452 includes a plurality of pieces of data to be used for the image quality adjustment. More specifically, the adjusting data group 452 includes the adjusting data A 117 for the graphics images and adjusting data B 118 for the natural images which have been described in Embodiment 1.

(6) Adjusting Engine 449

The adjusting engine 449 receives the image quality adjustment information from the combining control unit 441. The adjusting engine 449 also receives the transformed image data and format flag P from the transforming engine 447.

Upon receiving these, the adjusting engine 449 selects optimum adjusting data from the adjusting data group 452, and reads out the selected adjusting data.

Next, the adjusting engine 449 generates adjusted image data by performing the image quality adjustment process onto the received transformed image data, using the read-out adjusting data.

When it receives, for example, transformation information specifying "Necessary", the adjusting engine 449 reads out the adjusting data B for the natural images, and generates adjusted image data by performing the image quality adjustment process onto the received transformed image data, using the read-out adjusting data B.

Next, the adjusting engine 449 outputs the generated adjusted image data and the received format flag P to the combining engine 443.

Note that, when the image quality adjustment information received from the combining control unit 441 indicates "Unnecessary", the adjusting engine 449 does not perform the above-described process, and outputs the received transformed image data as it is, as the adjusted image data.

(7) Combining Buffer 444

The combining buffer 444 is composed of a RAM, and stores the combining mid-course image data, in the mid-course of the image combining process that is performed by the combining engine 443. The data format of the combining mid-course image data stored in the combining buffer 444 is the P1X7R8G8B8 format.

Also, the data stored in the combining buffer 444 at the booting or immediately after an initialization is the same as has been explained in Embodiment 1.

(8) Combining Engine 443

The combining engine 443 receives an output position, transmittance, and image size from the combining control unit 441. Also, the combining engine 443 receives the adjusted image data and format flag P from the adjusting engine 449. Note that the image size received here should match the data size of the adjusted image that is generated based on the adjusted image data.

In the following, a term "combining target range" is used for the sake of description to represent a range that is defined by the image size starting with the output position in a combining mid-course image that is generated based on the combining mid-course image data.

Upon receiving these data, the combining engine 443 reads out the combining mid-course image data from the combining buffer 444, combines the received adjusted image data with a part of the read-out mid-course image data that corresponds to the combining target range. The combining is performed, as has been described in Embodiment 1, by performing calculations using data of each color and the transmittance.

Following this, the combining engine 443 updates the combining mid-course image data by replacing the first bit of each piece of pixel data in the combining target range, with the received format flag P.

Next, the combining engine 443 writes back the updated combining mid-course image data into the combining buffer 444.

(9) Main Control Unit 404

The main control unit 404 has a function to control the operation of the constituent elements of the image combining device 400 by outputting control signals (not illustrated) thereto.

The main control unit 404 receives a request for generating a composite image from the user via the input unit 403. When it receives a request for generating a composite image from the user, the main control unit 404 initializes the transforming memory 446 and the adjusting memory 448. Next, the main control unit 404 reads out the editing data group 453 from the memory 401, and writes it into the transforming memory 446. The main control unit 404 then reads out the adjusting data group 454 from the memory 401, and writes it into the adjusting memory 448. Note that the timing of writing these data is not limited to this, but may be different from this. For example, these data may be written at the booting of the image combining device 400, or may be written by the combining control unit 441 after an instruction for combining images (which will be described later) is issued.

Next, the main control unit 404 displays a predetermined selection screen or input screen on the display unit 402, and receives inputs of selection of combining target images, and whether or not to perform editing and/or image quality adjustment. Upon receiving these data, the main control unit 404 generates the combining instruction table 212 based on the received data, and writes the generated combining instruction table into the memory 401. The main control unit 404 then instructs the combining control unit 441 to combine images.

Also, the main control unit 404 generates a composite image based on the composite image data 414, in accordance with operations of the user, and displays the generated composite image. In this process, when a position (pixel) in the composite image is specified by the user, the main control unit 404 controls the editing of the composite image data. The control of the editing of the composite image data is performed in the same way as in Embodiment 1, and description thereof is omitted here.

4.3 Operation

The following describes the operation of the image combining device 400 in the present embodiment. Note that the operation of the image combining device 400 in the editing of the composite image data is performed in the same way as in Embodiment 1, and description thereof is omitted here.

(1) Operation for Image Combining

Upon receiving an instruction for combining images from the user, the image combining device 400 starts the image combining process.

Figure 26:
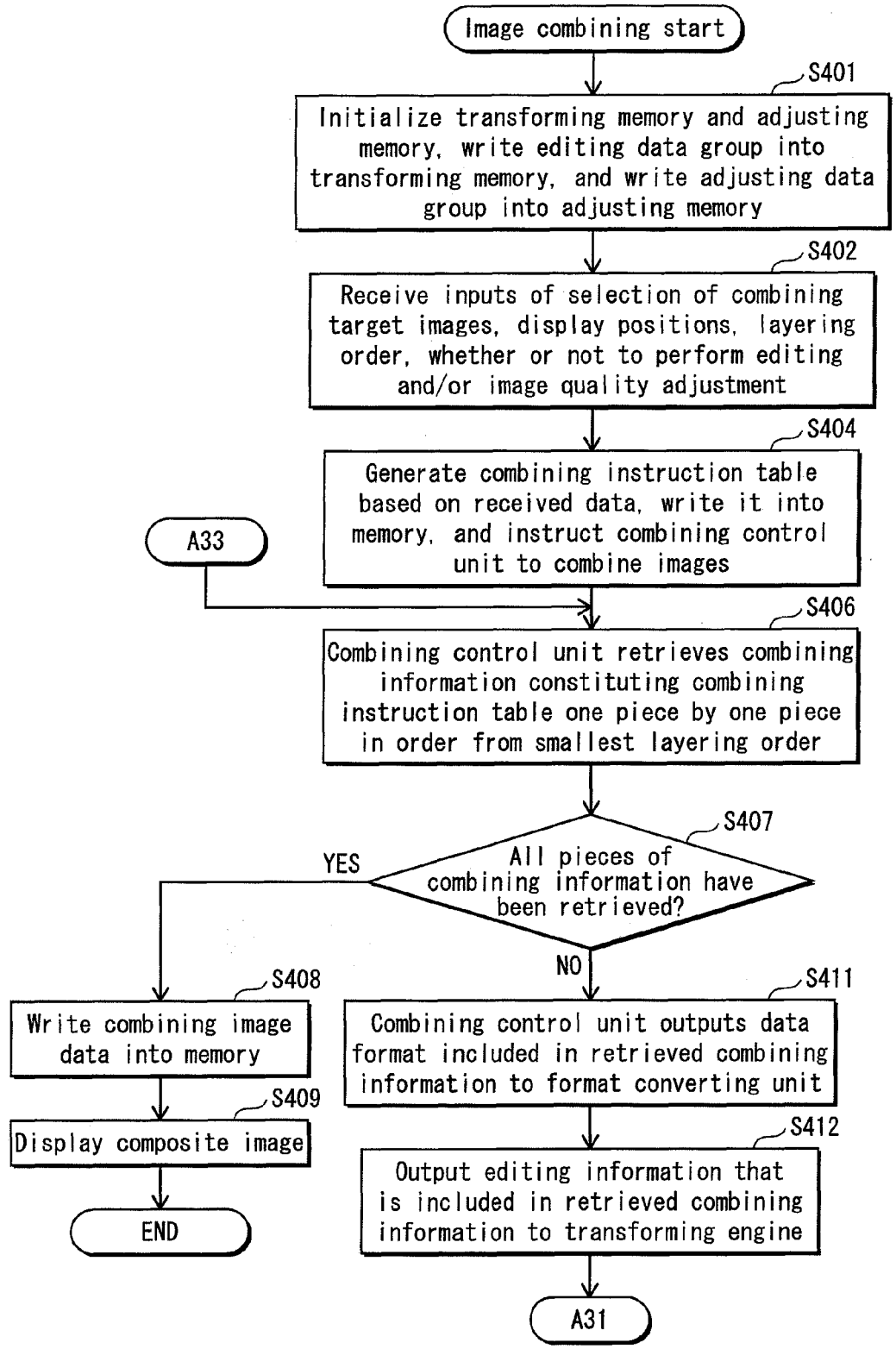
FIG. 26 is a flowchart of the operation of the image combining device 400 in the image combining process.
Figure 27:
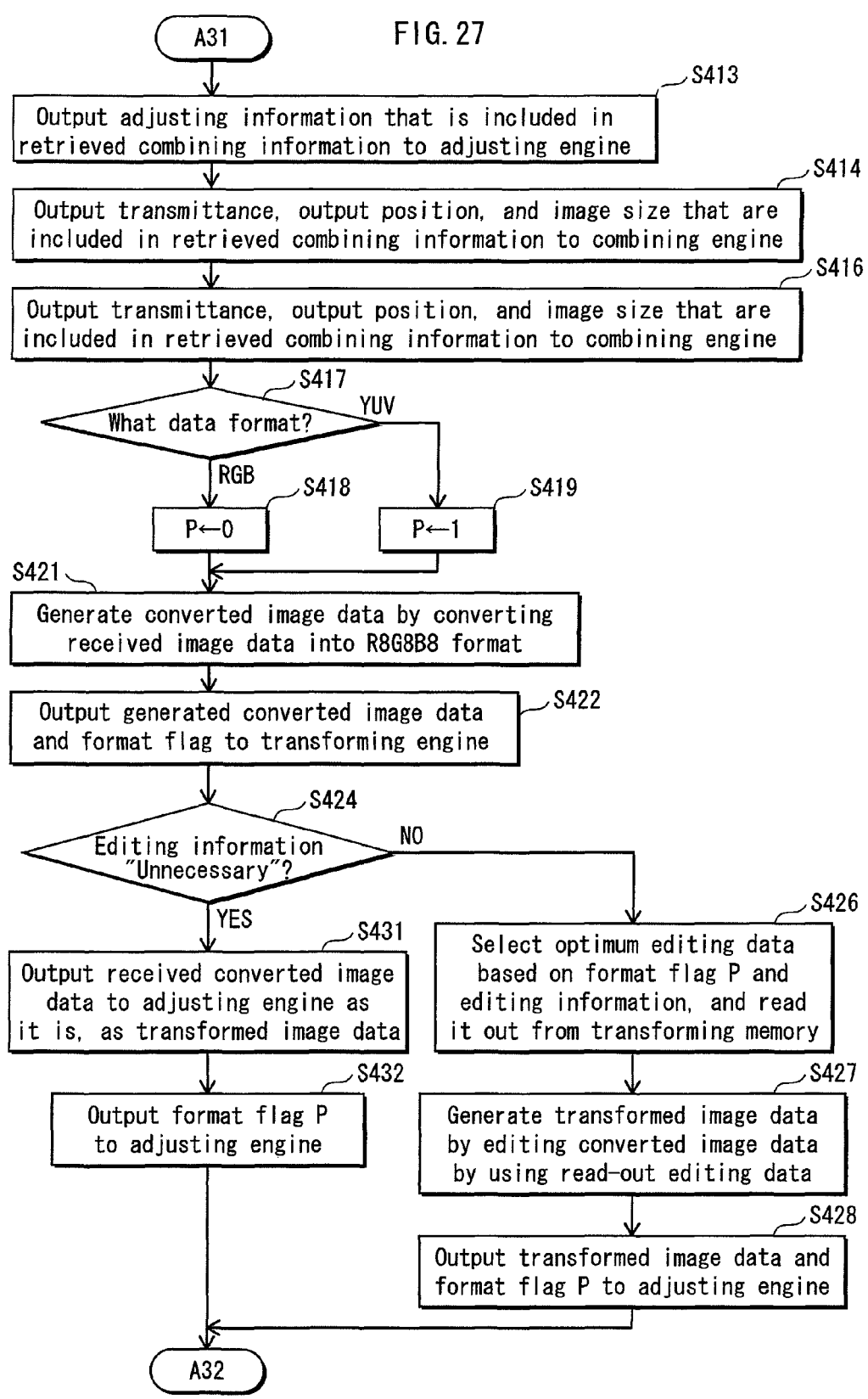
FIG. 27 is a flowchart of the operation of the image combining device 400 in the image combining process, continued from FIG. 26.
Figure 28:
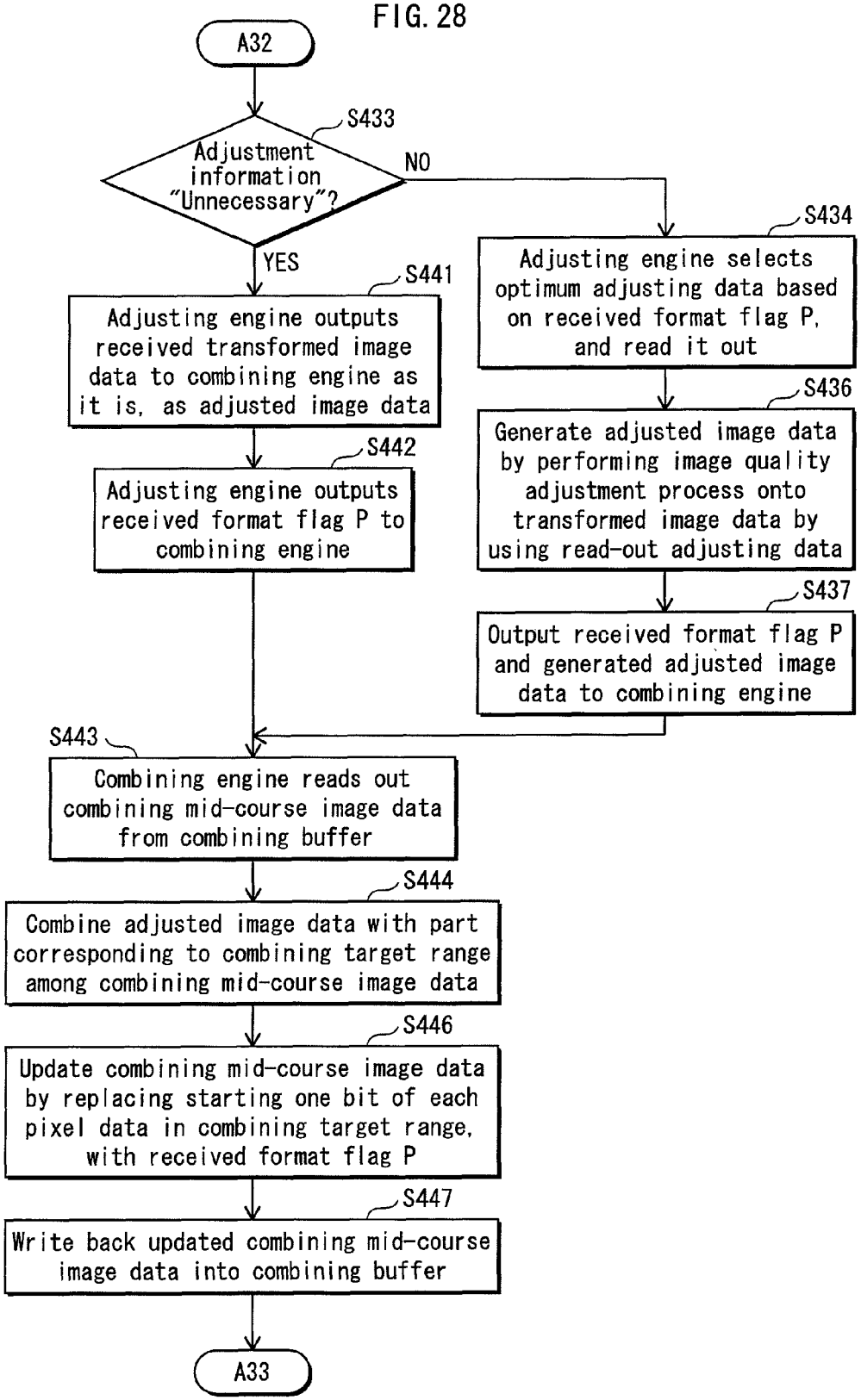
FIG. 28 is a flowchart of the operation of the image combining device 400 in the image combining process, continued from FIG. 27.

FIGS. 26 through 28 are flowcharts of the operation of the image combining device 400 in the image combining process. Here, the operation of the image combining device 400 in the image combining process will be described with reference to FIGS. 26 through 28.

Upon receiving an instruction for combining images from the user, the main control unit 404 initializes the transforming memory 446 and the adjusting memory 448, reads out the editing data group 453 from the memory 401, and writes the read-out editing data group 453 into the transforming memory 406. Also, the main control unit 404 reads out the adjusting data group 454 from the memory 401, and writes the read-out adjusting data group into the adjusting memory 448 (step S401).

Next, the main control unit 404 receives, via the input unit 403, inputs of selection of combining target images, display positions, layering order, and whether or not to perform editing and/or image quality adjustment (step S402). The main control unit 404 generates the combining instruction table 212 based on the received data, writes it into the memory 301, and instructs the combining control unit 441 to combine images (step S404).

The combining control unit 441 retrieves the combining information constituting the combining instruction table 212 one piece by one piece in order from the smallest layering order (step S406). When all pieces of combining information have been retrieved (Yes in step S407), the main control unit 404 shifts the control to step S408.

When all pieces of combining information have not been retrieved (No in step S407), the combining control unit 441 outputs the data format included in the retrieved combining information to the format converting unit 442 (step S411).

Next, the combining control unit 441 outputs the transformation information that is included in the retrieved combining information to the transforming engine 447 (step S412). Next, the combining control unit 441 outputs the image quality adjustment information that is included in the retrieved combining information to the adjusting engine 449 (step S413).

Following this, the combining control unit 441 outputs the output position, transmittance, and image size that are included in the retrieved combining information to the combining engine 443 (step S414).

Next, the combining control unit 441 reads out, from the memory 401, image data corresponding to the retrieved combining information, and output the read-out image data to the format converting unit 442 (step S416).

The format conversion unit 442 receives the data format and the image data. When the received data format indicates the RGB format ("RGB" in step S417), the format conversion unit 442 generates a format flag P having a value "1" (step S418). When the received data format indicates the YUV format ("YUV" in step S417), the format conversion unit 442 generates a format flag P having a value "0" (step S419).

Next, the format conversion unit 442 generates converted image data by converting the received image data into the R8G8B8 format (step S421). Following this, the format conversion unit 442 outputs the generated converted image data and the format flag P to the transforming engine 447 (step S422).

The transforming engine 447 receives the transformation information, converted image data, and format flag P. When the received transformation information is not "Unnecessary" (No in step S424), the transforming engine 447 selects optimum editing data from among the editing data group 451, based on the received format flag P and transformation information, and reads out the selected editing data from the transforming memory 446 (step S426).

Next, the transforming engine 447 generates transformed image data by editing the received converted image data, using the read-out editing data (step S427). Next, the transforming engine 447 outputs the generated transformed image data and the received format flag P to the adjusting engine 449 (step S428).

When the received transformation information is "Unnecessary" (Yes in step S424), the transforming engine 447 outputs the received converted image data as it is to the adjusting engine 449 as the transformed image data (step S431). Following this, the transforming engine 447 outputs the received format flag P to the adjusting engine 449 (step S432).

The adjusting engine 449 receives the adjustment information, format flag P, and transformed image data. When the received adjustment information is not "Unnecessary" (No in step S433), the adjusting engine 449 selects optimum adjusting data from among the adjusting data group 452, based on the received format flag P, and reads out the selected adjusting data from the adjusting memory 448 (step S434). Next, the adjusting engine 449 generates adjusted image data by adjusting the received transformed image data, using the read-out adjusting data (step S436).

Next, the adjusting engine 449 outputs the generated adjusted image data and the received format flag P to the combining engine 443 (step S437).

When the received adjustment information is "Unnecessary" (Yes in step S433), the adjusting engine 449 outputs the received transformed image data as it is to the combining engine 443, as the adjusted image data (step S441). The adjusting engine 449 then outputs the received format flag P to the combining engine 443 (step S442).

The combining engine 443 receives the output position, transmittance, image size, adjusted image data, and format flag. Upon receiving these, the combining engine 443 reads out the combining mid-course image data from the combining buffer 444 (step S443). The combining engine 443 then updates the combining mid-course image data by replacing starting one bit of each pixel data in the combining target range, with the received format flag P (step S446).

Next, the combining engine 443 writes back the updated combining mid-course image data into the combining buffer 444 (step S447).

When these processes are completed for all pieces of combining information, the combining control unit 441 reads out the combining mid-course image data from the combining buffer 444, and writes it into the memory 401 as the composite image data (step S408). Next, the main control unit 404 reads out the composite image data 414 from the memory 401, generates a composite image based on the read-out composite image data, and displays the composite image on the display unit 402 (step S409).

4.4 Summary

As described above, in the present embodiment, first, the format converting unit converts the combining target image data into the R8G8B8 format, and generates a format flag that indicates the format of the image data before the conversion. With this structure, when an editing and/or an image quality adjustment is performed onto image data before combining, each engine can speedily select optimum editing data or adjusting data based on the format flag, and read out the selected data from the transforming memory or adjusting memory attached to each engine.

5. Modifications

Up to now, the present invention has been described through several embodiments thereof. However, the present invention is not limited to these embodiments, but may be modified in various ways within the scope of the present invention. The following are examples of such.

(1) In each of the above-described embodiments, a format flag (in Embodiment 3, an attribute flag) is generated for each piece of pixel data. However, not limited to this, the present invention may adopt any other structure as far as it is possible to identify correspondence between each part of the composite image data and each piece of image data before combining, and correspondence between each part of the composite image data and each flag P.

For example, in the case of Embodiment 1, the format conversion unit 142 may receive a data format from the combining control unit 141, and generate a one-bit format flag P in accordance with the received data format.

Following this, the format conversion unit 142 receives input image data, and generates converted image data by converting the input image data, for example, into the R8G8B8 format.

Next, the format conversion unit 142 outputs the generated format flag P and converted image data to the combining engine.

It is presumed here that the combining mid-course image data held by the combining buffer 144 and the composite image data stored in the memory 101 are both in the R8G8B8 format.

The combining engine 143 receives, from the combining control unit 141, the transmittance, layering order, output coordinate, and image size. Also, the combining engine 143 receives the format flag P and converted image data from the format conversion unit 142. Upon receiving these, the combining engine 143 reads out the combining mid-course image data from the combining buffer 144. The combining engine 143 combines the read-out combining mid-course image data with the converted image data by using the received transmittance. The combining engine 143 then generates attribute information that is composed of the received format flag P, layering order, output coordinate, and image size. Next, the combining engine 143 updates the mid-course image data held by the combining buffer 144, by using the image data after combining. Next, the combining engine 143 writes the generated attribute information into the combining buffer 144.

Each time it receives the transmittance, output coordinate, image size, format flag P, and converted image data, the combining engine 143 repeats the above-described process of updating the mid-course image data and generating and writing the attribute information.

The attribute information generated here indicates the format flags that correspond to the pixels included in the areas 151a, 152a, 153a, and 154a in the composite image.

Next, upon receiving a request by the user for enlarging an image centering on a position indicated by the pointer 161, the main control unit 104 determines a secondary use range that is to be enlarged.

The main control unit 104 then performs the enlarging process onto each piece of pixel included in the secondary use range, in the same manner as in Embodiment 1. In this process, the main control unit 104 detects a piece of attribute information that indicates an area including the process-target pixels, and uses a format flag P included in the detected piece of attribute information. When it detects a plurality of pieces of attribute information that include process-target pixels, the main control unit 104 compares among the layering orders included in the detected pieces of attribute information, and adopts one among the plurality of pieces of attribute information that includes the largest value of layering order.

When it cannot detect any piece of attribute information that includes a process-target pixel, the main control unit 104 performs the enlarging process by using a format flag P (in this example, P=0) that corresponds to the background image.

The structure having been explained up to now can be applied to the other embodiments, as well. That is to say, the attribute information composed of information indicating each area on the composite image in which each image is included, format flag (or attribute flag), and layering order, may be stored. This structure eliminates the need for storing a format flag for each pixel, and thus reduces the total amount of data.

(3) In Embodiment 1, the main control unit 104 selects editing data and adjusting data based on the value of format flag P included in each piece of pixel data in the secondary use range among the composite image data, and writes the selected data into the transforming memory 146 and the adjusting memory 148, respectively.

However, this is merely an example. The present invention may adopt other structures. For example, the main control unit 104 may write respectively into the transforming memory 146 and the adjusting memory 148, only once, editing data and adjusting data that were selected based on the value of format flag P included in a piece of pixel data corresponding to the position (pixel) specified by the user, and the transforming engine 147 and the adjusting engine 149 may perform the editing and adjusting processes respectively onto all pieces of pixel data corresponding to the secondary use range, by using the data written in the transforming memory 146 and the adjusting memory 148, respectively.

Similarly, in Embodiments 2, 3 and 4, the device may select, only once, the data to be used for editing and adjusting the secondary use range, based on the format flag P (in Embodiment 3, attribute flag P) that corresponds to the pixel selected by the user, and writes the selected data into the transforming memory and the adjusting memory, respectively.

As another example, the device may detect the value P for each pixel included in the secondary use range, obtain a total number of values P being "1" and a total number of values P being "0", select data to be used in the editing and adjusting processes based on the value P being "1" or "0" that is larger in total number than the other, and write the selected data into each memory only once.

Note that in the case of Embodiment 3, the total number of values P is obtained for each of the first bit and the second bit, and the comparison in the total number is performed for each of the first bit and the second bit.

(4) In each of the above-described embodiments, the combining engine reads out the combining mid-course image data (in Embodiment 2, also a format flag group) from the combining buffer, and performs the combining process. However, not limited to this, when the transmittance received from the combining control unit is "0", the combining engine may not read out the image data, but may overwrite a portion of the combining mid-course image data corresponding to the combining target range, with the received image data.

(5) In Embodiment 1, the flag that indicates the format of the image data before combining is one bit in length, with value "0" thereof indicating the RGB format, and value "1" indicating the YUV format. However, the present invention is not limited to this structure.

The YUV format has two methods: the packed method; and the planar method. The two methods differ from each other in unifying the data. Also, the YUV format has several types such as YUV 420 format and YUV 422 format which are different from each other in thinning out the data.

The format flag P may be composed of a plurality of bits that can indicate the difference among these. More specifically, the first bit may indicate the RGB format or the YUV format, the second bit may indicate the packed method or the planar method, and the third bit (or the third bit and a few bits following the third bit) may indicate how the data is thinned out in the YUV format.

(6) In Embodiment 2, the format conversion unit 242 converts the input adjusted image data into the R8G8B8 format. However, the present invention is not limited to this structure.

For example, the format conversion unit 242 may convert the input adjusted image data into the R5G6B5 format so that addresses of generated composite image data can be managed with ease.

(7) In Embodiment 3, it is described for the sake of explanation that the image combining device 300 combines a plurality of pieces of image data as they are in size or after enlarging them. However, as in the other embodiments, editing other than enlarging, such as reducing, inverting, and/or rotating, may be performed onto a plurality of pieces of image data before they are combined with each other. In this case, the attribute data may be composed of eight or less bits, each bit indicating whether or not a corresponding process is to be performed.

More specifically, the first bit may indicate whether or not enlarging should be performed, the second bit may indicate whether or not reducing should be performed, the third bit may indicate whether or not inverting should be performed, . . . .

(8) In Embodiments 1, 2, and 4, the value P indicates the data format of the image data before combining, and in Embodiment 3, the value P indicates whether or not the editing process and/or the image quality adjustment process had been performed before combining. However, the present invention is not limited to this structure.

For example, the value P may indicate a type of software that generated a corresponding piece of image data. More specifically, the value P may indicate software for generating a paint image or software for generating a photo image. In the embodiments above, it is described that a plurality of pieces of image data are combined together. However, the targets to be combined are not limited to the image data, but text data generated by document creating software or a table generated by spreadsheet software may also be combined together.

In this case, the format converting unit may convert each piece of data into image data in the RGB format, and generate a format flag composed of several bits that indicates a type and format of the data before the conversion.

(9) In Embodiments 1-4 and modifications described above, each piece of image data is stored in a memory within the image combining device. However, the present invention is not limited to this structure.

For example, the input unit may have a mechanism for holding a mobile storage medium, and a mechanism for connecting with a recording device, and the user may select combining target image data from among the image data stored in an external recording medium and the recording device.

Also, in Embodiments 1-4 and modifications described above, the generated composite image data and edited image data are written into a memory that is provided in the device. However, the present invention is not limited to this structure. For example, the generated composite image data and edited image data may be output to an external recording medium, the recording device or the like.

Further, in Embodiments 1-4 and modifications described above, the image combining device generates composite image data and further generates edited image data. However, not limited to this structure, the composite image data may be output to an external device, recording device or the like so that the external device generates edited image data based on the composite image data.

(10) Each of the above-described devices is specifically a computer system that includes a microprocessor, ROM, RAM, a hard disk unit, a display unit, a keyboard, a mouse and the like. A computer program is stored in the RAM or the hard disk unit. The microprocessor operates in accordance with the computer program and causes each device to achieve the functions. The computer program is composed of a plurality of instruction codes that instruct the computer to achieve predetermined functions.

(11) Part or all of the structural elements constituting the devices described above may be achieved in one system LSI (Large Scale Integration). The system LSI is an ultra multi-functional LSI that is manufactured by integrating a plurality of components on one chip. More specifically, the system LSI is a computer system that includes a microprocessor, ROM, RAM and the like. A computer program is stored in the RAM. The microprocessor operates in accordance with the computer program, thereby enabling the system LSI to achieve its functions.

(12) Part or all of the structural elements constituting each of the above-described devices may be achieved as an IC card or a single module that is attachable/detachable to or from each device. The IC card or module is a computer system that includes a microprocessor, ROM, RAM, and the like. The IC card or module may include the aforesaid ultra multi-functional LSI. The microprocessor operates in accordance with the computer program and causes the IC card or module to achieve the functions. The IC card or module may be tamper resistant.

(13) The present invention may be methods shown by the above. The present invention may be a computer program that allows a computer to realize the methods, or may be a digital signal representing the computer program.

Furthermore, the present invention may be a computer-readable recording medium such as a flexible disk, a hard disk, CD-ROM, MO, DVD, DVD-ROM, DVD RAM, BD (Blu-ray Disc), or a semiconductor memory, that stores the computer program or the digital signal. Furthermore, the present invention may be the computer program or the digital signal recorded on any of the aforementioned recording mediums.

Furthermore, the present invention may be the computer program or the digital signal transmitted via an electric communication line, a wireless or wired communication line, a network of which the Internet is representative, or a data broadcast.

Furthermore, the present invention may be a computer system that includes a microprocessor and a memory, the memory storing the computer program, and the microprocessor operating according to the computer program. Here, the computer program is composed of a plurality of instruction codes which each instruct the computer to achieve a predetermined function.

Furthermore, by transferring the program or the digital signal via the recording medium, or by transferring the program or the digital signal via the network or the like, the program or the digital signal may be executed by another independent computer system.

(14) Furthermore, the present invention includes the case where all functional blocks of the memory card and the SIM card in the embodiment described above are achieved in an LSI being an integrated circuit. Also, the present invention includes the case where not all of but part of the functional blocks is achieved in an LSI. Each of them may be achieved on one chip, or part or all thereof may be achieved on one chip. Although the term LSI is used here, it may be called IC, system LSI, super LSI, ultra LSI or the like, depending on the level of integration.

Also, the method of achieving the integrated circuits is not limited to the LSI, but they may be achieved by dedicated circuits or general-purpose processors. It is also possible to use the FPGA (Field Programmable Gate Array), with which a programming is available after the LSI is manufactured, or the reconfigurable processor that can re-configure the connection or setting of the circuit cells within the LSI.

Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

(15) The present invention may be any combination of the above-described embodiments and modifications.

INDUSTRIAL APPLICABILITY

The present invention can be used managerially and repetitively in the industry for manufacturing and selling the devices for combining image data and outputting composite image data and the devices for editing the composite image data, and in the industry for providing various services by using such devices.

The invention claimed is:

1. An image combining device for generating composite image data by combining a plurality of pieces of target image data, comprising:
    an obtaining unit operable to obtain the plurality of pieces of target image data that are targets to be combined, and a plurality of pieces of attribute information each of which indicates an attribute related to coding during generation of each of the plurality of pieces of target image data;
    a combining unit operable to generate the composite image data by combining the plurality of pieces of target image data; and
    an associating unit operable to associate, on a one-to-one basis, the plurality of pieces of attribute information with a plurality of parts of the composite image data, the plurality of parts being respectively associated with the plurality of pieces of target image data, and when two or more parts among the plurality of parts overlap with each other at least partially in the composite image data, associate an overlapping portion in which the two or more parts overlap with each other, with a piece of attribute information associated with a piece of target image data that is displayed as a partial image in front of other partial images in an area corresponding to the overlapping portion in a composite image that is displayed in accordance with the composite image data.

2. The image combining device of claim 1, wherein
    the plurality of pieces of target image data are generated from a plurality of pieces of input image data to have a same data format by unifying different data formats of the input image data into the same data format, and
    each of the plurality of pieces of attribute information obtained by the obtaining unit indicates a data format of a different one of the plurality of pieces of input image data that correspond one-to-one to the plurality of pieces of target image data.

3. The image combining device of claim 1, wherein
    some of the plurality of pieces of target image data are generated by editing input image data, and
    each of the plurality of pieces of attribute information obtained by the obtaining unit indicates a history of how a corresponding piece of target image data has been edited.

4. The image combining device of claim 1, wherein
    the composite image data is composed of a plurality of pieces of pixel data, and
    the associating unit associates, on a one-to-one basis, attribute information with the pixel data constituting the parts of the composite image data that are respectively associated with the plurality of pieces of target image data.

5. The image combining device of claim 4, wherein
    the associating unit includes:
    a storage sub-unit storing data in units of bits the number of which is an even multiple of 16;
    a supplementing sub-unit operable to generate supplement data which is supplemented so that a sum of a bit length of one piece of pixel data and a bit length of one piece of attribute information is an even multiple of 16; and
    a writing sub-unit operable to write, in succession, into the storage unit, each piece of pixel data constituting the composite image data, each piece of attribute information that is associated with the each piece of pixel data, and the supplement data.

6. The image combining device of claim 4, wherein
each piece of attribute information is data with a smallest number of bits and indicates a characteristic related to coding during generation of a corresponding piece of target image data, and
the associating unit includes:
a storage sub-unit storing data; and
a writing sub-unit operable to write, into the storage unit, a group of pixel data constituting the composite image data, and a group of attribute information each piece of which is associated with a different piece of the pixel data constituting the composite image data.

7. The image combining device of claim 1, wherein
the associating unit includes:
a storage sub-unit storing data;
a generating sub-unit operable to generate part information that indicates parts of the composite image data that are respectively associated with the plurality of pieces of target image data; and
a writing sub-unit operable to write each piece of the part information and corresponding pieces of attribute information into the storage unit.

8. The image combining device of claim 1, wherein
the combining unit includes:
a selecting sub-unit operable to select an editing algorithm in accordance with each piece of attribute information;
an editing sub-unit operable to edit each piece of target image data associated with each piece of attribute information, in accordance with the selected editing algorithm; and
a combining sub-unit operable to combine a group of edited image data.

9. The image combining device of claim 1 further comprising:
a receiving unit operable to receive an instruction for editing the composite image data;
a selecting unit operable to select an editing algorithm in accordance with each piece of attribute information that is associated with a part of the composite image data, the part being specified by the received instruction as a part to be edited; and
an editing unit operable to edit the composite image data in accordance with the selected editing algorithm.

10. The image combining device of claim 9, wherein
the selecting unit includes:
a detecting sub-unit operable to detect a piece of attribute information that is associated with a piece of pixel data in a range that is specified by the received instruction as a range to be edited;
a selecting sub-unit operable to select an editing algorithm that is associated with the detected piece of attribute information; and
a repeat control unit operable to instruct to perform repeatedly the detection and the selection for all pieces of pixel data included in the range to be edited, and
the editing unit edits each piece of pixel data included in the range to be edited, in accordance with the selected editing algorithm.

11. The image combining device of claim 9, wherein
the instruction for editing includes position information which indicates a predetermined pixel, and
the selecting unit selects the editing algorithm in accordance with a piece of attribute information that is associated with a piece of pixel data that is to be displayed as the pixel indicated by the position information, among the composite image data.

12. The image combining device of claim 9, wherein
the selecting unit detects a group of attribute information that are associated with all pieces of pixel data included in the part to be edited, and selects an editing algorithm in accordance with a type of attribute information to which a largest number of pieces of attribute information belong, among the detected group of attribute information.

13. An image data use system comprising an image combining device and an editing device, the image combining device generating composite image data by combining a plurality of pieces of target image data, the editing device generating edited image data by editing the composite image data,
the image combining device including:
an obtaining unit operable to obtain the plurality of pieces of target image data that are targets to be combined, and a plurality of pieces of attribute information each of which indicates an attribute related to coding during generation of each of the plurality of pieces of target image data;
a combining unit operable to generate the composite image data by combining the plurality of pieces of target image data; and
an associating unit operable to associate, on a one-to-one basis, the plurality of pieces of attribute information with a plurality of parts of the composite image data, the plurality of parts being respectively associated with the plurality of pieces of target image data, and when two or more parts among the plurality of parts overlap with each other at least partially in the composite image data, associate an overlapping portion in which the two or more parts overlap with each other, with a piece of attribute information associated with a piece of target image data that is displayed as a partial image in front of other partial images in an area corresponding to the overlapping portion in a composite image that is displayed in accordance with the composite image data, and
the editing device including:
an obtaining unit operable to obtain the composite image data;
a receiving unit operable to receive an instruction for editing the composite image data;
a selecting unit operable to select an editing algorithm in accordance with each piece of attribute information that is associated with a part of the composite image data, the part being specified by the received instruction as a part to be edited; and
an editing unit operable to edit the composite image data in accordance with the selected editing algorithm.

14. An image combining method for use in an image combining device for generating composite image data by combining a plurality of pieces of target image data, the image combining method comprising the steps of:
obtaining the plurality of pieces of target image data that are targets to be combined, and a plurality of pieces of attribute information each of which indicates an attribute related to coding during generation of each of the plurality of pieces of target image data;
generating the composite image data by combining the plurality of pieces of target image data; and
associating, on a one-to-one basis, the plurality of pieces of attribute information with a plurality of parts of the composite image data, the plurality of parts being respectively associated with the plurality of pieces of target image data, and when two or more parts among the plurality of parts overlap with each other at least partially in the composite image data, associating an overlapping portion in which the two or more parts overlap with each other, with a piece of attribute information associated with a piece of target image data that is displayed as a partial image in front of other partial images in an area corresponding to the overlapping portion in a composite image that is displayed in accordance with the composite image data.

15. A non-transitory computer-readable medium having stored thereon an image combining program for use in an image combining device for generating composite image data by combining a plurality of pieces of target image data, the image combining program causing a computer to perform a method comprising the steps of:
   obtaining the plurality of pieces of target image data that are targets to be combined, and a plurality of pieces of attribute information each of which indicates an attribute related to coding during generation of each of the plurality of pieces of target image data;
   generating the composite image data by combining the plurality of pieces of target image data; and
   associating, on a one-to-one basis, the plurality of pieces of attribute information with a plurality of parts of the composite image data, the plurality of parts being respectively associated with the plurality of pieces of target image data, and when two or more parts among the plurality of parts overlap with each other at least partially in the composite image data, associating an overlapping portion in which the two or more parts overlap with each other, with a piece of attribute information associated with a piece of target image data that is displayed as a partial image in front of other partial images in an area corresponding to the overlapping portion in a composite image that is displayed in accordance with the composite image data.

16. An integrated circuit loaded in an image combining device for generating composite image data by combining a plurality of pieces of target image data, the integrated circuit comprising:
   an obtaining unit operable to obtain the plurality of pieces of target image data that are targets to be combined, and a plurality of pieces of attribute information each of which indicates an attribute related to coding during generation of each of the plurality of pieces of target image data;
   a combining unit operable to generate the composite image data by combining the plurality of pieces of target image data; and
   an associating unit operable to associate, on a one-to-one basis, the plurality of pieces of attribute information with a plurality of parts of the composite image data, the plurality of parts being respectively associated with the plurality of pieces of target image data, and when two or more parts among the plurality of parts overlap with each other at least partially in the composite image data, associate an overlapping portion in which the two or more parts overlap with each other, with a piece of attribute information associated with a piece of target image data that is displayed as a partial image in front of other partial images in an area corresponding to the overlapping portion in a composite image that is displayed in accordance with the composite image data.

17. An image combining device for generating composite image data by combining a plurality of pieces of target image data, comprising:
   an obtaining unit operable to obtain the plurality of pieces of target image data that are targets to be combined, and a plurality of pieces of attribute information each of which indicates an attribute related to coding during generation of each of the plurality of pieces of target image data;
   a combining unit operable to generate the composite image data by combining the plurality of pieces of target image data;
   an associating unit operable to associate, on a one-to-one basis, the plurality of pieces of attribute information with a plurality of parts of the composite image data;
   a receiving unit operable to receive an instruction for editing the composite image data;
   a selecting unit operable to select an editing algorithm in accordance with each piece of attribute information that is associated with a part of the composite image data, the part being specified by the received instruction as a part to be edited; and
   an editing unit operable to edit the composite image data in accordance with the selected editing algorithm, wherein
   the instruction for editing includes position information which indicates a predetermined pixel, and
   the selecting unit selects the editing algorithm in accordance with a piece of attribute information that is associated with a piece of pixel data that is to be displayed as the pixel indicated by the position information, among the composite image data.

18. An image combining device for generating composite image data by combining a plurality of pieces of target image data, comprising:
   an obtaining unit operable to obtain the plurality of pieces of target image data that are targets to be combined, and a plurality of pieces of attribute information each of which indicates an attribute related to coding during generation of each of the plurality of pieces of target image data;
   a combining unit operable to generate the composite image data by combining the plurality of pieces of target image data;
   an associating unit operable to associate, on a one-to-one basis, the plurality of pieces of attribute information with a plurality of parts of the composite image data;
   a receiving unit operable to receive an instruction for editing the composite image data;
   a selecting unit operable to select an editing algorithm in accordance with each piece of attribute information that is associated with a part of the composite image data, the part being specified by the received instruction as a part to be edited; and
   an editing unit operable to edit the composite image data in accordance with the selected editing algorithm, wherein
   the instruction for editing includes position information which indicates a predetermined pixel, and
   the selecting unit detects a group of attribute information that are associated with all pieces of pixel data included in the part to be edited, and selects an editing algorithm in accordance with a type of attribute information to which a largest number of pieces of attribute information belong, among the detected group of attribute information.

* * * * *